United States Patent
De Four

(10) Patent No.: US 7,737,651 B2
(45) Date of Patent: Jun. 15, 2010

(54) SELF STARTING METHOD AND AN APPARATUS FOR SENSORLESS COMMUTATION OF BRUSHLESS DC MOTORS

(75) Inventor: Ronald De Four, 111 Elm Drive, La Florissante, D'Abadie (TT)

(73) Assignee: Ronald De Four, D'Abadie (TT)

( * ) Notice: Subject to any disclaimer, the term of this patent is extended or adjusted under 35 U.S.C. 154(b) by 370 days.

(21) Appl. No.: 11/813,453

(22) PCT Filed: Sep. 1, 2005

(86) PCT No.: PCT/TT2005/000001

§ 371 (c)(1),
(2), (4) Date: Jul. 6, 2007

(87) PCT Pub. No.: WO2006/073378

PCT Pub. Date: Jul. 13, 2006

(65) Prior Publication Data

US 2009/0079374 A1    Mar. 26, 2009

(30) Foreign Application Priority Data

Jan. 7, 2005    (TT) ................... TT/A/2005/00001

(51) Int. Cl.
     *H02P 6/00*    (2006.01)
(52) U.S. Cl. .................. 318/400.32; 318/400.34; 318/459
(58) Field of Classification Search ......... 318/400.32, 318/400.34, 459, 500, 727
See application file for complete search history.

(56) References Cited

U.S. PATENT DOCUMENTS

| | | | |
|---|---|---|---|
| 3,783,359 A | 1/1974 | Malkiel |
| 4,027,215 A | 5/1977 | Knight et al. |
| 4,169,990 A | 10/1979 | Lerdman |
| 4,694,210 A | 9/1987 | Elliott et al. |
| 4,912,378 A | 3/1990 | Vukosavic |
| 5,343,127 A | 8/1994 | Maiocchi |

(Continued)

OTHER PUBLICATIONS

Written Opinion dated Apr. 19, 2006 issued in PCT Application No. PCT/TT2005/000001, 3 pages.

(Continued)

*Primary Examiner*—Rina I Duda
(74) *Attorney, Agent, or Firm*—Grossman Tucker Perreault & Pfleger PLLC

(57) ABSTRACT

A method and apparatus for electronic control of a direct current motor is disclosed based upon a sensorless commutation technique using voltage vector analysis. A voltage vector is produced by addition of supply phase voltage vectors of energized windings with the back-electromotive force vector of the unenergized winding. The resultant voltage vector rotates at the same speed as the rotor and possesses rotor position information used to commutate phase windings. The angle that the resultant voltage vector makes with the real axis is measured to commutate the phase windings. By parking the rotor in a predetermined position, this technique can be used to efficiently start the motor from rest and commutate phase windings during normal operation.

18 Claims, 33 Drawing Sheets

U.S. PATENT DOCUMENTS

| | | | |
|---|---|---|---|
| 5,629,598 A * | 5/1997 | Wilkerson | 318/808 |
| 5,994,867 A | 11/1999 | Birk et al. | |
| 6,396,229 B1 * | 5/2002 | Sakamoto et al. | 318/400.02 |
| 6,555,988 B2 * | 4/2003 | Masaki et al. | 318/721 |
| 6,642,681 B2 | 11/2003 | Kawabata et al. | |
| 6,653,829 B1 | 11/2003 | Henry et al. | |
| 6,694,287 B2 * | 2/2004 | Mir et al. | 702/183 |
| 2001/0008371 A1 * | 7/2001 | Norrkniivila et al. | 318/599 |

OTHER PUBLICATIONS

International Search Report dated Apr. 19, 2006 issued in PCT Application No. PCT/TT2005/000001, 3 pages.

Zeng et al., SVPWM-based current controller with grid harmonic compensation for three-phase grid connected VSI—Abstract, IEEE Xplore, 2004, 1 page, vol. No. 4, ISSN 0275-9306.

Maes et al., Discrete time direct torque control of induction motors using back-EMF measurement—Abstract, IEEE Xplore, Oct. 12-15, 1998, 1 page, vol. No. 1.

Tzou et al., FPGA-based SVPWM control IC for 3-phase PWM inverters—Abstract, IEEE Xplore, Aug. 5-10, 1996, 1 page, vol. 1.

* cited by examiner

Electric Side | Electric and Magnetic Side

Electric Side | Magnetic Side

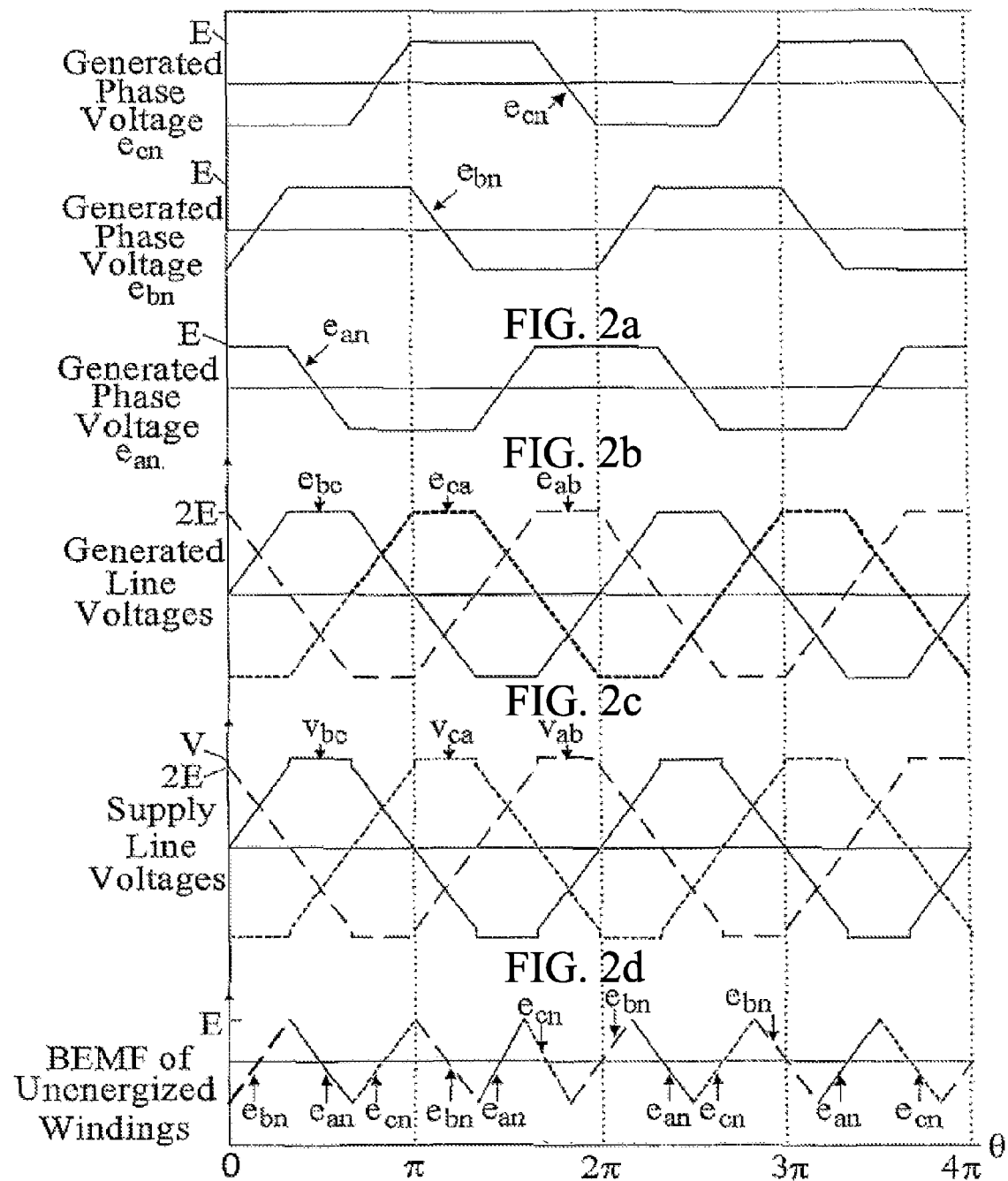

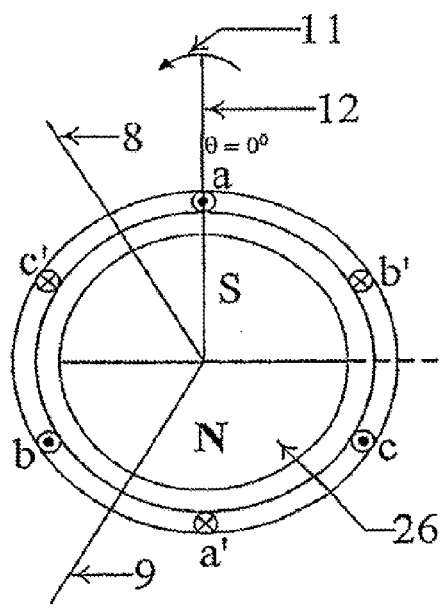
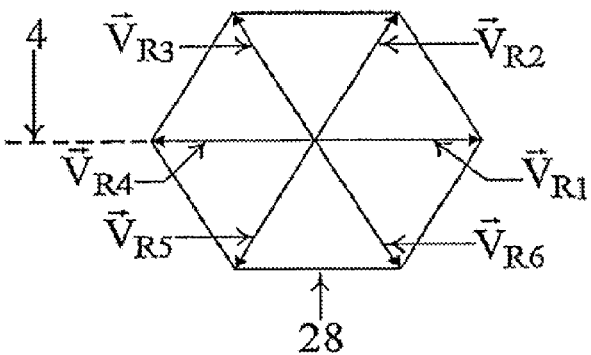
FIG.16a            FIG.16b
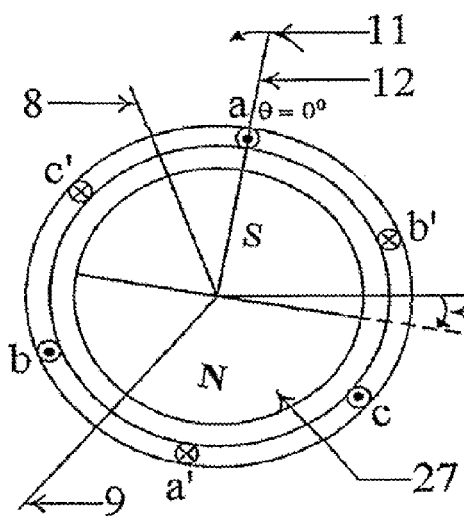
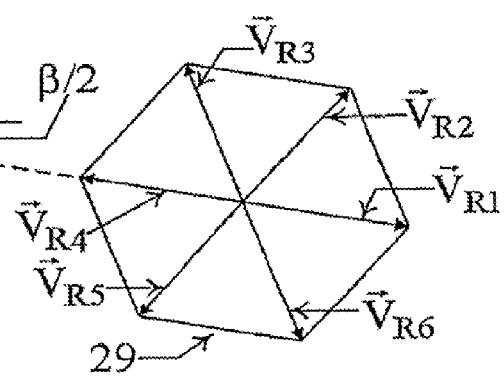
FIG.16c            FIG.16d

SELF STARTING METHOD AND AN APPARATUS FOR SENSORLESS COMMUTATION OF BRUSHLESS DC MOTORS

RELATED APPLICATIONS

This application is a national stage filing under 35 USC 371 of PCT Application No. PCT/TT2005/000001, titled "A SELF STARTING METHOD AND AN APPARATUS FOR SENSORLESS COMMUTATION OF BRUSHLESS DC MOTORS" filed on Sep. 1, 2005 which claims priority to Trinidad and Tobago Application No. TT/A/2005/00001, titled "A SELF STARTING METHOD AND AN APPARATUS FOR SENSORLESS COMMUTATION OF BRUSHLESS DC MOTORS" filed on Jan. 7, 2005.

1. TECHNICAL FIELD OF THE INVENTION

The present invention which is self-starting, relates to the field of brushless permanent magnet motors and more particularly to brushless permanent magnet motors in DC operation, not having position sensors for detecting the rotational position of a permanent magnet motor.

2. BACKGROUND

The present invention relates to a technique for efficient starting and commutation of a multi-phase Brushless DC motor under all load conditions without rotor position sensors.

The Brushless DC (BLDC) motor is an inverted brush DC motor in construction. The armature coils in the brush dc motor are transferred to the stator in the BLDC motor and the fixed magnets in the brush DC motor are transferred to the rotor in the BLDC motor. This design eliminates the need for the mechanical commutators and brushes which function is executed by transistors which act as switches.

The motor is powered by turning on two transistors in the switching arrangement, which connect two of the three phase windings to the DC supply for ⅙ of the time in an electrical cycle. Rotation of the rotor magnets induces voltages in the three stator phase windings and efficient operation of this motor is ensured by energizing the two phase windings which are experiencing a constant BEMF. This ensures that most of the electrical input power is converted to mechanical power with the minimum copper loss in the process. The BEMF generated in the unenergized winding provides very useful information of rotor position, provided the energy which was stored in its magnetic field has been dissipated, thereby completing the commutation of the unenergized winding.

Since the BEMF of a winding is dependent on the rotor position, rotor position information must be known in order to energize a pair of stator windings. Rotor position information for the purpose of stator winding energization is obtained with the use of Hall Sensors in U.S. Pat. No. 3,783,359, Optical Encoders and Resolvers in sensored commutation techniques and with the use of the BEMF Zero Crossing in U.S. Pat. No. 4,027,215, BEMF Integration in U.S. Pat. No. 4,169,990 and BEMF Third Harmonic in U.S. Pat. No. 4,912,378 in sensorless commutation techniques. Many versions of the heretofore cited three sensorless commutation techniques have been developed using elaborate electronic circuitry and having some innovations over those said patents as aforementioned.

The Hall Sensor Commutation technique requires three Hall sensors and supporting components wired on a printed circuit board, a DC power supply, space in the motor body and a sensing magnet with similar polarity to that of the rotor magnet and properly aligned with the rotor magnet. Accurate positioning of the Hall sensors is required and five connection wires are required to supply rotor position information. This said commutation technique increases the cost, size and weight of the motor and decreases the reliability of the system.

Optical encoders and resolvers are connected to the motor shaft for providing rotor position information via electrical wires connected to them. Unlike the Hall sensors, these said encoders do not produce rotor position information at standstill. These two said rotor position information techniques add substantial cost to the motor and utilise one end of the motor shaft.

These said three sensorless commutation techniques, in addition to increasing the cost of the motor also reduce the reliability of motor operation either in failure of the sensing devices due to the harsh environment in which the sensors often operate or by damage to the electrical wires carrying the rotor position information.

The three sensorless commutation techniques as aforementioned have their individual drawbacks but they all suffer from one major drawback in that they are not self-starting and a starting technique must be employed to run the motor up to a speed where the BEMF is large enough for the sensorless technique to be implemented. In addition to these said sensorless techniques not being self-starting, they sometimes do not sense commutation points due to noise in the BEMF signal and are unable to operate properly at low speeds when the BEMF signal generated is small.

Starting methods have been presented in U.S. Pat. No. 4,694,210, U.S. Pat. No. 5,343,127 and U.S. Pat. No. 6,642,681 for sensorless commutation of Brushless DC motors. However, these said starting techniques are cumbersome and are different from the commutation technique used when the motor is running.

SUMMARY

The present invention is based fundamentally on the existence of voltage vectors that occupy the stator space of a Brushless DC motor. The sum of the two applied phase voltage vectors and the BEMF phase vector of the unenergized phase winding, produce the resultant voltage vector, the angle of which made with the real axis is used to commutate phase windings for efficient motor operation. This sensorless commutation technique utilizing voltage vectors and more precisely, the angle made by the resultant voltage vector is innovative, ground-breaking and revolutionary to the field of sensorless commutation of Brushless DC motors. It utilizes the same Digital Signal Processor (DSP) which is used to supply the control waveforms for motor energization, to compute the phase and resultant voltage vectors and the angle that the resultant voltage vector makes with the real axis, thereby eliminating the need for additional signal conditioning electronic circuitry, which components undergo aging and fail with time, thus decreasing the reliability of the system.

With reference to the present invention, the sensorless commutation techniques of the prior art all use scalar voltages and electronic signal conditioning circuitry to accomplish their task. Therefore, the use of vector voltages and the manner in which they are produced, has distanced this sensorless commutation technique from all other known techniques hitherto presented thus far.

The vector method of analysis has been first applied to electrical machines by Kovacs and Racz and is widely used in the analysis of alternating current electrical machines. As the name implies, a Brushless DC motor has been considered as a DC motor and DC motor analysis has always been applied to motor operation when two phase windings are energized. However, when motor operation is examined over an electrical cycle of operation, it is clear from the supplied voltages and currents, that ac motor operation is in effect, and as a consequence, vector analysis could be applied to the motor's operation. This said method of vector analysis as presented by Kovacs, although mathematically correct, raises some fundamental issues when applied to electrical machine analysis. These said issues have remained unresolved for over 45 years since they were not deemed to be important to the vector analysis of induction and synchronous machines. However, these very issues are of significance if vector analysis has to be applied to Brushless DC motors and must of necessity be addressed for the successful application of voltage vectors to commutate these said motors.

With respect to the internalisation of the modus operandi of the present invention, the issues in question are as follows:

(a) It was stated that a current flowing through a stator phase winding produces a current vector along the winding's magnetic axis. However, the mechanism and process by which a scalar current flowing through the winding produces a vector current along the winding's magnetic axis were not presented;

(b) It was stated as well, that the magnitude of the scalar current was equal to that of the vector current, but no scientific proof was given for this equality;

(c) The current vectors produced by each phase winding of a three-phase two-pole stator, whose phase windings are separated from each other by 120 electrical degrees were added vectorially to produce the resultant current vector as shown in the equation, $$\vec{i}_r = i_a + \vec{a}\, i_b + \vec{a}^2 i_c$$

where, $\vec{i}_r$ represents the resultant current vector, $i_a$, $i_b$ and $i_c$ are the instantaneous currents in phase windings aa', bb' and cc' respectively and $\vec{a}$ and $\vec{a}^2$ are unit position vectors. It was then inferred that the resultant voltage vector could be produced in a similar manner by the vector addition of the voltage vectors produced by each phase winding as shown in the equation $$\vec{v}_r = v_a + \vec{a}\, v_b + \vec{a}^2 v_c$$

where, $\vec{v}_r$ is the resultant voltage vector and $v_a$, $v_b$ and $v_c$ are the instantaneous values of phase voltages for windings aa', bb' and cc' respectively. Although the above equation exists, it was not shown or proven how scalar supply phase voltages were transformed to vector supply phase voltages and how these vector supply phase voltages lie on the winding's magnetic axis;

(d) And finally, the multiplication of a scalar voltage differential equation for a phase winding by a unit position vector representing the direction of the magnetic axis of that winding, although mathematically correct, fails to show how these scalar voltages are physically transformed into vector quantities. For example, Kovacs presented the scalar voltage differential equation for winding bb' as $$v_b = i_b R_b + \frac{d\lambda_b}{dt}$$

where, $v_b$, $i_b$ and $\lambda_b$ are the scalar phase voltage, scalar phase current and scalar phase flux linkage respectively and $R_b$ the stator phase resistance for winding bb'. The aforementioned equation was then multiplied by $\vec{a}$, the unit position vector indicating the direction of the positive magnetic axis of winding bb', producing the equation, $$\vec{a} v_b = \vec{a} i_b R_b + \frac{d \vec{a} \lambda_b}{dt}.$$

Although the foregoing equation is mathematically correct, there has been no reduction to practice by Kovacs to demonstrate how scalar voltages $i_b R_b$ and $$\frac{d\lambda_b}{dt}$$

were transformed to vector quantities in the said equation.

It was stated by Kovacs that "the vector method is a simple but mathematically precise method; furthermore, it enables us to see the physical background of the various phenomena." The inventor concurs with the said statement, however, the aforementioned points raised in (a) to (d), although being mathematically correct, have not utilised the physical background of the various phenomenon in the development of the various vector quantities and equations. As a result, the optimal power and benefits of the vector method, to be derived in the analysis of three-phase machines, whereby the physical background of the various phenomenon may be observed, was not realized as a result of the issues presented heretofore in (a) to (d).

A cross-sectional view of the stator windings of a two-pole, three-phase Brushless DC motor is shown in FIG. 1a. The phase windings are shown to be displaced from each other by 120 degrees and the positive direction of current flow through each winding is upwards through the non-primed side and downwards through the primed side of each winding. Using this convention of current flow through the windings, positive magnetic axis for phase winding aa' (4), positive magnetic axis for phase winding bb' (8) and positive magnetic axis for phase winding cc' (9) are shown in FIG. 1a, along which all magnetic quantities exist.

The analysis of electromagnetic systems has traditionally been performed with the production of two circuits, an electrical circuit for electrical analysis and a magnetic circuit for magnetic analysis. However, quantities in the electrical circuit affect quantities in the magnetic circuit and vice-versa. As a result of the dependence of both electrical and magnetic circuits on each other, the development of an equivalent circuit containing both electrical and magnetic quantities would prove to be very useful in the analysis of electromagnetic systems. Since the three-phase stator is an electromagnetic system, then the application of an equivalent circuit containing both electrical and magnetic quantities would be a powerful tool in the vector analysis approach of said electromagnetic system.

For this analysis, one phase winding of the three-phase stator, winding aa' was selected for analysis. This winding is represented by its center conductors and current flow through the winding is in the positive direction as shown in FIGS. 1b-1c. The phase winding possesses resistance which is an electrical quantity and inductance which is both an electrical and a magnetic quantity. The winding resistance $R_a$ being an electrical quantity is removed from the winding together with $$L_a \frac{di_a}{dt},$$

which is an electrical voltage. These two quantities $R_a$ and $$L_a \frac{di_a}{dt}$$

are placed on the left electric side of the circuit with the supply voltage $V_{an}$. The winding with its magnetic quantities and electric current are on the right side of the circuit in FIG. 1b. This process separates the electrical voltage quantities from the magnetic quantities. The electric scalar current $i_a$, which leaves the electric circuit, flows through the winding and produces vector magnetic field intensity $\vec{H}_a$ along the positive magnetic axis of winding aa' (4) as shown in FIG. 1b.

The magnitude of $\vec{H}_a$ is obtained by Amperes Circuital Law and is given by $$\frac{i_a l_a}{N_a},$$

where $l_a$ is the length of the path of $\vec{H}_a$ and $N_a$ is the number of turns of winding aa'.

The magnetic field intensity $\vec{H}_a$ produces a flux density $\vec{B}_a$, which is co-linear with $\vec{H}_a$, and which magnitude is given by $\mu|\vec{H}_a|$, where $\mu$ is the permeability of the medium through which $\vec{B}_a$ flows. Flux density $\vec{B}_a$ produces flux $\vec{\phi}_a$, which is also co-linear with $\vec{B}_a$ and which magnitude is given by $|\vec{B}_a|A_a$ where $A_a$ is the cross-sectional area of concern. The flux linked with winding aa' is given by $\vec{\lambda}_a$, which is co-linear with $\vec{\phi}_a$ and which magnitude is given by $|\vec{\phi}_a|N_a$. The flux linkage $\vec{\lambda}_a$ provides a current vector $\vec{i}_a$ which magnitude is given by $$\frac{|\vec{\lambda}_a|}{L_a}$$

which is co-linear with $\vec{\lambda}_a$. Hence magnetic quantities $\vec{H}_a$, $\vec{B}_a$, $\vec{\phi}_a$, $\vec{\lambda}_a$ and current vector $\vec{i}_a$ all lie along the positive magnetic axis of winding aa' (4) and are spatial vector quantities possessing both magnitude and direction.

It must be noted in FIG. 1c that the electric and magnetic circuits are shown to be joined together but separated from each other by the vertical dotted line shown in said. Since current vector $\vec{i}_a$ leaves the magnetic circuit, a current vector $\vec{i}_a$ must also enter the series connected magnetic circuit of FIG. 1c. In addition, since the electric and magnetic circuits are connected in series, this implies that the scalar electric current $i_a$ is of the same magnitude as the vector magnetic current $\vec{i}_a$. The separation of electric and magnetic circuits is shown by the dotted vertical line, with the magnetic current vector $\vec{i}_a$ taking up a scalar value when it enters the electric circuit and the scalar electric current $i_a$ taking up a vector magnetic value when it enters the magnetic circuit as shown in FIG. 1c. Hence the magnetic axis of winding aa' (4) completes the electric circuit making $i_a$ and $|\vec{i}_a|$ of same magnitude.

If $i_a$ is changing, then the effect of the magnetic circuit on the electric circuit is seen in the voltage $$L_a \frac{di_a}{dt}$$

which opposes the current $i_a$. Since the magnitude of $i_a$ and $\vec{i}_a$ are equal and $\vec{i}_a$ lies along the winding's magnetic axis, then the voltages $i_a R_a$ and $$L_a \frac{di_a}{dt}$$

can be referred to the magnetic axis of winding aa' (4) without changing their magnitudes. The vector summation of $\vec{i}_a R_a$ and $$L_a \frac{d\vec{i}_a}{dt}$$

along the magnetic axis of winding aa' (4), produces the supply voltage vector $\vec{V}_{an}$ along the magnetic axis of winding aa' (4). Applying Kirchhoff's voltage law to the electric and magnetic sides of said FIG. 1c yields, $$V_{an} = i_a R_a + L_a \frac{di_a}{dt}$$

for the electric side and $$\vec{V}_{an} = \vec{i}_a R_a + L_a \frac{d\vec{i}_a}{dt}$$

for the magnetic side.

The production of an equivalent circuit containing electric and magnetic quantities for the electromagnetic system represented by one phase winding of a three-phase stator, clarifies the issues raised in (a) to (d) as heretofore mentioned. A summary of the benefits gained from the above analysis utilizing the equivalent circuit containing electric and magnetic quantities as it relates to the issues raised in (a), (b) and (d) are as follows:

(i) It shows, that when a scalar current $i_a$ of an electromagnetic system, leaves the electric circuit and enters the magnetic circuit, it is converted into a vector quantity $\vec{i_a}$ of the same magnitude as the scalar current. This is a result of the series nature of the electric and magnetic circuits resulting in the same magnitude of both scalar and vector currents. The location of the current vector is along the magnetic axis of the magnetic circuit because all quantities of the magnetic circuit are located on its axis;

(ii) Since the vector current is of the same magnitude as the scalar current and this said current vector lies on the magnetic axis of the winding, then scalar voltages $i_a R_a$ and $$L_a \frac{di_a}{dt}$$

can be referred to the magnetic axis of the winding becoming $\vec{i_a} R_a$ and $$L_a \frac{d\vec{i_a}}{dt}$$

respectively, with these vector voltages being of the same magnitude as their scalar counterparts. In addition, since the sum of the scalar voltages $i_a R_a$ and $$L_a \frac{di_a}{dt}$$

in the electric circuit results in the scalar supply voltage, then the sum of the vector voltages $\vec{i_a} R_a$ and $$L_a \frac{d\vec{i_a}}{dt}$$

results in the vector supply voltage, which is of the same magnitude as the scalar supply voltage;

(iii) In addition to showing the process by which scalar voltages are referred to the magnetic circuit of the electromagnetic system, the analysis produces a scalar and a vector voltage differential equation. If scalar analysis is being performed, then the scalar voltage differential equation is utilized, while if vector analysis is being performed on the electromagnetic system formed by the stator, then the vector voltage differential equation would be utilized;

(iv) Both scalar and vector voltage differential equations reveal the same magnitude of voltages and current; however, as will be shown later, the vector voltage and current variables together with the vector magnetic variables would be used to reflect the physical background of the various phenomenon occurring in the machine.

The application of the aforementioned technique to the three-phase, two-pole Brushless DC motor stator as shown in FIG. 1a, which phase windings are displaced from each other by 120 electrical degrees, produces the magnetic and electric quantities of each phase vectorially along the positive magnetic axis for phase winding aa' (4), positive magnetic axis for phase winding bb' (8) and positive magnetic axis for phase winding cc' (9) as shown in FIG. 1d.

Each magnetic or electric phase variable can now be added vectorially to produce the resultant of that variable. Hence the resultant magnetic field intensity $\vec{H}_{res}$, flux density $\vec{B}_{res}$, flux $\vec{\phi}_{res}$, flux linkage $\vec{\lambda}_{res}$, current vector $\vec{i}_{res}$, stator resistance voltage drop $\vec{i}_{res} R_s$, inductance voltage $$L_s \frac{d\vec{i}_{res}}{dt}$$

and supply voltage $\vec{v}_{res}$ are given by the vector addition of their phase variables shown on the magnetic axes in FIG. 1d, which yield $$\vec{H}_{res} = H_a + \vec{a} H_b + \vec{a}^2 H_c$$

$$\vec{B}_{res} = B_a + \vec{a} B_b + \vec{a}^2 B_c$$

$$\vec{\phi}_{res} = \phi_a + \vec{a} \phi_b + \vec{a}^2 \phi_c$$

$$\vec{\lambda}_{res} = \lambda_a + \vec{a} \lambda_b + \vec{a}^2 \lambda_c$$

$$\vec{i}_{res} = i_a + \vec{a} i_b + \vec{a}^2 i_c$$

$$\vec{i}_{res} R_s = i_a R_a + \vec{a} i_b R_b + \vec{a}^2 i_c R_c$$

$$L_s \frac{d\vec{i}_{res}}{dt} = L_a \frac{di_a}{dt} + \vec{a} L_b \frac{di_b}{dt} + \vec{a}^2 L_c \frac{di_c}{dt}$$

$$\vec{v}_{res} = v_a + \vec{a} v_b + \vec{a}^2 v_c$$

In the said aforementioned equations, $\vec{a}$ and $\vec{a}^2$ are unit vectors representing the position of the positive magnetic axes of windings bb' and cc' respectively and the magnetic and electric variables on the right hand side of these equations are the instantaneous values of these variables for the particular winding. The application of Kirchhoff's Law to the vector voltages on each magnetic axis yields, $$v_a = i_a R_a + \frac{d\lambda_a}{dt}$$

$$\vec{v_b} = \vec{a} v_b = \vec{a} i_b R_b + \vec{a} \frac{d\lambda_b}{dt}$$

$$\vec{v_c} = \vec{a}^2 v_c = \vec{a}^2 i_c R_c + \vec{a}^2 \frac{d\lambda_c}{dt}.$$

The aforementioned three equations reveal that both the phase vector supply voltage and the resultant voltage vector of the three phase windings were obtained by vector addition of vector voltages that exist on the axes of the phase windings of FIG. 1d.

In summary therefore, the aforementioned proofs and clarification of the above issues with respect to the present invention have revealed the exact location and magnitude of each phase voltage vector, which is of critical importance in the proposed sensorless commutation technique.

Concomitant upon the foregoing, therefore, it is a first object of the present invention to effectively mitigate known disadvantages of the prior art.

It is a second object of the present invention to provide a method and an apparatus for an invention which is based on the existence of voltage vectors which occupy the stator space of a Brushless DC motor.

Yet a further object of the present invention is the provision of a method and an apparatus for the demonstration of how scalar supply phase voltages are transformed to vector supply phase voltages and the positioning of these said voltages on the winding's magnetic axis.

Still a further object of the present invention is to provide a method and an apparatus, which is used to supply the control waveforms for motor energization by computing the phase and resultant voltage vectors and the angle which the resultant voltage vector makes with the real axis, thereby eliminating the need for additional signal conditioning electronic circuitry.

Moreover, still yet a further object of the present invention is to provide a method and an apparatus which optimally performs the technique of the self-starting ability, from rest under no-load and load conditions, of the De Four BEMF Space Vector Resolver, said technique being hitherto unknown, among all other sensorless techniques of the prior art, used for the commutation of Brushless DC motors.

Finally, another object of the present invention is to determine the energization sequence for a particular direction of motor rotation, with the intention of producing unidirectional and continuous torque production.

BRIEF DESCRIPTION OF THE DRAWINGS

The above objects and other advantages of the present invention will become more apparent by describing in detail preferred embodiments thereof, with reference to the accompanying drawings, in which:

FIG. 2a displays the three generated phase voltages;

FIG. 2b displays the generated line voltages for a star connected BLDC motor stator;

FIG. 2c displays the supply line voltages for efficient motor operation; and

FIG. 2d displays the BEMF of the unenergized windings for the present invention.

FIG. 4c shows a schematic diagram of the electric and electric and magnetic circuits of phase winding aa' and rotor magnet rotating for the present invention, while.

FIG. 15a shows the linear representation of an unskewed 2-pole three-phase BLDC motor showing only the center conductors of phase winding aa' for the present invention, FIG. 15b shows the linear representation of the same motor but having the rotor skewed by 20° for the present invention, while FIG. 15c shows the linear representation of the skewed rotor with the shift of the d-axis and the winding's magnetic axis by half the skew angle for the present invention.

FIG. 16a depicts a cross sectional view of the unskewed rotor with the three phase windings for the present invention, FIG. 16b shows an unskewed hexagonal trajectory of the BEMF Space Vector for the present invention, FIG. 16c depicts a cross sectional view of the skewed rotor with the three skewed phase windings for the present invention, and FIG. 16d shows a skewed hexagonal trajectory of the BEMF Space Vector for the present invention.

FIG. 19a depicts the location of the positive magnetic axes for the three phase windings of an unskewed rotor for the present invention, while.

FIG. 20a depicts the location of the positive magnetic axes for the three phase windings of a skewed rotor for the present invention, while.

BEST MODE FOR CARRYING OUT THE INVENTION

The commutation technique employed in the present invention, overcomes all of the disadvantages of the known prior art, namely that of BEMF Zero Crossing, BEMF Integration and the BEMF Third Harmonic Sensorless Commutation techniques. This said commutation technique of the present invention is sensorless and self-starting on load, thus making it superior to all known existing sensored and sensorless commutation techniques. Additionally this said technique is used for starting and running the motor.

This said technique, utilises a Digital signal Processor (DSP) to compute the stator phase voltage space vector, the rotation of which is dependent on the BEMF induced in the unenergized winding. As a result, this BEMF space vector sits on the rotor and provides rotor position information as the rotor begins to move. It utilises the angle that the BEMF Space Vector makes with the real axis to commutate phase windings and is easily applied to motors with any number of poles, provided that the rotor skew angle is known, thereby efficiently starting and commutating a Brushless DC Motor.

With respect to the present invention, the production of a BEMF Space Vector for starting and commutation of a Brushless DC Motor involves the knowledge of the phase BEMF waveforms as a function of rotor position, the production of magnetic axes of a three-phase stator, the development of an equivalent circuit of a phase winding containing electric and magnetic quantities, the transformation of electrical variables unto the magnetic axis of a phase winding, to produce space representation of voltages and finally the addition of the three space phase voltages vectorially to produce the BEMF Space Vector.

In addition, the effect of load current and skewing of the rotor to reduce cogging torque has an effect on the BEMF Space Vector and these effects must be taken into consideration when implementing the BEMF Space Vector starting and commutation technique as articulated in the present invention.

A Brushless DC motor is operated by energizing two of its windings at a time. However, for efficient operation of the motor in a particular direction of rotation, the pair of windings to be energized is dependent on the rotor position. This section determines the windings to be energized for different rotor positions over a cycle of operation.

Figure 1A:
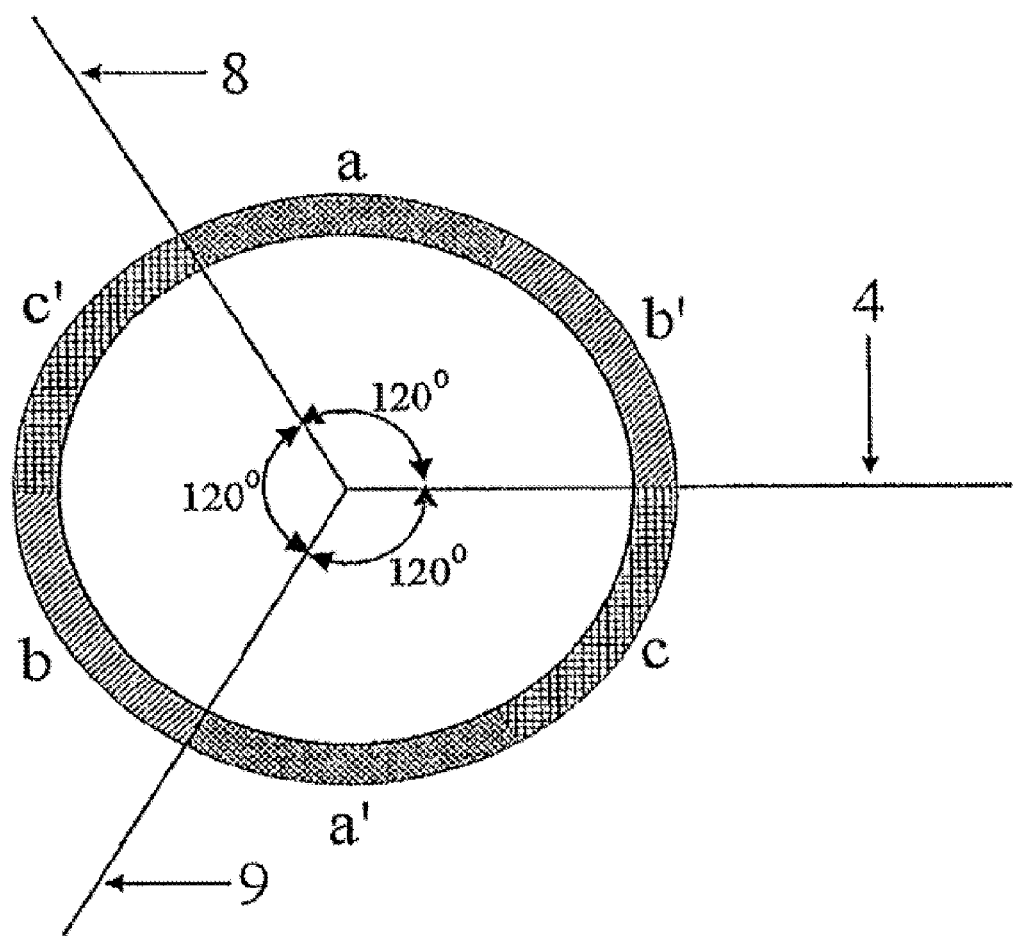
FIG. 1a displays a cross-sectional view of the stator windings of a two-pole, three-phase brushless dc motor.
Figure 1B:
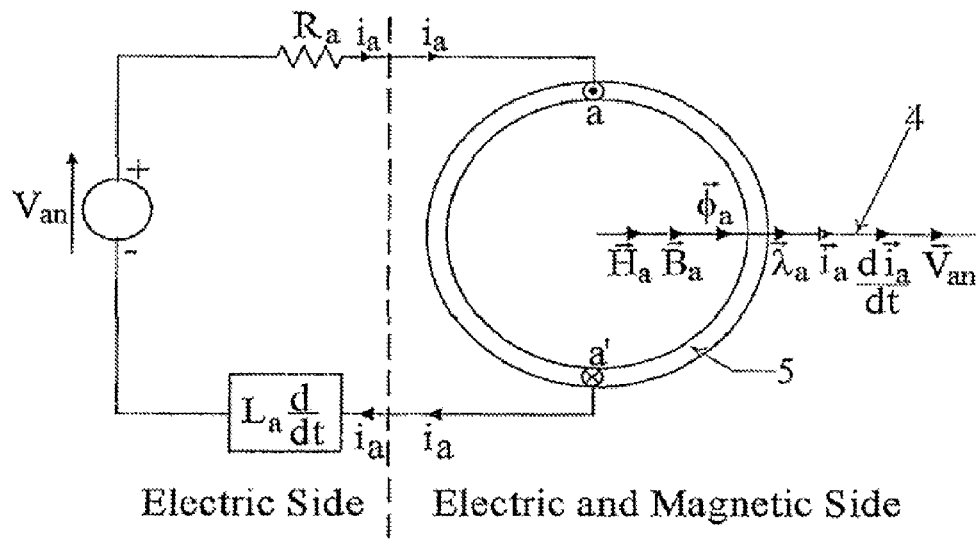
FIG. 1b displays one stator phase winding, represented by an electric side and an electric and magnetic side, of a two-pole, three-phase brushless dc motor.
Figure 1C:
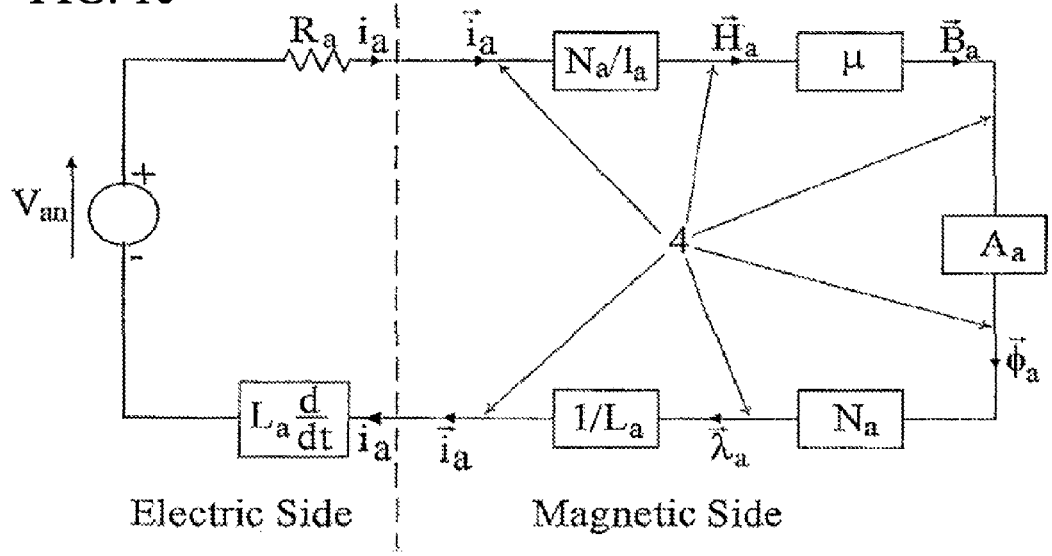
FIG. 1c displays the electric and magnetic circuits of one stator phase winding of a two-pole, three-phase brushless dc motor.
Figure 1D:
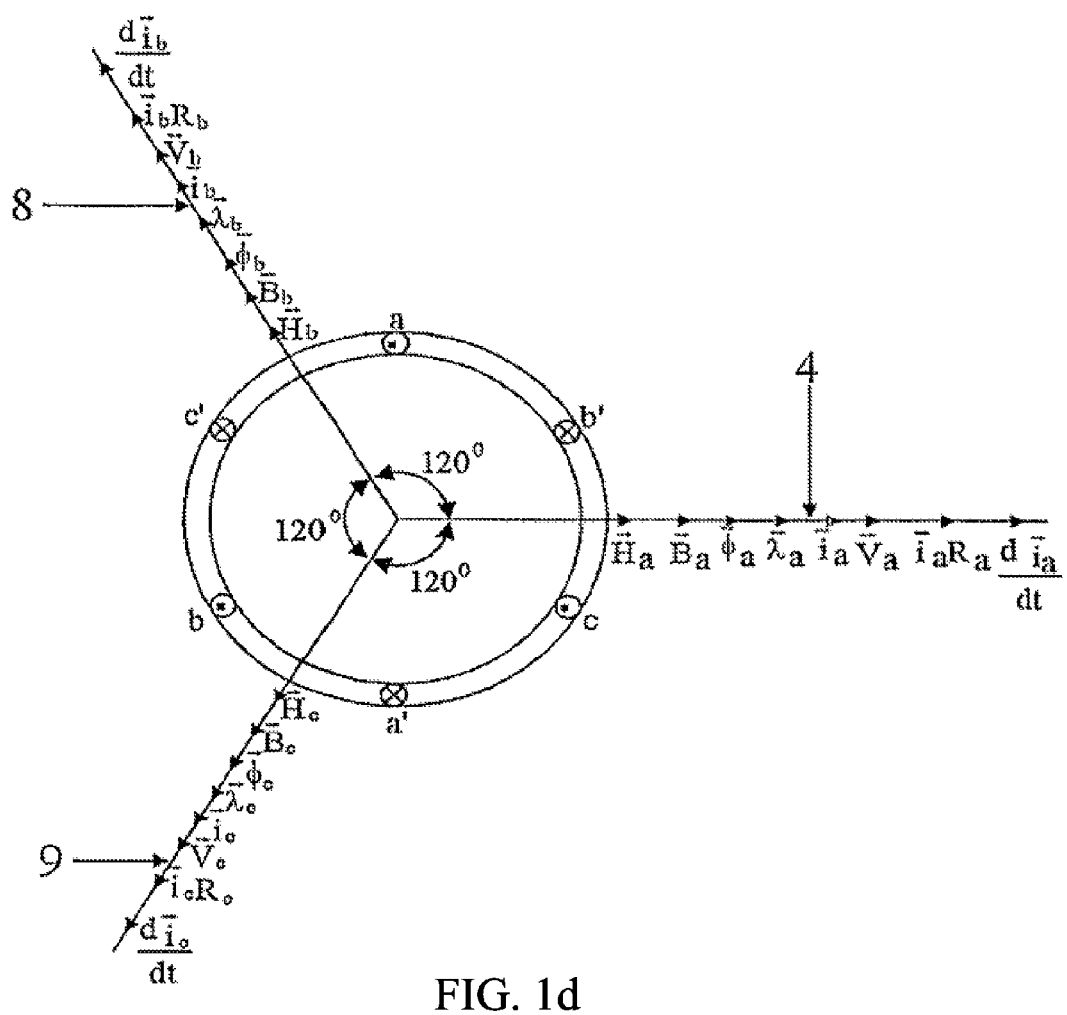
FIG. 1d shows the magnetic and electric quantities of each phase vectorially along the positive magnetic axis for each stator phase winding of a two-pole, three-phase brushless dc motor.
Figure 1E:
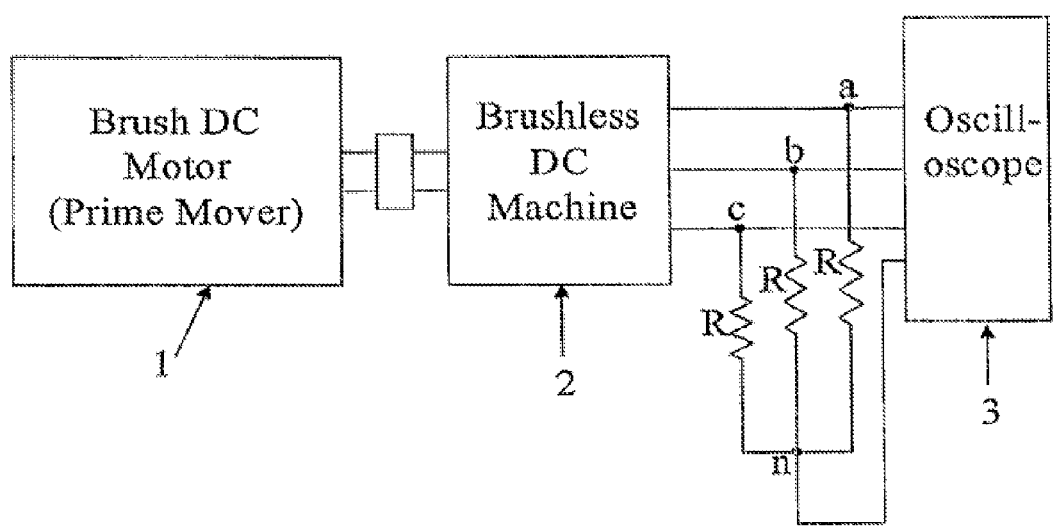
FIG. 1e is a block diagram of the Brushless DC motor being driven by a DC brush motor as a prime mover to display the three phase generated voltages.

When a three-phase Brushless DC Motor (2) is driven by a prime mover, like a Brush DC Motor (1) at constant speed, the rotating rotor flux induces voltages in the phase windings. These voltage waveforms are observed on an oscilloscope (3) using the resistor arrangement as shown in FIG. 1e. These generated phase voltages from the oscilloscope are shown in FIG. 2a. These generated phase voltages are trapezoidal in nature, having flat tops of 120 electrical degrees and positive and negative slopes each of 60 electrical degrees. Their magnitudes for a particular Brushless DC Machine are dependent on the speed of rotation. The three generated phase voltages $e_{an}$, $e_{bn}$, and $e_{cn}$ are displaced 120 electrical degrees from each other as shown in FIG. 2a, and their variations are dependent on rotor position, since, $$e = \frac{d\lambda}{dt} = \frac{d\theta}{dt} \cdot \frac{d\lambda}{d\theta} = \omega \frac{d\lambda}{d\theta}$$

where: e=generated voltage, $\lambda$=flux linkage, $\theta$=rotor position and $\omega$=angular velocity of the rotor. From the above equation, the generated voltage waveform is a function of rotor position, thereby providing an indication of the rotor position at any time.

Figure 3:
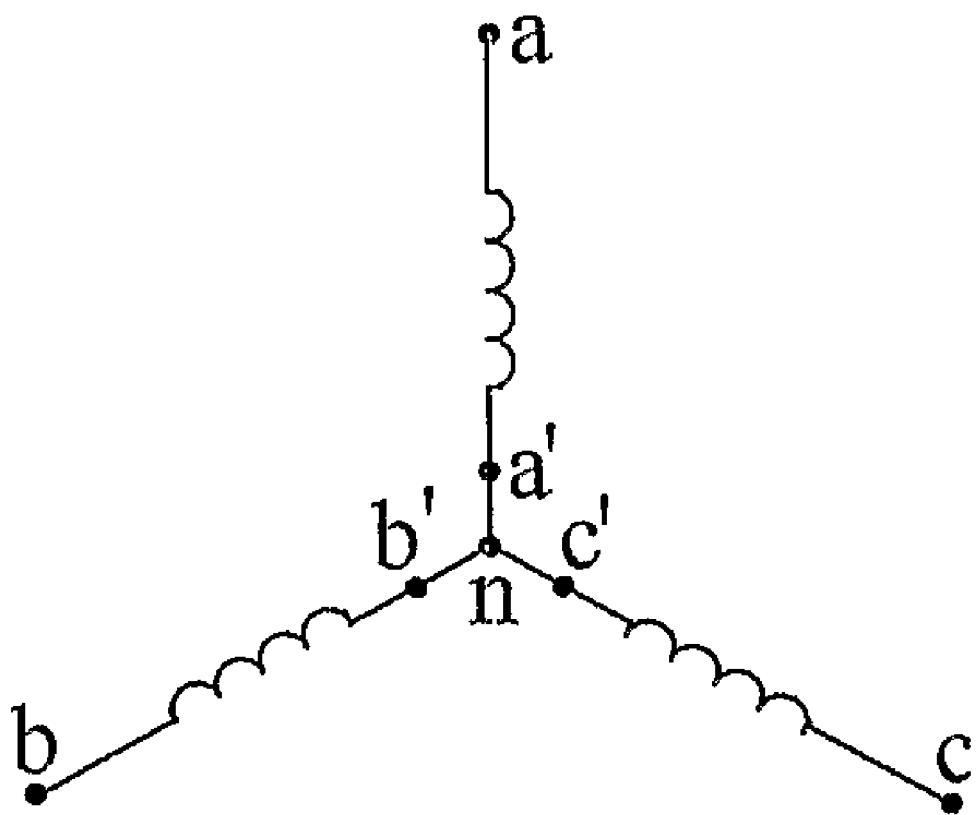
FIG. 3 shows the phase windings of the BLDC motor connected in a star arrangement.

FIG. 2a reveals that two phase voltages are of constant value for 60 electrical degrees and for a star connected stator as shown in FIG. 3, line voltage waveforms can be drawn from the two phase voltages, which are constant in value over a 60° internal. These line voltage waveforms are shown in FIG. 2b.

Since two phase windings of a star connected Brushless DC motor are experiencing a constant generated line voltage for 60 electrical degrees, then efficient operation of the motor is obtained when the two energized windings are experiencing its constant BEMF. Hence, the generated line voltages shown in FIG. 2b, which are functions of rotor position are used to determine the sequence of energization of the motor windings for a particular direction of rotation. Therefore using FIG. 2b, and starting with rotor position at $\theta=0°$, the windings should be energized ac, bc, ba, ca, cb, ab and ac again in that sequence, with each pair of phase windings being energized for 60 electrical degrees. FIG. 2c shows the line voltages for efficient motor operation, placing the supply voltages in phase with the generated or BEMF line values.

When the two phase windings are energized, and assuming that the previously energized winding loses the energy which was stored in its magnet field instantaneously when this winding was commutated, then the two energized windings would be experiencing half of the supply voltage, while the unenergized winding would be delivering its non constant BEMF during this 60° internal. The BEMF of the unenergized winding is either falling from its positive constant value to its negative constant value or the reverse during this 60° interval. This changing BEMF of the unenergized windings shown in FIG. 2d depicts the fundamental operating principle of the present invention, which is utilised in starting and commutating the Brushless DC motor of the present invention. The transformation of the two applied phase voltages of the conducting windings and the BEMF of the unenergized phase winding from scalar quantities into vector quantities, involves vector analysis of the three-phase stator.

Vector analysis of three-phase machines was first presented by Kovacs and Racz, later being detailed in a publication by Kovacs in 1984 and lays the foundation of vector analysis of three-phase machines. However, the approach and method of analysis lacks rigour in the production of electric current and supply voltage vectors.

The present invention by reduction to practice, utilises the concept of vector analysis as presented by Kovacs and Racz to produce a model of a stator winding, which includes electric and magnetic quantities, thereby demonstrating convincingly, that the magnitudes of electric scalar and magnetic vector currents are equal.

This said equality of electric scalar and magnetic vector currents, would enable the referring of electric scalar voltages to the magnetic axis of the winding. Kirchhoff's voltage law would then be applied to these spatial vector voltages to produce the supply voltage vector on the magnetic axis of the winding. The application of the above results to a three-phase BLDC motor, would allow the supply phase voltage vectors of the two energized windings together with the BEMF vector of the unenergized winding, to be added vectorially to produce the BEMF Space Vector for starting and commutating the BLDC motor.

Figure 4A:
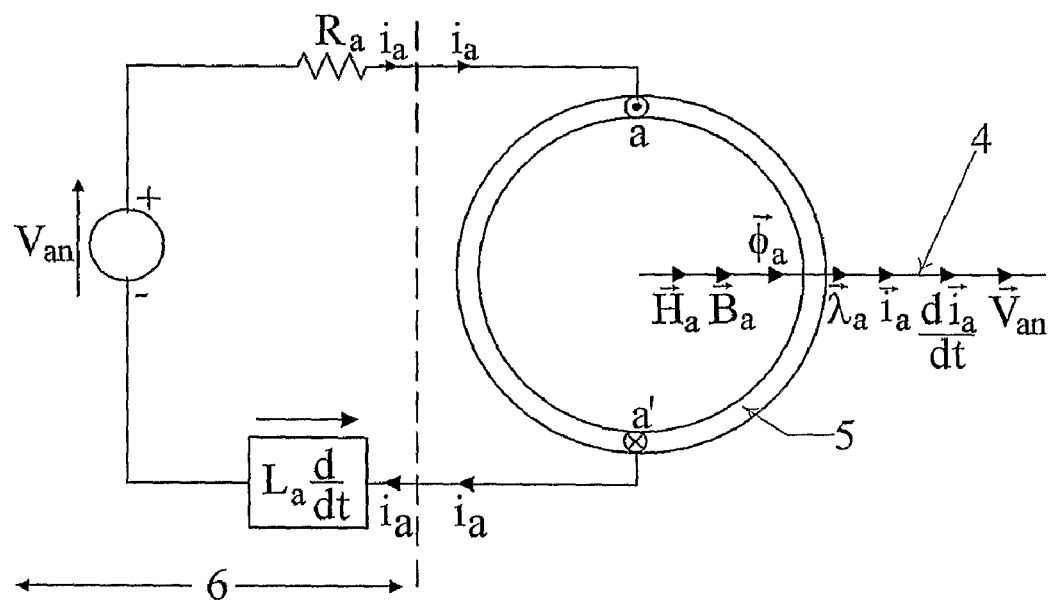
FIG. 4a shows a schematic diagram of the electric and electric and magnetic circuits of phase winding aa' for the present invention.

A Brushless DC motor is wound with a three-phase stator. One phase windings of a three-phase stator, showing only the center conducts of phase winding aa' and the rotor removed from the motor is shown in FIG. 4a. This phase winding possesses resistance, an electrical quantity and inductance, which is both an electrical and a magnetic quantity. Positive current $i_a$ is shown entering winding aa'. The winding resistance $R_a$ being an electrical quantity is removed from the winding together with $$L_a \frac{di_a}{dt},$$

which is an electrical voltage. These two quantities $R_a$ and $$L_a \frac{di_a}{dt}$$

are placed in the electric circuit (6) with the supply voltage $V_{an}$.

Figure 4B:
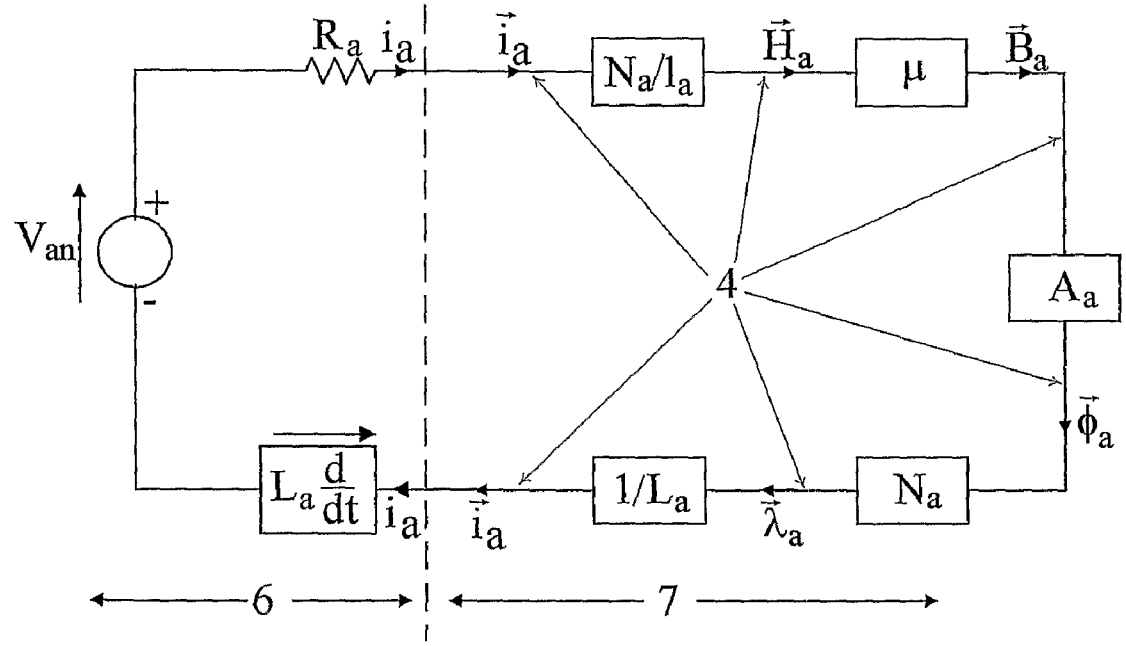
FIG. 4b shows the equivalent electric and magnetic circuits of phase winding aa' for the present invention.

FIG. 4b shows the equivalent electric and magnetic circuits joined together but separated from each other by the dotted line. The electric scalar current $i_a$, flows through the winding and produces vector magnetic field intensity $\vec{H}_a$ along the positive magnetic axis of winding aa' (4) as shown in FIG. 4a. The magnitude of $\vec{H}_a$, is obtained by Amperes Circuital Law and is given by $$\frac{i_a l_a}{N_a},$$

where $l_a$ is the length of the path of $\vec{H}_a$ and $N_a$ is the number of turns of winding aa'. The magnetic field intensity $\vec{H}_a$ produces flux density $\vec{B}_a$, which is co-linear with $\vec{H}_a$, and which magnitude is given by $\mu |\vec{H}_a|$, where $\mu$ is the permeability of the medium through which $\vec{B}_a$ flows. Flux density $\vec{B}_a$ produces flux $\vec{\phi}_a$, which is also co-linear with $\vec{B}_a$ and which magnitude is given by $|\vec{B}_a| A_a$ where $A_a$ is the cross-sectional area of concern. The flux linked with winding aa' is given by $\vec{\lambda}_a$, which is co-linear with $\vec{\phi}_a$ and which magnitude is given by $|\vec{\phi}_a| N_a$. And the flux linkage $\vec{\lambda}_a$ produces a current vector $\vec{i}_a$ which magnitude is given by $$\frac{|\vec{\lambda}_a|}{L_a}$$

which is co-linear with $\vec{\lambda}_a$. Hence magnetic quantities $\vec{H}_a$, $\vec{B}_a$, $\vec{\phi}_a$, $\vec{\lambda}_a$ and current vector $\vec{i}_a$ all lie along the positive magnetic axis aa' (4) and are spatial vector quantities possessing both magnitude and direction.

Since current vector $\vec{i}_a$ leaves the magnetic circuit (7) of FIG. 4b, a current vector $\vec{i}_a$ must also enter the series connected magnetic circuit (7). In addition, since the electric and magnetic circuits are connected in series, this implies that the scalar electric current $i_a$ is of same magnitude as the vector magnetic current $\vec{i}_a$. The separation of electric and magnetic circuits is shown by the dotted vertical line, with the magnetic current vector $\vec{i}_a$ taking up a scalar value when it enters the electric circuit (6) and the scalar electric current $i_a$ taking up a vector magnetic value when it enters the magnetic circuit (7) as shown in FIG. 4b. Hence the magnetic axis of winding aa' completes the electric circuit making $i_a$ and $|\vec{i}_a|$ of same magnitude.

If $i_a$ is changing, then the effect of the magnetic circuit on the electric circuit is seen in the voltage $$L_a \frac{di_a}{dt}$$

which opposes the current $i_a$. Since the magnitude of $i_a$ and $\vec{i}_a$ are equal and $\vec{i}_a$ lies along the winding's magnetic axis, then the voltages $i_a R_a$ and $$L_a \frac{di_a}{dt}$$

can be referred to the magnetic axis of winding aa' without changing their magnitudes. The vector summation of $\vec{i}_a R_a$ and $$L_a \frac{d\vec{i_a}}{dt}$$

along the magnetic axis of winding aa', produces the supply voltage vector $\vec{V_{an}}$ along the magnetic axis of winding aa'.

Figure 4C:
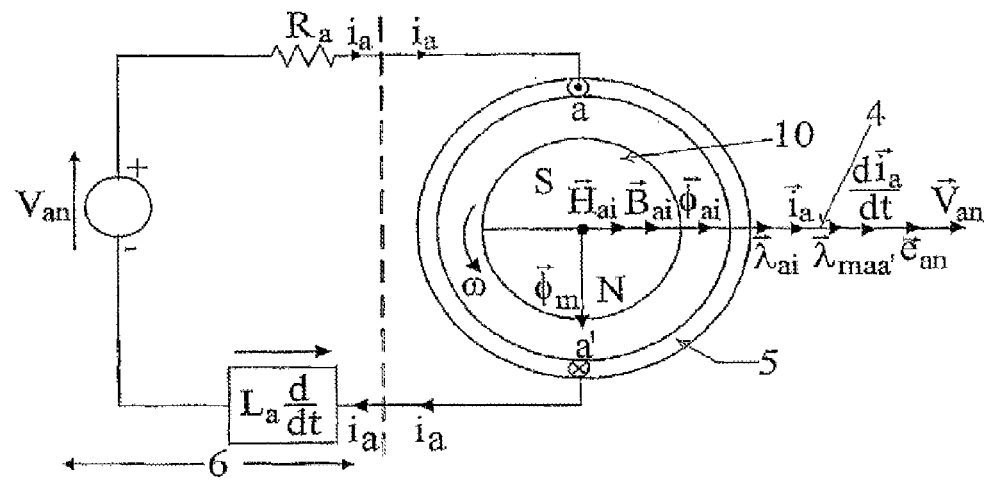
Figure 4D:
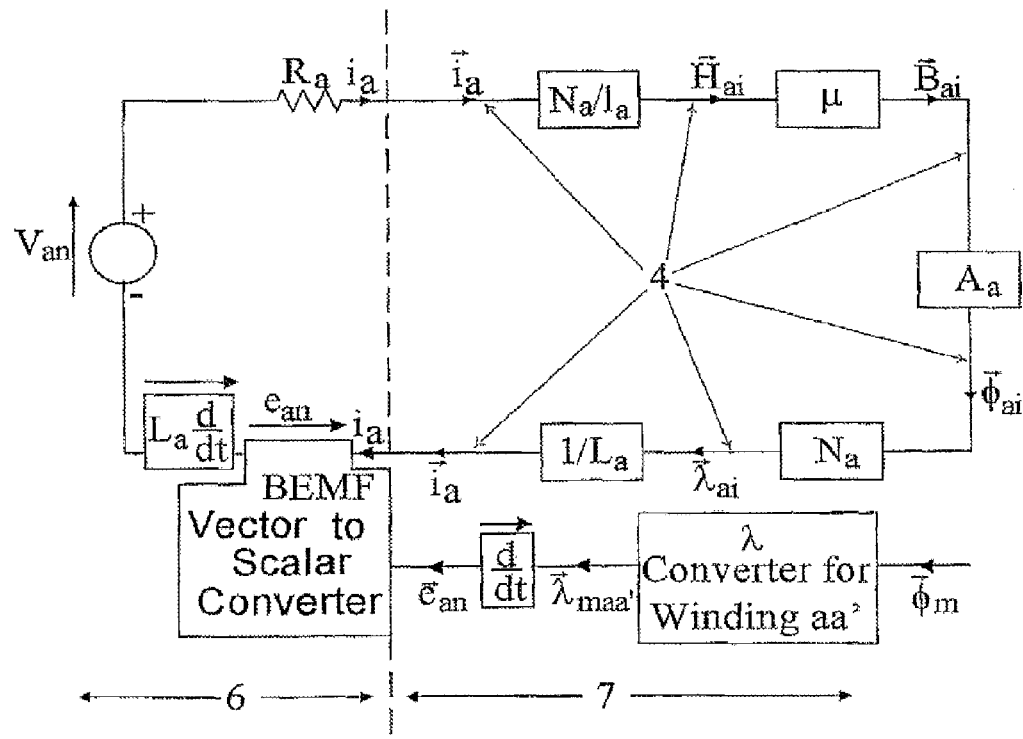
FIG. 4d shows the equivalent electric and magnetic circuits of phase winding aa' and the effect of the rotating rotor magnet for the present invention.

When the rotor (10) is inserted in the motor as shown in FIG. 4c and the motor is running, the generated voltage vector or BEMF vector in winding aa' is given by $\vec{e_{an}}$ where $$\vec{e_{an}} = \frac{d\vec{\lambda_{maa'}}}{dt}$$

and $\vec{\lambda_{maa'}}$ is the flux linkage vector produced by the rotor magnet flux vector $\vec{\phi_m}$ on winding aa' as shown in FIG. 4d. This BEMF vector $\vec{e_{an}}$ existing on the magnetic axis of FIG. 4d is converted to the scalar BEMF $e_{an}$ on the electric side of by the BEMF Vector to Scalar Converter block of FIG. 4d. The magnetic quantities which are produced by the vector current $\vec{i_a}$ are given by $\vec{H_{ai}}$, $\vec{B_{ai}}$, $\vec{\phi_{ai}}$ and $\vec{\lambda_{ai}}$ in FIG. 4d.

Applying Kirchhoff's voltage law to the electric and magnetic sides of FIG. 4d yields, $$V_{an} = i_a R_a + L_a \frac{d i_a}{dt} + e_{an}$$

for the electric side and $$\vec{V_{an}} = \vec{i_a} R_a + L_a \frac{d\vec{i_a}}{dt} + \vec{e_{an}}$$

for the magnetic side.

Figure 5:
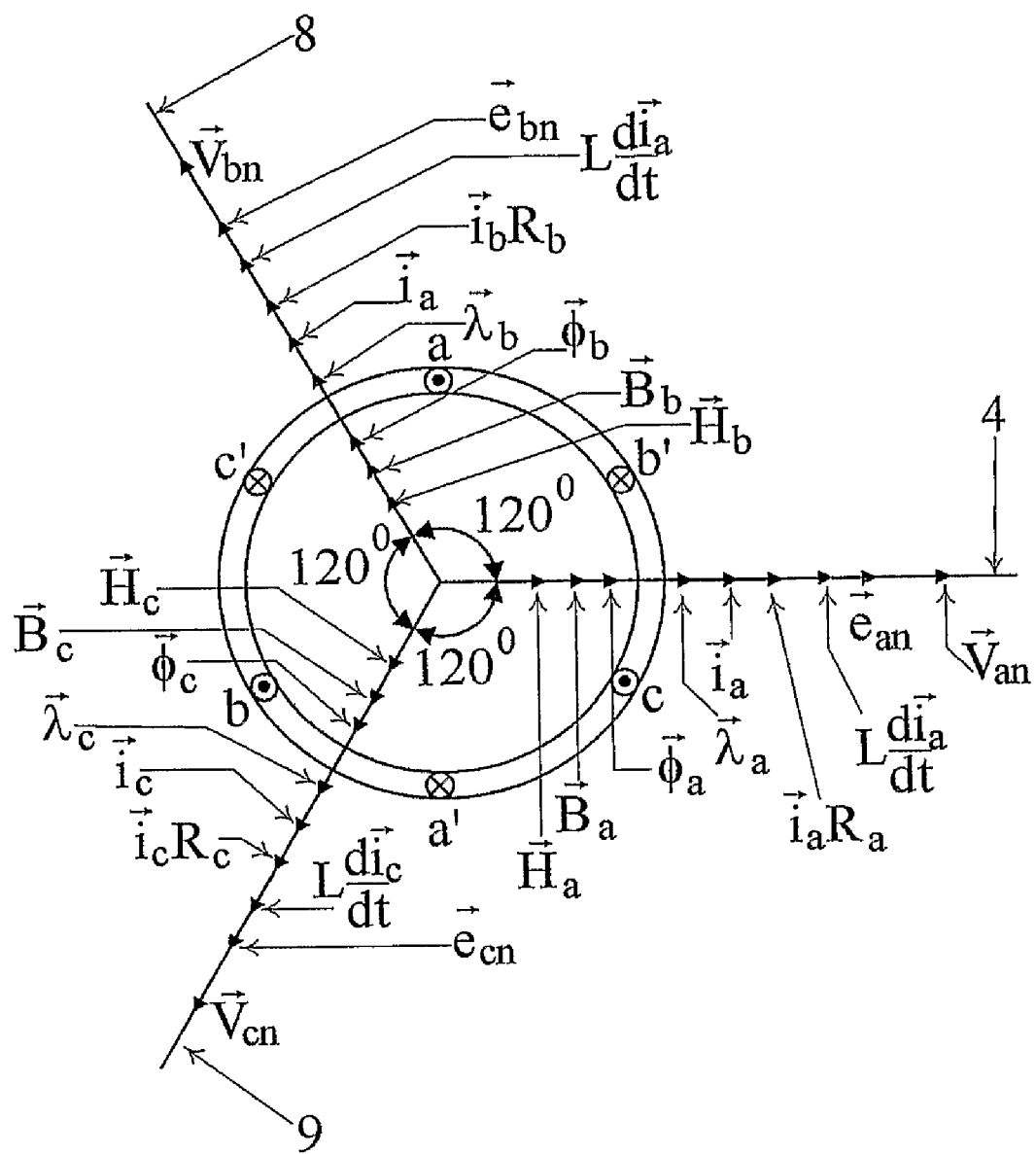
FIG. 5 depicts the three-phase BLDC motor stator with magnetic and electric quantities of each phase winding lying along their magnetic axis for the present invention.

The method as heretofore outlined, allows the magnetic and electrical quantities of a stator winding in a Brushless DC motor to be represented vectorially along the winding's magnetic axis. When this technique is applied to the three phases of a three-phase, two-pole Brushless DC motor, which phase windings are displaced from each other by 120 electrical degrees, the magnetic and electric quantities of each phase can be represented vectorially along the positive magnetic axis for phase winding aa' (4), positive magnetic axis for phase winding bb' (8) and positive magnetic axis for phase winding cc' (9) as shown in FIG. 5.

Having proven that all electric phase voltage quantities can be represented along the magnetic axis of a plane winding, the magnetic properties of the three-phase stator of a Brushless DC motor, due to energization of two phase windings in a particular sequence, will be developed to allow the torque production mechanism of the Brushless DC motor to be presented.

Figure 6:
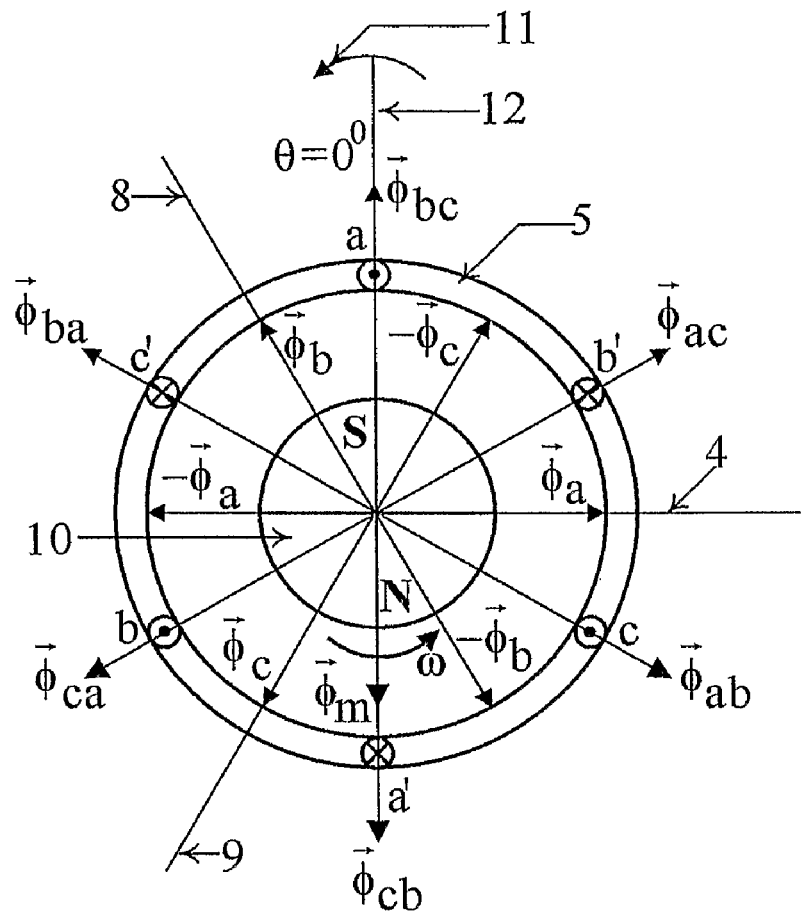
FIG. 6 depicts a vector diagram of the flux vectors of each phase winding, the resultant flux space vector of a pair of windings when the motor is energized with the line voltages of FIG. 2c and the flux vector of the rotor magnet for the present invention.

FIG. 6 contains a three-phase stator (5) of a 2-pole Brushless DC motor, showing the center conductors of each phase winding and the positive magnetic axis for phase winding aa' (4), positive magnetic axis for phase winding bb' (8) and positive magnetic axis for phase winding cc' (9). The magnetic properties of each phase winding is determined when the star connected stator is energized in the sequence ac, bc, ba, ca, cb and ab to complete one cycle of energization. The first letter in a winding pair, indicates that current enters that phase winding at that lettered terminal and the last letter indicate that current leaves that phase winding at that lettered terminal. These winding terminals are shown in FIG. 3. Energization of the stator windings in the sequence ac, bc, ba, ca, cb and ab produces stator flux vectors $\vec{\phi_{ac}}$, $\vec{\phi_{bc}}$, $\vec{\phi_{ba}}$, $\vec{\phi_{ca}}$, $\vec{\phi_{cb}}$, and $\vec{\phi_{ab}}$ respectively.

These stator flux vectors are all of equal magnitude and occupy a fixed position in the stator. The stationery stator flux vectors are displaced from each other by an angle of 60 electrical degrees and their magnitudes are dependent on the current flowing in the phase windings. If the 2-pole rotor magnet (10) is assumed to be moving at a constant angular velocity ω in an anticlockwise direction, then, at the instant of observation in FIG. 6, it's d-axis (12) which is defined as the center of the south pole is at θ=0°.

At this rotor position θ=0°, windings ac would begin to experience its constant BEMF due to the effect of the rotor magnet on the stator windings. The energization of windings ac produces the stationary stator flux vector $\vec{\phi_{ac}}$. Since $\vec{\phi_{ac}}$ and all the other stationary stator flux vectors are entering the stator body, they are described as producing south poles of an electromagnet. The rotor magnet has its flux leaving the north pole and entering the south pole. Representing the rotor flux vector as $\vec{\phi_m}$, then the interaction of $\vec{\phi_m}$ with $\vec{\phi_{ac}}$ develops torque to produce rotor rotation in an anticlockwise direction. The electromagnetic torque developed by the interaction of these flux vectors is given by the vector cross product by Vas, $$\vec{Te} = C\vec{\phi_m} \times \vec{\phi_{ac}}$$

$$\vec{Te} = C|\vec{\phi_m}||\vec{\phi_{ac}}|\sin\alpha\,\vec{k}$$

where $\vec{Te}$ is the electromagnetic torque developed by the motor, α is the angle between flux vectors $\vec{\phi_m}$ and $\vec{\phi_{ac}}$, C is a constant and $\vec{k}$ is the unit vector whose direction is perpendicular to the plane in which $\vec{\phi_m}$ and $\vec{\phi_{ac}}$ exists.

As the motor rotates from its initial position θ0=0° in an anticlockwise direction that is for θ increasing (11), the angle α decreases from 120°, thereby increasing the electromagnetic torque developed by the motor. When α=90°, the developed torque is maximum, but as α reaches 60°, it decreases to the value when θ was 0°. When θ>60° or α<60° the BEMF in windings ac is no longer at its constant value for this speed of operation as shown in FIGS. 2a-2d, and the electromagnetic torque developed would be less than the values obtained for 60°≦α≦120°.

Figure 7:
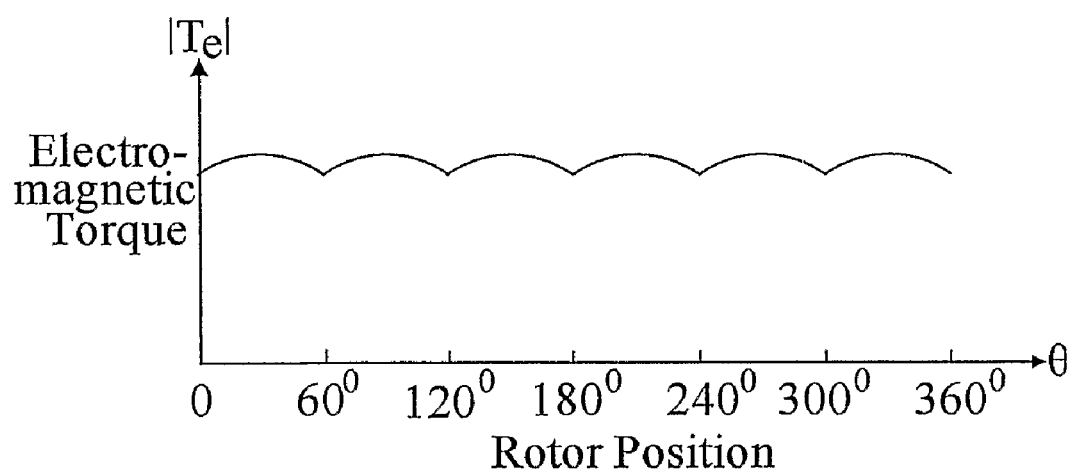
FIG. 7 depicts the electromagnetic torque waveform developed by the motor for one revolution of the rotor for the present invention.

Hence, winding aa' must be commutated and winding bb' must be brought into conduction with winding cc'. That is, windings be must be energized at θ=60°. The same process of torque production continues until θ=120° and a new pair of windings ba is brought into conduction. The electromagnetic torque developed by the machine is not constant through each 60° movement of the rotor and is given by $$\vec{T_e} = m \sin\alpha\,\vec{k}$$

where m=$C|\vec{\phi_m}||\vec{\phi_{ac}}|$ and 60°≦α≦120°. The electromagnetic torque developed by the motor for one revolution of the rotor is depicted in FIG. 7.

The heretofore described events are for efficient operation in the three-phase Brushless DC motor showing the range of rotor positions for a pair of windings to remain energized and the corresponding BEMF of the given energized windings and the torque developed are summarised in Table 1.

TABLE 1

| Windings Energized | Rotor Position Range | Constant BEMF | Electromagnetic Torque Developed $60° \leq \alpha \leq 120°$ |
|---|---|---|---|
| ac | $0 \leq \theta \leq 60°$ | $E_{ac}$ | $mSin\alpha$ |
| bc | $60 \leq \theta \leq 120$ | $E_{bc}$ | $mSin\alpha$ |
| ba | $120 \leq \theta \leq 180$ | $E_{ba}$ | $mSin\alpha$ |
| ca | $180 \leq \theta \leq 240$ | $E_{ca}$ | $mSin\alpha$ |
| cb | $240 \leq \theta \leq 300$ | $E_{cb}$ | $mSin\alpha$ |
| ab | $300 \leq \theta \leq 360$ | $E_{ab}$ | $mSin\alpha$ |

Having described the torque production mechanism of the motor as it relates to rotor position and windings energization, the technique of the present invention will now be described to commutate phase windings and produce the required sequence of energization for efficient motor operation.

In order to provide an efficient energy conversion process in the conversion of electrical energy into mechanical energy through the development of electromagnetic torque, the rotor position must be known to ensure that the two phase windings are energized at the correct instant. The BEMF Space Vector is obtained by vectorially summing the phase voltage vectors of the energized windings with the BEMF vector of the unenergized winding.

If the three-phase Brushless DC motor is being commutated for efficient operation and running at constant speed ω, the supply and BEMF waveforms are shown in FIGS. 2a-2d. Since the phase applied voltage vectors and BEMF vector lie on the phase magnetic axes and the axes are displaced 120 electrical degrees from each other as shown in FIG. 5, the phase voltage vectors can be added vectorially to produce a BEMF Space Vector $\vec{V_R}$ where, $$\vec{V_R} = \vec{V_{an}} + \vec{V_{bn}} + \vec{V_{cn}}$$

where $\vec{V_{an}}$, $\vec{V_{bn}}$ and $\vec{V_{cn}}$ represent the voltage vectors of windings aa', bb' and cc' respectively and lie along their magnetic axes and $$\vec{V_R} = v_{an} e^{j0°} + v_{bn} e^{j120°} + v_{cn} e^{j240°}$$

where $v_{an}$, $v_{bn}$ and $v_{cn}$ represents the instantaneous voltages of phase windings aa', bb' and cc' respectively and $e^{j0°}$, $e^{j120°}$, and $e^{j240°}$ represents the position of the positive magnet axes of windings aa', bb' and cc' respectively. Considering no-load conditions and starting with the d-axis at rotor position θ=0°, windings ac are energized with the supply voltage V. Assuming commutation of the current in the previous phase winding is completed, then $$V_{an} = \frac{V}{2}, V_{nc} = \frac{V}{2} \therefore V_{cn} = -\frac{V}{2}.$$

Representing the constant phase BEMF as E and the varying phase BEMF as e; then for motor operation V/2>E. But under no-load conditions V/2≈E, since the line currents are small. With the d-axis at θ=0° using the waveforms of FIGS. 2a-2d:

$$v_{bn} = -E \approx -\frac{V}{2}$$

$$\therefore \vec{V_{R1}} = \frac{V}{2} - \frac{V}{2} e^{j120°} - \frac{V}{2} e^{j240°} = V e^{j0°}$$

where $\vec{V_{R1}}$ is the BEMF Space Vector at θ=0°.

It must be noted from FIG. 6 that the d-axis (12) position at θ=0° leads the real positive axis by 90°. With the d-axis at θ=30° and using the waveforms of FIGS. 2a-2d, $$V_{an} = \frac{V}{2}, V_{bn} = 0, V_{cn} = -\frac{V}{2}$$

$$V_{R1\_2} = \frac{V}{2} - \frac{V}{2} e^{j240°} = 0.866 e^{j30°}$$

where $\vec{V_{R1\_2}}$ is the BEMF Space Vector at rotor position θ=30° and for rotor position θ=60°, the waveforms of FIGS. 2a-2d reveals $$V_{an} = \frac{V}{2}, V_{bn} = E \approx \frac{V}{2}, V_{cn} = -\frac{V}{2}$$

$$\vec{V_{R2}} = \frac{V}{2} + \frac{V}{2} e^{j120°} - \frac{V}{2} e^{j240°} = V e^{j60°}$$

Figure 8:
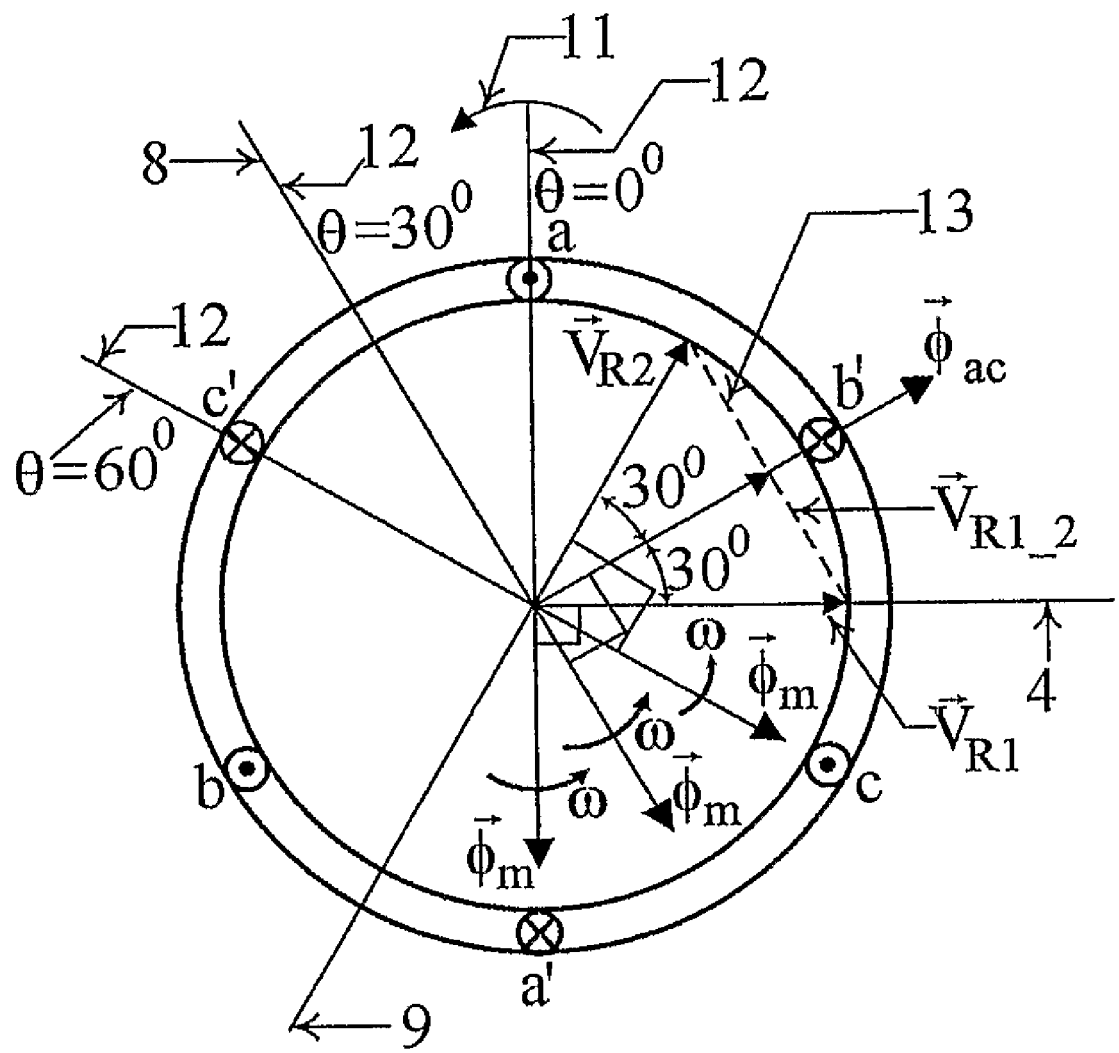
FIG. 8 depicts a vector diagram of the trajectory of the BEMF Space Vector for d-axis movement in the range $0° \leq \theta \leq 60°$ for the present invention.

When the d-axis (12) of the rotor is at position θ=0°, 30° and 60°, the BEMF Space Vector $\vec{V_R}$ is at $e^{j0°}$, $e^{j30°}$ and $e^{j90°}$ respectively as shown in FIG. 8. For d-axis (12) at θ=0° and 60° in FIG. 8, the BEMF Space Vector is of magnitude V and at θ=30°, the BEMF Space Vector magnitude is 0.866V. Hence, the trajectory of the BEMF Space Vector for the sector (13) for θ increasing (11) in the range 0°≤θ≤60° is along the base of a triangle whose adjacent sides are given by the BEMF Space Vectors at θ=0° and θ=60° as shown in FIG. 8.

It is observed in FIG. 8 that the BEMF Space Vector $\vec{V_R}$ follows the d-axis of the rotor magnet and lags it by 90 electrical degrees. This ability of the BEMF Space Vector to follow the d-axis of the rotor is due to the fact that the BEMF of the unenergized winding is employed in the determination of the BEMF Space Vector and this BEMF is a function of rotor position, since for unenergized winding bb', $$e_{bn} = \frac{d\lambda_{mbb'}}{dt} = \frac{d\lambda_{mbb'}}{d\theta} \cdot \frac{d\theta}{dt} = \omega \frac{d\lambda_{mbb'}}{d\theta}$$

and hence $e_{bn}$ is a function of θ. Hence, the BEMF Space Vector $\vec{V_R}$ is fixed to the rotor provided rotor is not at standstill. Therefore, this BEMF Space Vector possesses rotor position information, and lags the d-axis of the rotor magnet by 90 electrical degrees. The angle made by the BEMF Space Vector with the real axis provides rotor position information in this invention.

Since a new pair of windings are energized by the dc supply for every 60 electrical degree movement of the d-axis from its starting point at θ=0°, then for every 60 electrical degree movement of the BEMF Space Vector from its starting position at $e^{j0°}$, a new pair of windings are energized by the dc bus.

The magnitude and location of the BEMF Space Vector for every 60 electrical degrees movement of the rotor's d-axis starting at θ=0°, together with the new pair of windings to be energized for these angles are shown in Table 2.

TABLE 2

| Position of d-axis θ | BEMF Space Vector | New Windings Energised |
|---|---|---|
| 0° | $\vec{V_{R1}} = Ve^{j0°}$ | ac |
| 60° | $\vec{V_{R2}} = Ve^{j60°}$ | bc |
| 120° | $\vec{V_{R3}} = Ve^{j120°}$ | ba |
| 180° | $\vec{V_{R4}} = Ve^{j180°}$ | ca |
| 240° | $\vec{V_{R5}} = Ve^{j240°}$ | cb |
| 300° | $\vec{V_{R6}} = Ve^{j300°}$ | ab |
| 360° | $\vec{V_{R1}} = Ve^{j360°}$ | ac |

Figure 9:
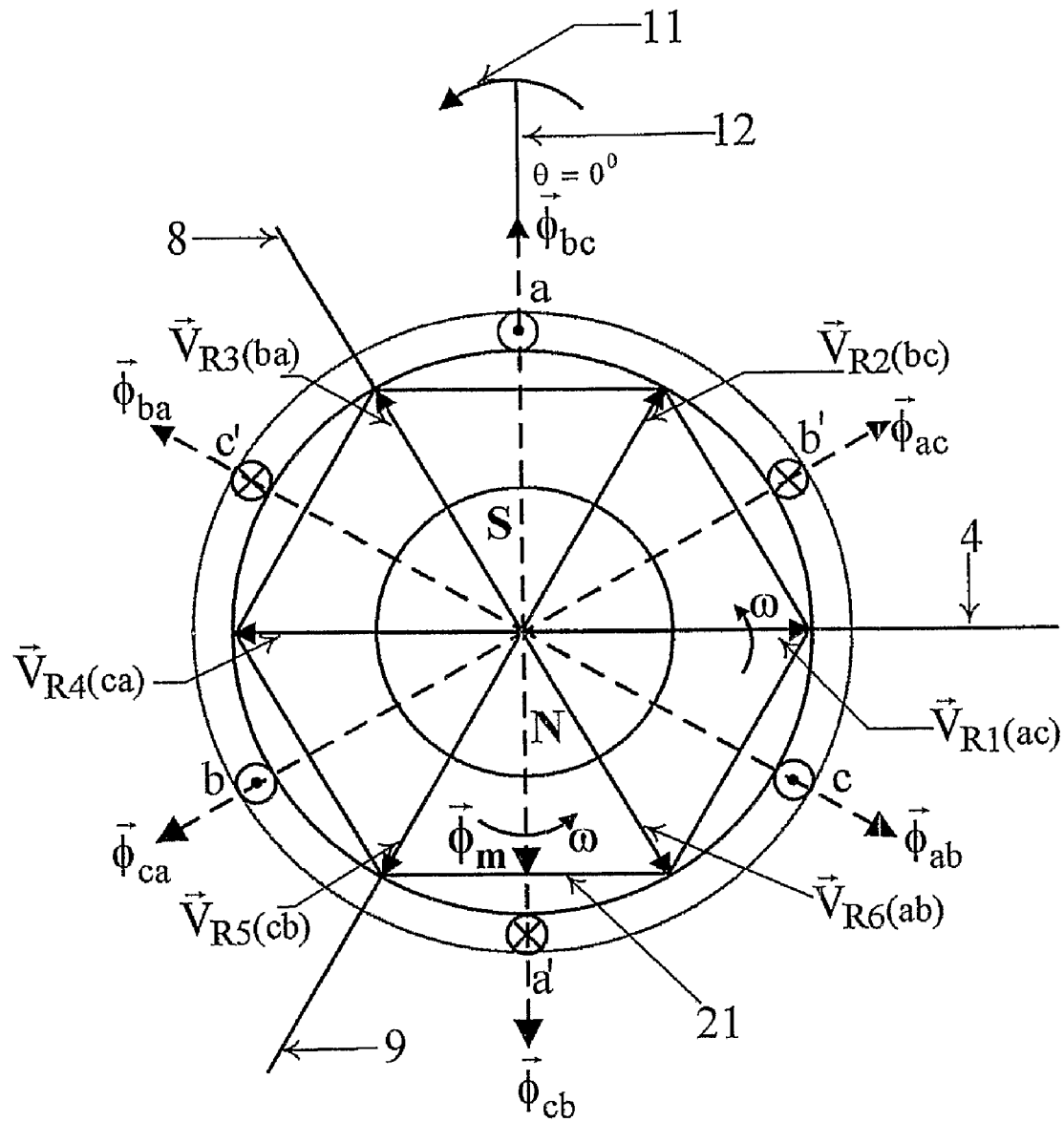
FIG. 9 depicts a vector diagram of the trajectory of the BEMF Space Vector for one complete rotation of the d-axis, that is, $0° \leq \theta \leq 360°$ for the present invention.

A plot of the BEMF Space Vector for $0 \leq \theta \leq 360°$ has a trajectory of a hexagon as shown in FIG. 9. Also included in FIG. 9 are the stationary flux vectors obtained by energizing two windings in the sequence for anticlockwise rotation of rotor and the positive magnetic axes for each phase winding. FIG. 9 shows that as the rotor rotates at a constant angular velocity ω rad/s, the BEMF Space Vector $\vec{V_R}$ rotates with the same angular velocity ω rad/s but lags the rotor's d-axis by 90 electrical degrees. The trajectory of the BEMF Space Vector (21) is a hexagon as shown in FIG. 9.

In this invention, the commutation of phase windings and the connection of the pair of windings to the supply for efficient operation of the motor are accomplished with the use of the said BEMF Space Vector. When the BEMF Space Vector reaches the real positive axis, $\vec{V_R} = \vec{V_{R1}} = Ve^{j0°}$ as shown in FIG. 9. At this position of the BEMF Space Vector, the d-axis of the rotor magnet is at θ=0°. At this angle of θ, the phase winding bb' must be commutated and the windings ac must be connected to the supply voltage. When the BEMF Space Vector reaches $\vec{V_{R2}} = Ve^{j60°}$, phase winding aa' is commutated and the new winding pair be is connected to the supply voltage. For efficient motor operation, the locations of the BEMF Space Vector shown in Table 2 are used to commutate a phase winding and apply a pair of phase windings to the dc supply.

Although the BEMF Space Vector possesses magnitude and direction, it is only the angle that this space vector makes with the real axis and not its magnitude which is used to commutate a phase winding and ensure that the correct pair of windings is energized for efficient operation of the Brushless DC motor. Hence, the magnitude of the BEMF which is proportional to the speed of motor operation is not directly utilised in the present invention, but the angle that this BEMF Space Vector makes with the real axis or its resolver information is used in this invention.

The self-starting ability of the present invention together with ensuring that motor operation is in one direction only on starting; thereby eliminating backward rotation of the motor will now be addressed. To ensure motor operation in one direction only when the motor is started from rest, the motor must first be parked along one of the stationary stator flux vectors shown in FIG. 9. Parking the rotor's d-axis at θ=0° or the north pole of the rotor magnet along the stationary stator flux vector $\vec{\phi_{cb}}$ is accomplished by energizing windings cb in FIG. 9. When windings cb are energized, electromagnetic torque is developed due to the interaction of rotor flux vector $\vec{\phi_m}$ and stationary stator flux vector $\vec{\phi_{cb}}$ shown in FIG. 9. This electromagnetic torque pulls the rotor flux vector $\vec{\phi_m}$ into alignment with $\vec{\phi_{cb}}$, thereby aligning the d-axis of the rotor, the south pole of the rotor magnet, to the θ=0° position.

After a short time interval when the rotor has settled in the θ=0° position, the motor is started from standstill in an anti-clockwise direction by energizing phase windings ac. The parking of the rotor's d-axis at θ=0° and energization of windings ac ensures only anticlockwise forward rotation by the motor on starting and eliminates any possible backward rotation of the motor in the starting process. With windings ac energized at θ=0°, the starting electromagnet torque developed by the motor is given by $$T_e = C\vec{\phi_m} \times \vec{\phi_{ac}}.$$

The magnitude of $\vec{\phi_{ac}}$ is dependent on the winding currents, which in turn depends on the supply voltage and BEMF of the phase windings. At standstill, the BEMF generated in the windings is zero and the windings currents are high enough to develop electromagnetic torque to overcome friction, inertia and any load torques; which oppose the electromagnetic torque. The torque equation is given by:

$$T_e = T_I + T_F + T_L$$

where $T_I$ is the inertia torque, $T_F$ is the friction torque and $T_L$ is the load torque. As the rotor accelerates from rest, the stator windings develop BEMFs due to rotation of the rotor magnetic field. The BEMFs generated in the energized windings decreases the winding currents, which in turn decreases the magnitude of the stationary stator flux vector $\vec{\phi_{ac}}$; thus decreasing the electromagnetic torque developed by the motor.

The resultant voltage vector at the instant of starting is produced by the phase voltage vectors of the energized windings alone, since the BEMF of the unenergized winding is zero at starting. This resultant voltage vector $\vec{V_R}$ is stationary and of constant magnitude. However, it is the BEMF vector in the unenergized phase winding bb', which is non-zero and varying when the motor starts to turn, as a result of the electromagnetic torque developed on starting which when added to the stationary phase voltage vectors of the energized windings, produces the BEMF Space Vector.

The BEMF $e_b$ on phase winding bb' is zero at θ=0° and as θ increases, $e_b$ goes negative and then goes through a zero crossing, then goes positive in value to its constant value $$E \approx \frac{V}{2}$$

as shown in FIG. 2a. This variation of $e_b$ causes the BEMF Space Vector $\vec{V_R}$ to start along the $\vec{\phi_{ac}}$ stationary flux vector at $e^{j30°}$, then, rotate backwards before rotating in the forward anticlockwise direction. When $e_b$ is at it's zero crossing, $\vec{V_R}$ is again at the position $e^{j30°}$, when $$e_b = E \approx \frac{V}{2},$$

$\vec{V_R}$ is at the $e^{j60°}$ position and phase winding aa' must be commutated and winding be connected to the supply. The rotor continues to develop torque for θ is now 60° and $\vec{\phi_m}$ interacts with $\vec{\phi_{bc}}$ in the torque production process.

The six angles of the BEMF Space Vector in Table 2 are used to connect new windings to the supply thus sustaining rotation and bringing the motor up to steady-state speed for the supply voltage of V. This self-starting ability of the present invention separates it from all of the other sensorless techniques used for the commutation of Brushless DC motors. The self-same technique used to commutate windings in steady-state operation of the present invention is used to start the motor from rest under no-load and load conditions.

Figure 10:
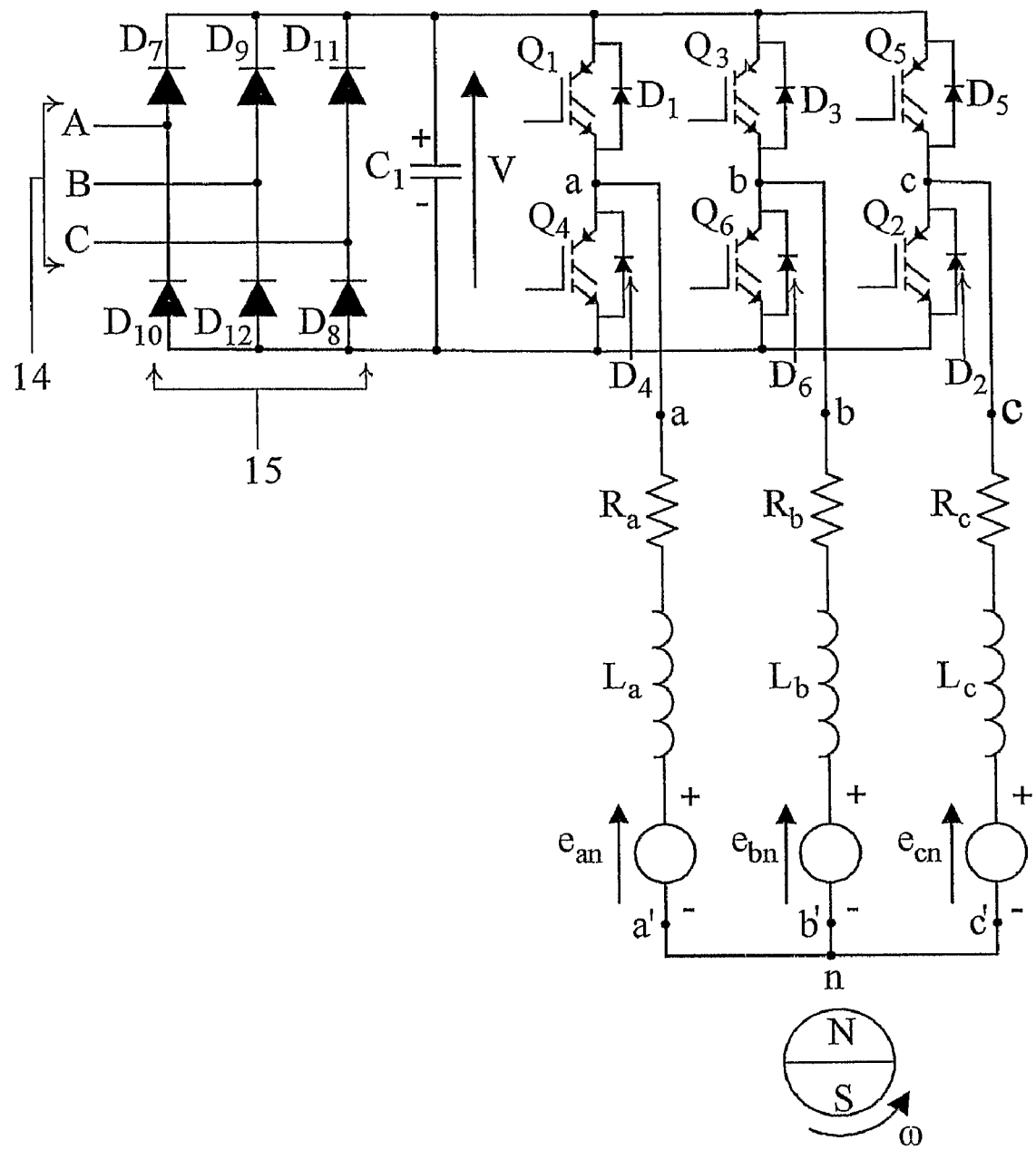
FIG. 10 depicts a schematic diagram of the three-phase rectifier and inverter circuits used to power a motor and the equivalent circuit of a BLDC motor.

In order to connect two-phase windings to the dc supply and change the winding pair to achieve efficient operation of the Brushless DC motor, the circuit shown in FIG. 10 is used. It consists of a three-phase bridge rectifier (15) consisting of diodes $D_7$ through $D_{12}$ supplied by a three-phase voltage supply (14), a filter Capacitor $C_1$ to supply the DC bus voltage V, and six insulated-gate bipolar transistors (IGBTs) forming a three-phase H-bridge inverter and consisting of transistors $Q_1$ through $Q_6$ and their anti-parallel diodes $D_1$ through $D_6$. An electrical model of the Brushless DC motor with its three phase winding aa', bb' and cc' is also presented. Table 3 shows the transistors to be turned on for motor operation in an anticlockwise direction. The BEMF Space Vector determined earlier reflected motor operation on no-load when the winding currents were small in comparison to full load currents. Under these no-load conditions, the current in the winding which is being commutated is small and decays very quickly through one of the transistor anti-parallel diodes as depicted in FIG. 10.

TABLE 3

| BEMF Space Vector Angle | Windings to be Energised | Transitions to be turned on |
| --- | --- | --- |
| 0° | ac | $Q_1$ and $Q_2$ |
| 60° | bc | $Q_2$ and $Q_3$ |
| 120° | ba | $Q_3$ and $Q_4$ |
| 180° | ca | $Q_4$ and $Q_5$ |
| 240° | cb | $Q_5$ and $Q_6$ |
| 300° | ab | $Q_6$ and $Q_1$ |
| 360° or 0° | ac | $Q_1$ and $Q_2$ |

Figure 11:
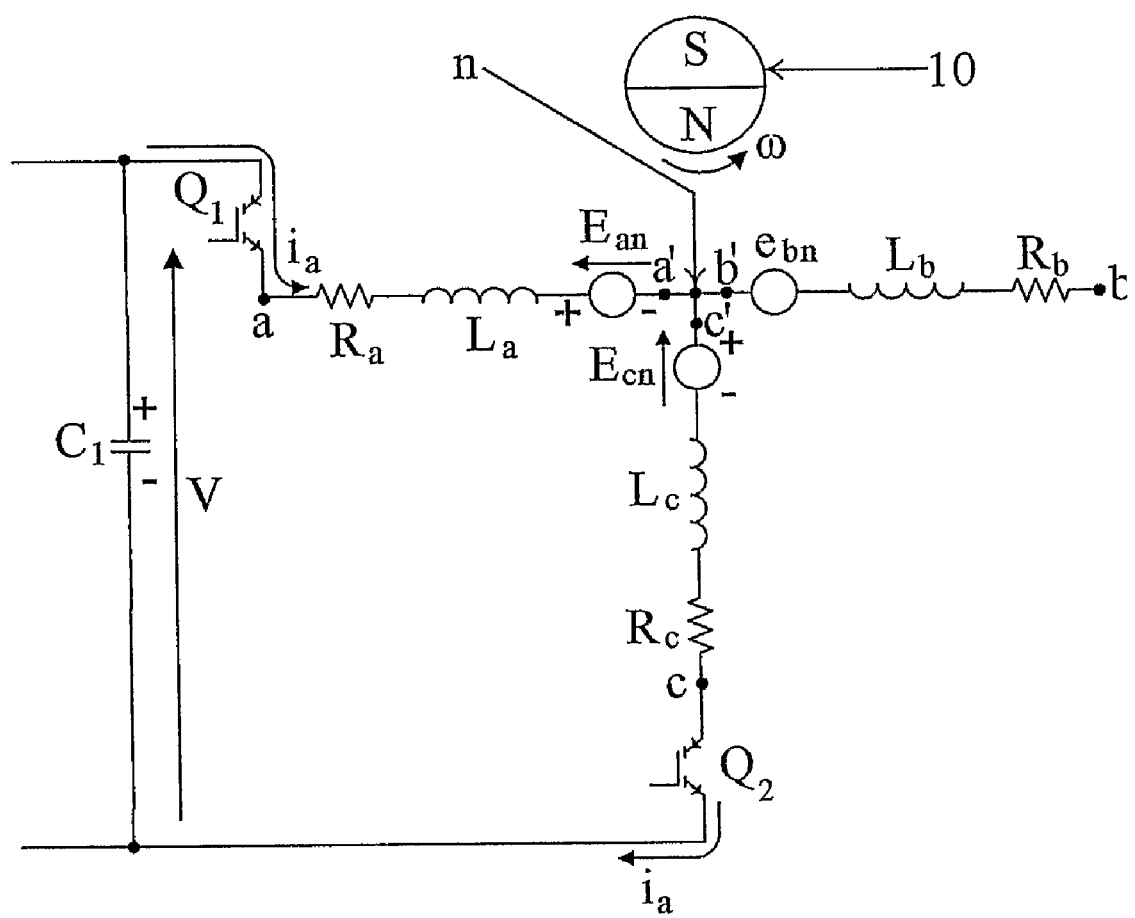
FIG. 11 depicts a schematic diagram of the equivalent circuit of BLDC motor and the drive when transistors $Q_1$ and $Q_2$ are on thereby energizing windings ac for d-axis of the motor in the range $0° \leq \theta \leq 60°$.

Under load conditions, the winding currents are high and take some time to decay in the winding being commutated, thus providing new commutation issues. The effect of these commutation issues on motor and drive operation and on the BEMF Space Vector will now be addressed. The motor is loaded and assumed to be running at a constant speed. The d-axis of the rotor magnet is in the range $0° \leq \theta \leq 60°$ and under these conditions windings ac are energised through transitions $Q_1$ and $Q_2$. In the interval of analysis, the motor current is assumed to be constant and two phase windings are connected to the dc supply. The motor and drive equivalent circuit under these given conditions are shown in FIG. 11.

Taking, $$E_{an}=E_{bn}=E_{cn}=E$$

$$R_a=R_b=R_c=R$$

$$L_a=L_b=L_c=L$$

for a 160V trapezoidal BEMF Brushless DC motor, of full-load current 4A and phase resistance 1Ω, then under steady-state conditions for the circuit in FIG. 11, $$V=2Ri_a+2E.$$

Since for $0° \leq \theta \leq 60°$, $E_{an}=-E_{cn}$ as shown in FIG. 2, therefore, E=76 Volts, which is 95% of V/2. Hence, under no-load, full load and all other load conditions, the steady BEMF of each phase winding would be assumed equal to half the supply voltage.

Figure 12:
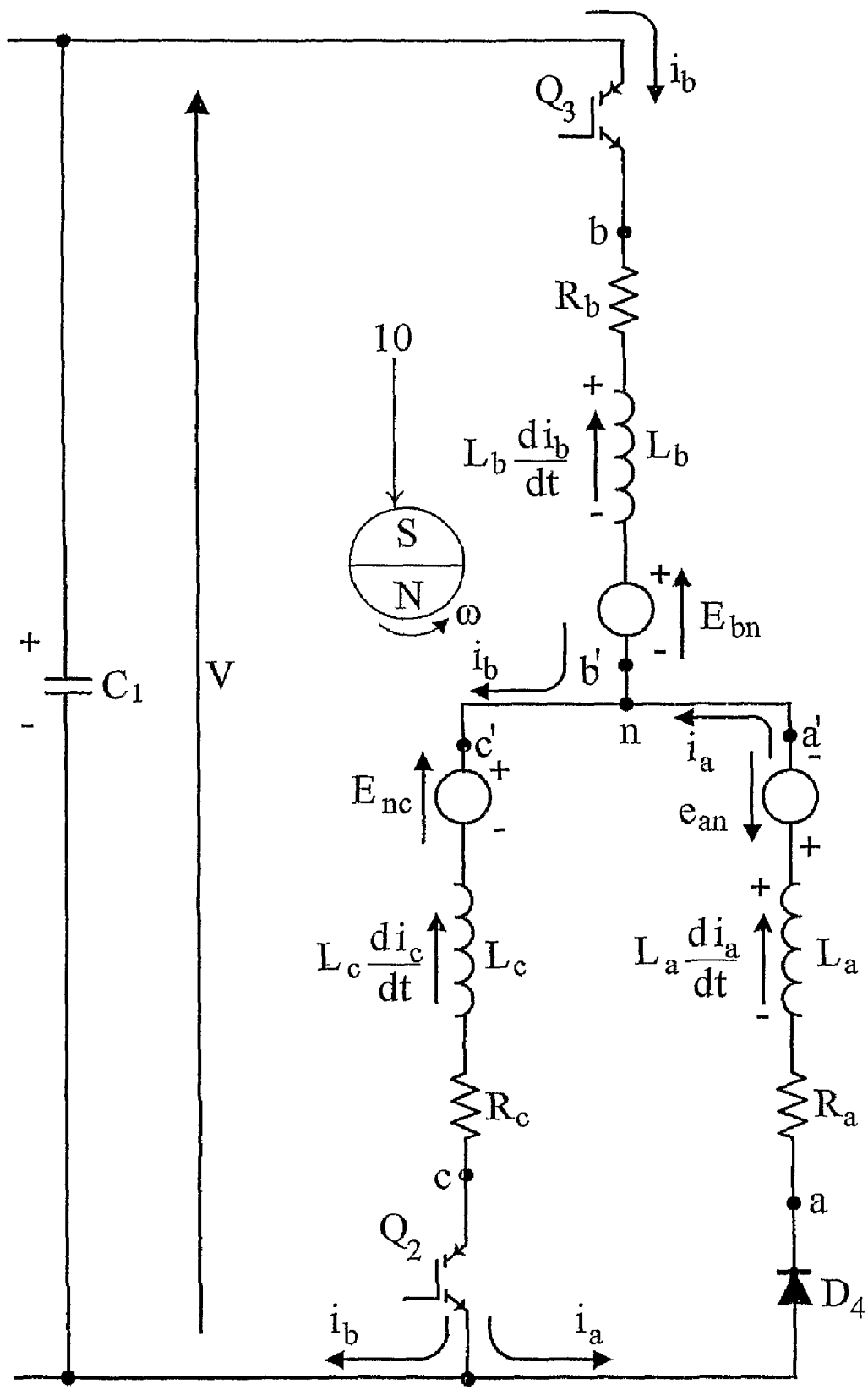
FIG. 12 is a schematic diagram of the equivalent circuit of the BLDC motor and drive when transistors $Q_2$ and $Q_3$ are on to energize windings be and winding aa' is being commutated through anti-parallel diode $D_4$.

When $\theta=60°$, the BEMF Space Vector is given by $Ve^{j60°}$. For efficient motor operation, winding aa' must be commutated and windings bc must be connected to the supply at this rotor position. The current in phase winding aa' would take some time to decay to zero, since a large amount of energy was stored in the winding magnetic field and this energy must be dissipated. The release of this magnetic field energy from winding aa' tries to maintain the current in the winding, thus causing winding aa' to take some time to commutate its current. The equivalent circuit of motor and drive when windings bc are energized and phase winding aa' is being commutated is depicted in FIG. 12.

The energy released from winding aa', develops the voltage $$L_a \frac{di_a}{dt}$$

to maintain the flow of $i_a$ through anti-parallel diode $D_4$ and transistor $Q_2$. The current $i_a$ flows against BEMFs $e_{an}$ and $E_{nc}$ and winding resistances $R_a$ and $R_c$ and also against $$L_c \frac{di_c}{dt}$$

if current $i_c$ is increasing. The current $i_a$ in winding aa' is commutated when $$L_a \frac{di_a}{dt}$$

is less than the sum of $e_{an}$ plus $E_{nc}$ and $$L_c \frac{di_c}{dt}.$$

Under these conditions, the phase voltages across the windings are given by:

$$V_{an}=-\frac{V}{3}, \; V_{bn}=\frac{2V}{3} \; \text{and} \; V_{cn}=-\frac{V}{3}$$

and the resultant voltage vector during this commutation interval is given by $\vec{V_{Rcaa'}}$ where $$\vec{V_{RCaa'}}=\vec{V_{an}}+\vec{V_{bn}}+\vec{V_{cn}}$$

and $$\vec{V_{Rcaa'}}=Ve^{j120°}.$$

The above equation reveals that the resultant voltage vector during commutation of current $i_a$ in winding aa' is a stationary vector of magnitude V and located at a position $e^{j120°}$. The d-axis of the rotor magnet and the BEMF Space Vector just at the point before the beginning of the commutation internal of current $i_a$ in winding aa' were located at θ=60° and $e^{j60°}$ respectively, thus allowing the BEMF Space Vector to lag the d-axis by 90 electrical degrees. However, during the commutation internal of circuit $i_a$, the resultant voltage vector $\overrightarrow{V_{Rcaa'}}$ takes up a stationary position at $e^{j120°}$, although the rotor is moving during this interval, taking up angles of θ>60°. It must be noted, that the resultant voltage vector during commutates of $i_a$ has no BEMF associated with it and unlike the BEMF Space Vector, it does not reflect rotor position information. Hence, the angles that this resultant voltage vector makes with the real axis should not be used to commutate winding currents.

When the current $i_a$ in winding aa' has been commutated, the BEMF in this winding is no longer V/2, but much less than this, say 0.4V. The phase voltages at this instant are given by $$V_{an} = 0.4 \text{ V}, V_{bn} = \frac{V}{2} \text{ and } V_{cn} = -\frac{V}{2},$$

and the BEMF Space Vector at the end of the commutation interval of winding aa' is given by $\overrightarrow{V_{Rcaa'\_E}}$, where, $\overrightarrow{V_{Rcaa'\_E}} = 0.9549 V e^{j65°}$.

This BEMF Space Vector, having the BEMF of phase winding aa' possesses rotor position information and follows the d-axis of the rotor magnet, lagging it by 90 electrical degrees. The BEMF Space Vectors just before commutation of winding aa' (16) and the BEMF Space Vectors just after commutation of winding aa' (17) and the resultant voltage vector trajectory during commutation of $i_a$ are shown in FIG. 13.

Figure 13:
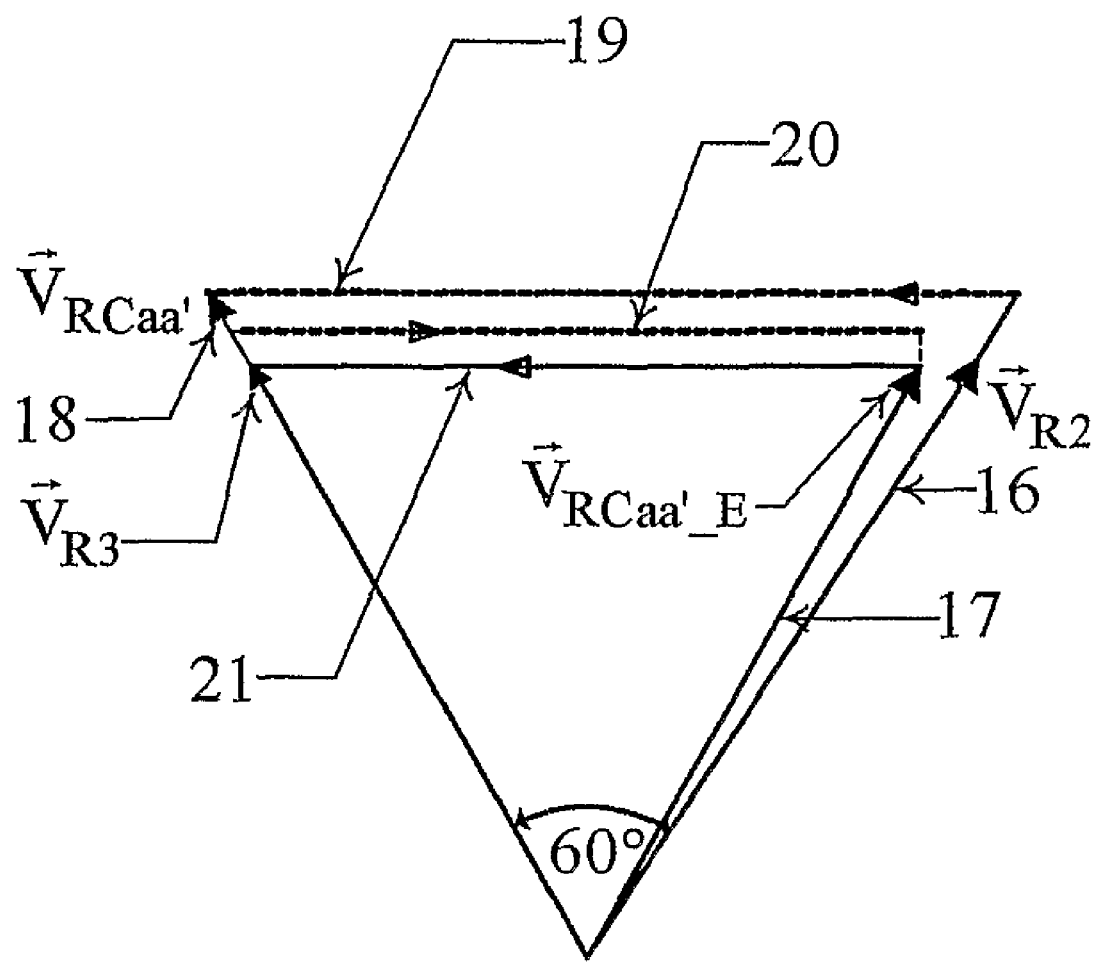
FIG. 13 is a vector diagram of the BEMF Space Vectors just before and after commutation of current $i_a$ in winding aa' and the trajectories of the resultant voltage vector and the BEMF Space Vector under load conditions for the present invention.
Figure 14:
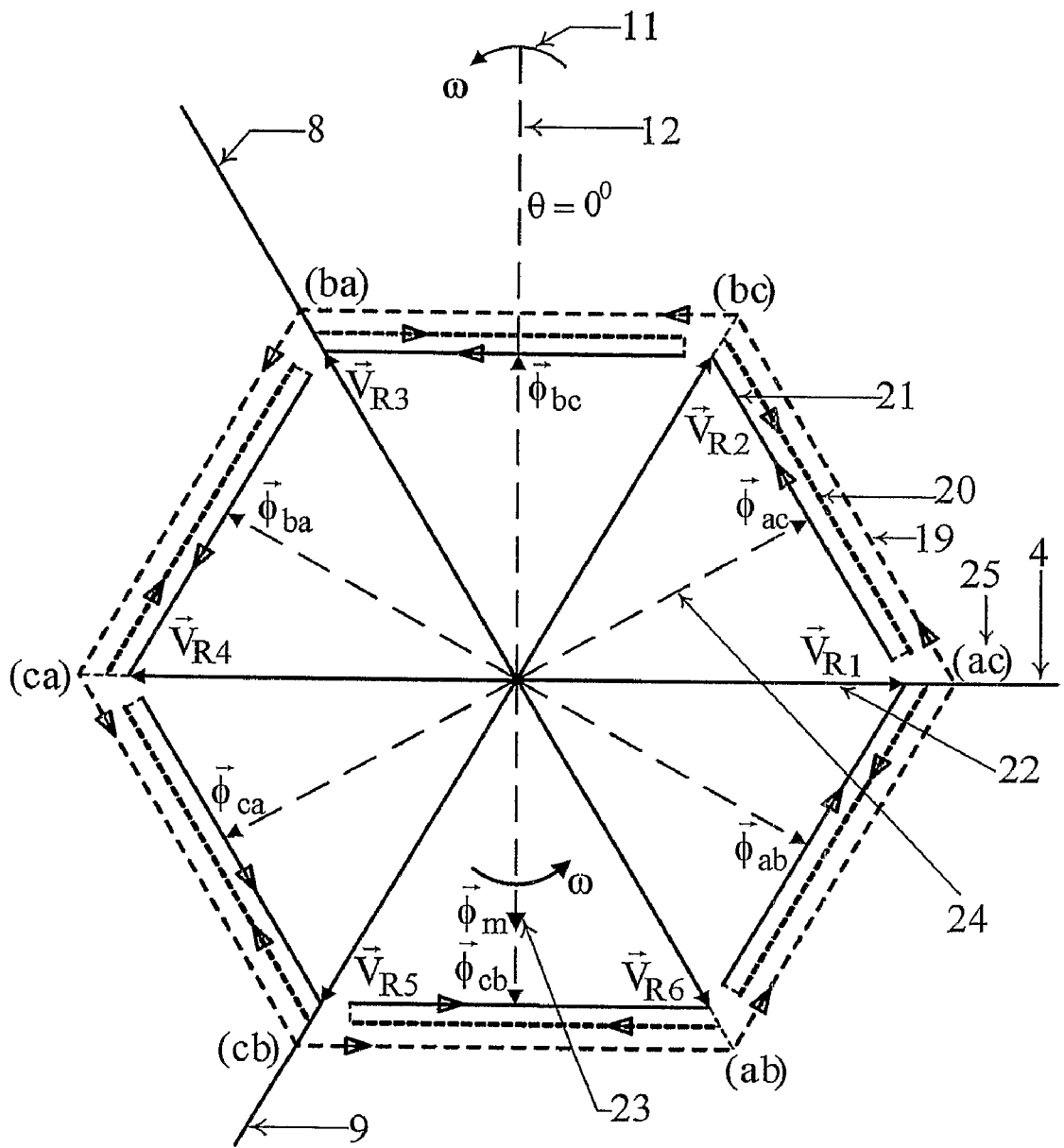
FIG. 14 shows a vector diagram of the trajectories of the resultant voltage vector and the BEMF Space Vector under load conditions for one complete rotation of the rotor for the present invention.

The trajectory of the BEMF Space Vector (21), the resultant voltage vector during commutation (18), the trajectory of the resultant voltage vector at the beginning of commutation (19) and the trajectory of the resultant voltage vector at the end of commutation (20), are shown in FIG. 13. It must be noted that as the motor load increases, the phase currents increase and the time to commutate a winding current increases, hence the angles formed by the BEMF Space Vector just before and just after commutation of a phase winding increases with the increase of load current. For one complete electrical cycle of operation, the trajectories of the BEMF Space Vector and the resultant voltage vector during commutation are shown in FIG. 14. At rotor position θ=0° in FIG. 14, the BEMF Space Vector $\overrightarrow{V_{R1}}$ (22) is produced for the commutation of phase winding bb' and the connection of the new windings ac situated at the $\overrightarrow{V_{R1}}$ vertex of the hexagon (25). Resultant stationary stator flux vector $\overrightarrow{\phi_{ac}}$ (24) produced by this energization would interact with rotor flux vector $\overrightarrow{\phi_m}$ (23) to develop electromagnetic torque. The trajectory of the resultant voltage vector at the beginning of commutation (19), trajectory of the resultant voltage vector at the end of commutation (20) and the trajectory of the BEMF Space Vector (21) are also presented.

Figures 15A, 15B, 15C:
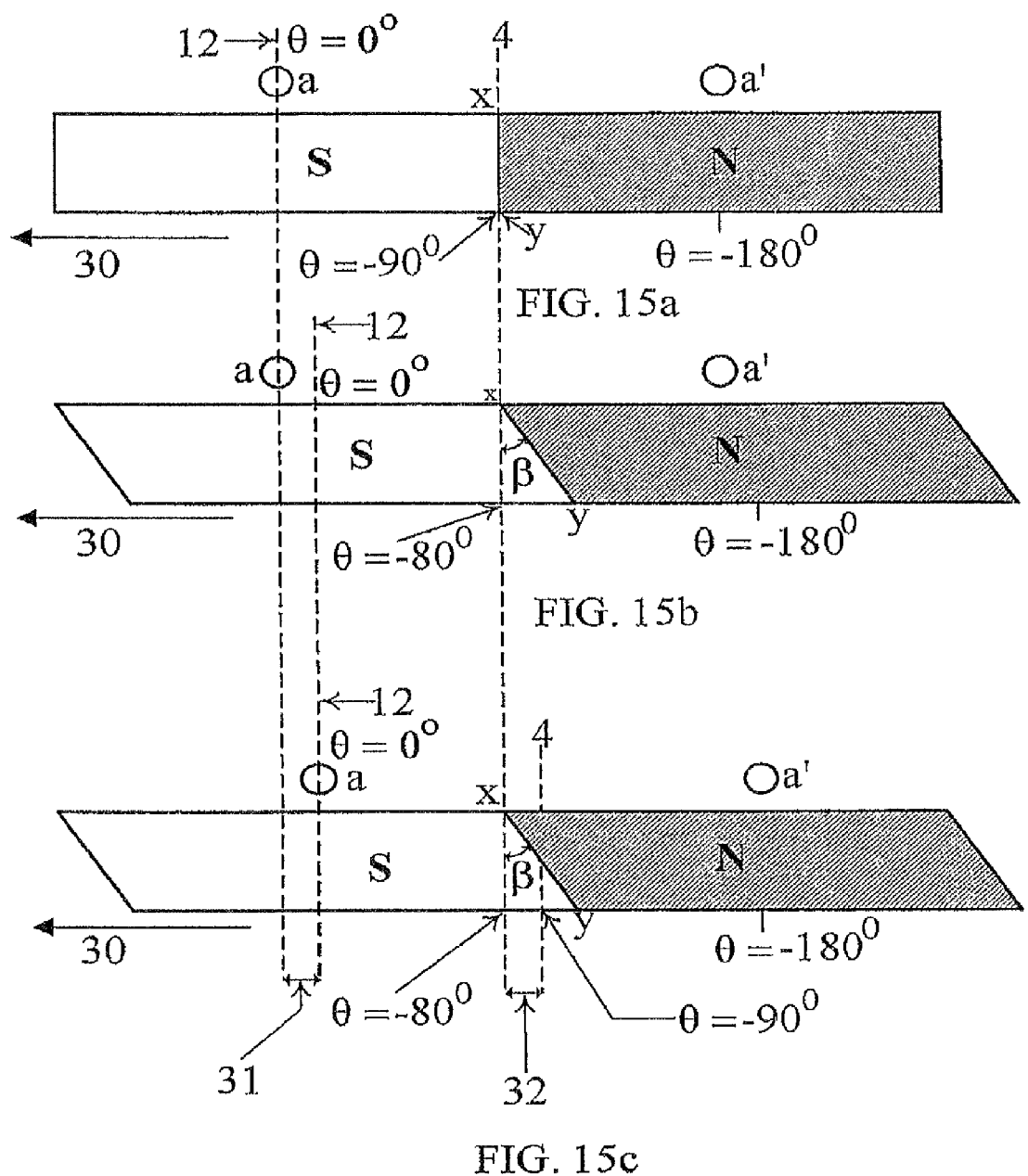

Rotor magnets are skewed to reduce the cogging torque experienced by the rotors. However, the skewing of the rotor magnet of a Brushless DC motor affects the orientation of the trajectory of the BEMF Space Vector produced by the motor. The effect of the skewed rotor on the magnetic axes of a Brushless DC motor is presented in FIGS. 15a-15c. The linear representation of an unskewed 2-pole, three-phase Brushless DC motor showing only the center conductors of phase windings aa' is presented in FIG. 15a. The unskewed rotor is positioned in the diagram with its d-axis aligned with conductor of winding aa'. This represents the θ=0° position of the rotor. At this rotor position the unskewed line xy, separating north and south magnetic pole pieces is aligned with the magnetic axis of winding aa'. With rotor movement (30) in the direction shown, the flux linkage of winding aa' at the position shown in FIG. 15a is zero, since the winding is experiencing equal flux from both north and south poles of the magnet. As a result, the induced emf or BEMF of this winding is zero in the position shown and lies along the magnetic axis of winding aa'.

FIG. 15b shows a skewed rotor magnet, with skew angle of β=20°. For this skewed magnet, the line xy separating north and south magnetic pole pieces is sloped at an angle of β to the vertical. The skewing of the rotor causes the d-axis, which is the center of the south-pole, to shift by β/2=10° (31) to the right in the direction of skew, as shown in FIG. 15b. When this rotor magnet is moving in the direction shown, the flux linkage in winding aa' is not zero at the rotor position of FIG. 15b, since the winding is experiencing more flux from the south magnetic pole than from the north magnetic pole. As a result, a BEMF is induced in winding aa'.

For this rotor position of FIG. 15b to produce a net flux linkage of zero in winding aa', resulting in zero BEMF in the winding, thereby ensuring that the BEMF of the skewed and unskewed rotors are in phase, winding aa' must be shifted towards the right by an angle β/2=10° as shown in FIG. 15c. This shift of winding aa' by β/2, causes the magnetic axis of winding aa' to be shifted by β/2=10° (32) and in the same direction in which the d-axis was shifted due to skewing of the magnet.

The effect of the skewed rotor on the d-axis of the rotor magnet and the magnetic axes of all three phase windings are shown in FIGS. 16a-16d. The stator and unskewed rotor (26) of a 2-pole, three-phase Brushless DC motor, indicating only the center conductors of each phase winding is shown in FIG. 16a. Since phase winding positive magnetic axes aa', bb' and cc' are positioned at $e^{j0°}$, $e^{j120°}$ and $e^{j240°}$ respectively, the trajectory of the BEMF Space Vector is an unskewed hexagon (28) whose BEMF Space Vectors $\overrightarrow{V_{R1}}$ through $\overrightarrow{V_{R6}}$ which are used for commutation of phase windings with the present invention all lie along the lines from the center to the vertices of the hexagon, where these lines have the same direction as the magnetic axes of the phase windings as shown in FIG. 16b.

The skewed rotor (27), with its d-axis shifted by β/2=10° in a clockwise direction relative to the unskewed rotor is shown in FIG. 16(c) together with the center conductors of the three stator windings. The phase windings together with their magnetic axes are also shifted by β/2=10° to ensure that the BEMFs in the skewed and unskewed rotors are in phase with each other. This ensures that at the θ=0° position, the d-axis is 90° away from the positive magnetic axis of winding aa' for both skewed and unskewed rotors. Since the vector phase voltages lie along the magnetic axes of the windings and the new positions of these axes for the skewed rotor are $e^{j-10°}$, $e^{j110°}$ and $e^{j230°}$, for windings aa', bb' and cc' respectively, then the trajectory of the BEMF Space Vector is a skewed hexagon (29) as shown in FIG. 16d.

The effect of rotor skew is to shift the BEMF Space Vectors $\overrightarrow{V_{R1}}$ through $\overrightarrow{V_{R6}}$ which are used to commutate phase windings by an angle β/2=10° in a clockwise direction. Hence, the rotor skew angle must be known in order to produce the skewed hexagon whose BEMF Space Vectors $\overrightarrow{V_{R1}}$ through $\overrightarrow{V_{R6}}$ are used in the present invention for efficient starting and running of the Brushless DC motor. Table 4 summarises d-axis position and BEMF Space Vector for new winding pair for skewed rotor of $\beta=20°$.

TABLE 4

| Position of d-axis θ | BEMF Space Vector | New Windings Energised |
| --- | --- | --- |
| 0° | $\overrightarrow{V_{R1}} = Ve^{-j10°}$ | ac |
| 60° | $\overrightarrow{V_{R2}} = Ve^{j50°}$ | bc |
| 120° | $\overrightarrow{V_{R3}} = Ve^{j110°}$ | ba |
| 180° | $\overrightarrow{V_{R4}} = Ve^{j170°}$ | ca |
| 240° | $\overrightarrow{V_{R5}} = Ve^{j230°}$ | cb |
| 300° | $\overrightarrow{V_{R6}} = Ve^{j290°}$ | ab |
| 360° | $\overrightarrow{V_{R1}} = Ve^{-j10°}$ | ac |

INDUSTRIAL APPLICABILITY

Figure 17:
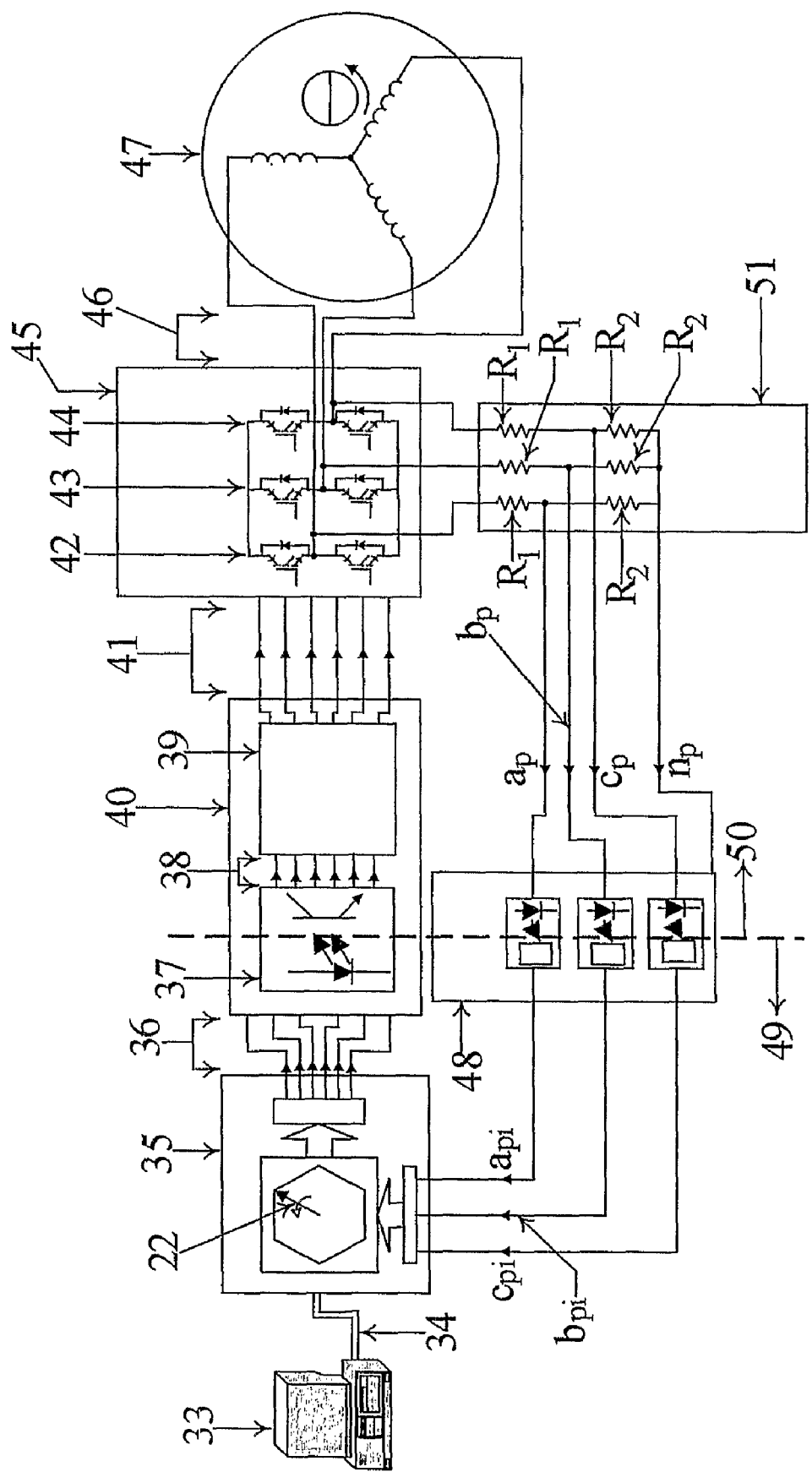
FIG. 17 shows the block schematic diagram of the drive used to implement the present invention for efficient starting and commutation of a three-phase BLDC motor for the present invention.

The block diagram of the drive used for the implementation of the De Four BEMF Space Vector Resolver for efficient starting and commutating the three-phase Brushless DC motor is shown in FIG. 17. It consists of a programmed Digital Signal Processing Means (33), a Digital Signal Processor (DSP) Board (35), an Isolation & Driver Circuit (40), a three-phase Inverter Circuit (45), a Brushless DC Motor (47), a Phase Voltage Sensing Circuit (51) and a Phase Voltage Isolation Circuit (48). The programmed Digital Signal Processing Means (33) is used to download the machine language program to the Analog Devices ADMC 401 DSP board (35) via the serial communication cable (34). The DSP runs the present invention's program and provides the information necessary to drive two of the six transistors in the three-phase Inverter Circuit (45) at any instant of time, by way of the six output lines $a^+$, $a^-$, $b^+$, $b^-$, $c^+$ and $c^-$ (36). The six output lines of the DSP Board are used to drive six 6N136 optocouplers (37) which isolates the DSP Board from the level shifting section of the Isolation & Driver Circuit (40). The six isolated lines, $a_i^+$, $a_i^-$, $b_i^+$, $b_i^-$, $c_i^+$ and $c_i^-$ (38) from the optocouplers are fed to the level shifter and driver section (39) of the Isolation & Driver Circuit (40). The IR2133 integrated circuit was used as the level shifter and driver. Level shifting is necessary between the DSP Board and the insulated gate bipolar transistors (IGBTs) of the three-phase Inverter Circuit (45), to shift the 5V level DSP signals to a 15V level for driving the IGBTs.

The IRPT2056A was used to supply the dc power through its three-phase rectifier and the three-phase inverter stage with its six IGBTs $Q_1$ to $Q_6$ and their anti-parallel diodes $D_1$ to $D_6$ was used to supply this DC power to the Brushless DC motor. Isolated and level shifted DSP signals $a_{il}^+$ and $a_{il}^-$ drive the transistors $Q_1$ and $Q_4$ in leg-a (42), $b_{il}^+$ and $b_{il}^-$ and $b_{il}^-$ drive transistors $Q_3$ and $Q_6$ in leg-b (43) and $c_{il}^+$ and $c_{il}^-$ drive the transistors $Q_2$ and $Q_5$ in leg-c (44) of the inverter circuit. These IGBTs are driven fully on or off, with only two transistors on at any one time, one on the high side which is connected to the positive dc supply and one on the low side which is connected to the negative dc supply.

The three phase winding lines (46) of the Brushless DC motor are connected to the emitter-collector nodes of the transistors in each inverter leg. Since the present invention utilises motor phase voltages and the star point of the phase windings is not accessible, the resistor network formed by $R_1$ and $R_2$ of the Phase Voltage Sensing Circuit (51) provides this star point at termination n of the three lower resistors $R_2$. The six resistors comprising the Phase Voltage Sensing Circuit (51) was used to provide a fraction of the motor phase voltage of magnitude <3V to feed the analog to digital converter (A/D) of the DSP (35).

Before going to the DSP (35), the sampled phase voltages produced by the Phase Voltage Sensing Circuit (51) must be isolated from the power line reference by the Linear Optocoupler Circuit (48). The linear optocoupler is a four quadrant device which is built around the IL300. The three high side (50) lines $a_p$, $b_p$ and $c_p$ are isolated by the linear optocoupler and supplies isolated low side (49) lines $a_{pi}$, $b_{pi}$ and $c_{pi}$ to be fed to the A/D of the DSP.

The said DSP program utilises these isolated sampled phase voltages to efficiently start and commutate the Brushless DC motor. The isolation of both output and input DSP lines along the dotted line I of FIG. 17 ensures safe and proper operation of the programmed Digital Signal Processor and DSP The detailed analysis and operation of the DSP program to execute the present invention and operate the drive of FIG. 17 in an efficient manner will now be performed.

The said DSP program developed for the implementation of the present invention for efficient starting, commutation and continuous operation of the Brushless DC motor includes the following features:
 (a) a routine for parking the rotor at a known position for efficient starting of the motor in the desired direction of rotation,
 (b) a routine for the computation of the BEMF Space Vector,
 (c) a method to calculate the angle that the BEMF Space Vector makes with the real axis,
 (d) an indicator to detect the sector in which the BEMF Space Vector is located in order to avoid divisions which results exceed 2 and perform the inverse under these conditions,
 (e) provisions to set two of the six DSP output lines high, in order to turn on an upper and a lower transistor in different legs of the inverter circuit, for connection of two phase windings to the dc supply when a particular angle is reached by the BEMF Space Vector, and,
 (f) provisions for disabling BEMF Space Vector angle detection when three phase windings are connected to the dc supply during the commutation interval.

All these functions are included in the program flow charts of FIGS. 18a-18e which are used for the implementation of the present invention's commutation technique for efficient starting, commutation and continuous operation of the three-phase Brushless DC motor under any load condition. The following analysis refers to a Brushless DC motor having an unskewed rotor.

Figure 18A:
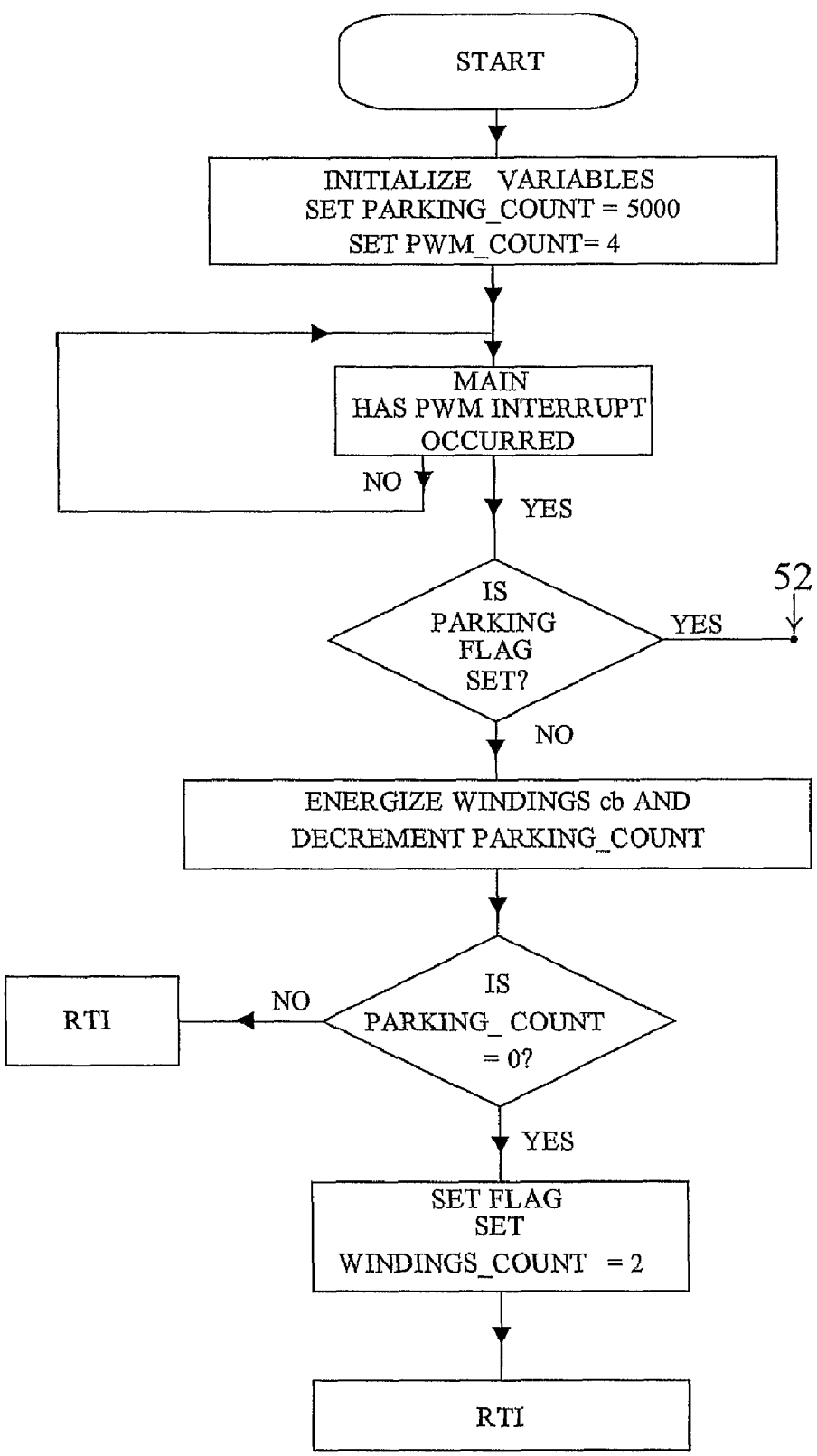
FIG. 18a shows the Parking routine for the present invention.

The flow chart in FIG. 18a begins with the initialisation of all variables by setting them to their initial starting values. Two program variables, Parking_Count and PWM_Count were given initial values of 5000 and 4 respectively. The program then flows to Main, where it keeps cycling there until a PWM interrupt occurs. On the occurrence of a PWM interrupt, a Parking Flag is checked to determine if the motor has been parked. If the flag is not set, this indicates that the motor has not been parked and the program proceeds to park the motor in a known position before executing the Calculation and Running routines.

From FIG. 14, if the first pair of windings to be energised in the Running routine is ac, then for efficient starting of the motor, and for rotation in the anti-clockwise direction, the rotor must be parked at the position where the d-axis is at $\theta=0°$. This parking position is accomplished by energising windings cb in the Parking routine, which aligns the north pole of the rotor magnet flux $\vec{\phi_m}$ with the stator flux vector $\vec{\phi_{cb}}$. Since the said rotor takes some time to park and settle, where this time is dependent on the rotor inertia, motor load, rotor position before parking and the applied motor parking voltage, Parking_Count is decremented each time the program executes this Parking routine. The Parking_Count value is checked to determine if its value is zero, and if the response is NO, the program returns to Main via the RTI command, where it will loop in main until a PWN interrupt is detected. On the occurrence of another PWM interrupt which occurs every 50 μs on the ADMC 401 DSP, the Parking Flag is checked, and since Parking_Count is not yet zero, the Parking Flag would not be set. The program therefore keeps energizing windings cb until Parking_Count has decremented to the value of zero. When this occurs, the Parking Flag is set and Windings_Count is set to 2. The program returns to Main and keeps looping there until the next PWM interrupt occurs.

Figure 18B:
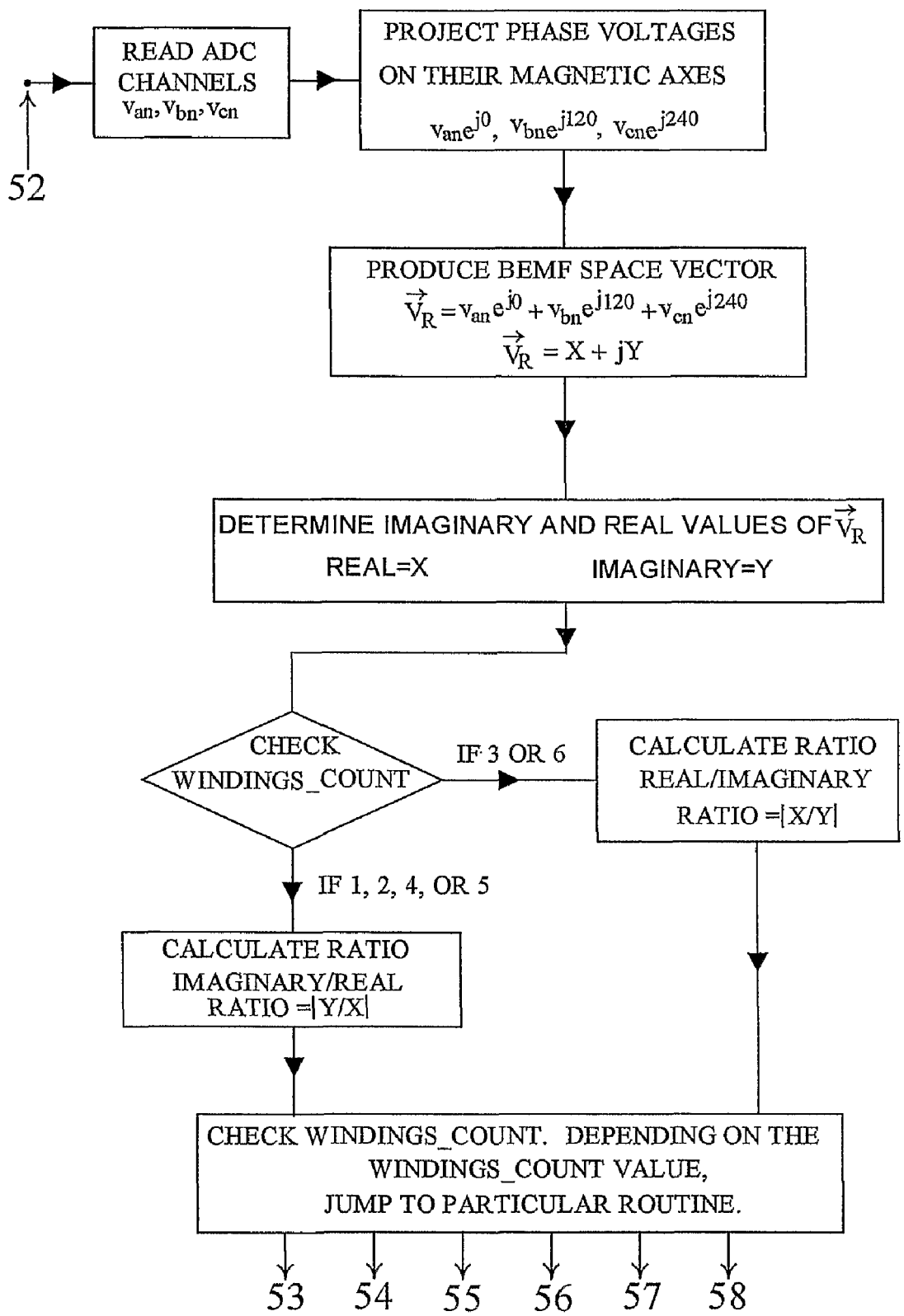
FIG. 18b shows the calculation routine for the present invention.
Figure 19A:
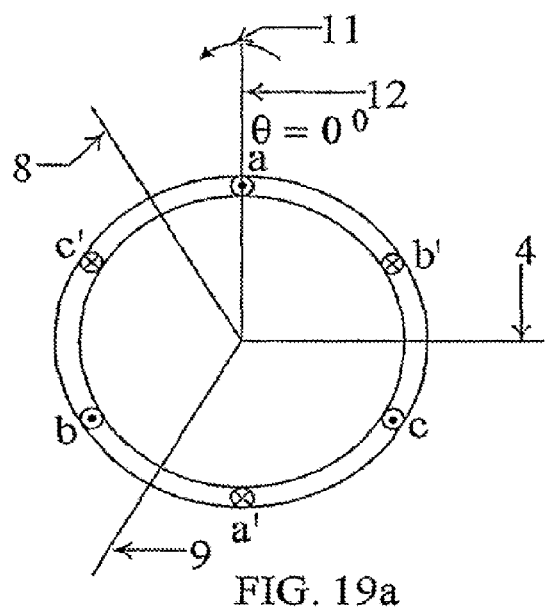
Figure 19B:
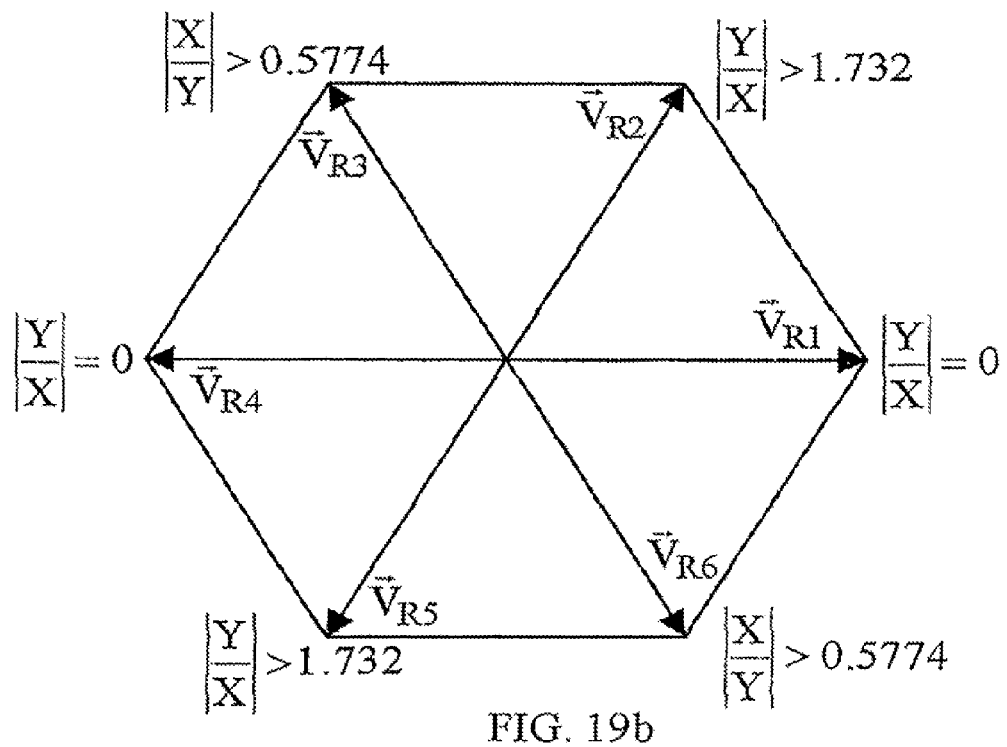
FIG. 19b shows the BEMF Space Vectors for winding commutation and the values of Ratio at the angles for winding commutation of an unskewed rotor for the present invention.

On the occurrence of this PWM interrupt, since the Parking Flag is set, the program would have completed the Parking routine and would be directed to the Calculation routine via (52) as shown in FIG. 18b. In the Calculation routine, the three analog to digital (ADC) lines carrying motor phase voltages $v_{an}$, $v_{bn}$, and $v_{cn}$ are read. Since the motor is at standstill and windings cb are energized in the parked position, then the phase voltages supplied by the Phase Voltage Sensing Circuit (51) via the Linear Optocoupler (48) to the ADC in FIG. 17 are: $v_{an}=0$, $v_{bn}=-V/2$ and $v_{cn}=V/2$. These three phase voltages $v_{an}$, $v_{bn}$ and $v_{cn}$ are then projected on the magnetic axes of their respective phase windings whose directions are given by $e^{j0°}$, $e^{j120°}$ and $e^{j240°}$ respectively. Following this, the three phase voltage vectors are added vectorially to produce the BEMF Space Vector $\vec{V_R}$, whose real and imaginary parts are given by X and Y respectively. The location of positive magnetic axes for windings aa', bb' and cc' having an unskewed rotor magnet are shown in FIG. 19a, while the BEMF Space Vectors for winding commutation and the value of Ratio at the angles for winding commutation are shown in FIG. 19b.

The Windings_Count value is then checked in the Calculation routine and the program flows to one of two paths, depending on the Windings_Count value. Since after parking Windings_Count was set to 2, the program flows along the path 1, 2, 4, or 5 to determine the value of Ratio which is given by $$\left|\frac{Y}{X}\right|.$$

Windings_Count is checked again in order to direct program progression to one of the six routines of Windings_Count 1, 2, 3, 4, 5 or 6, thereby completing the Calculation routine.

Figure 18C:
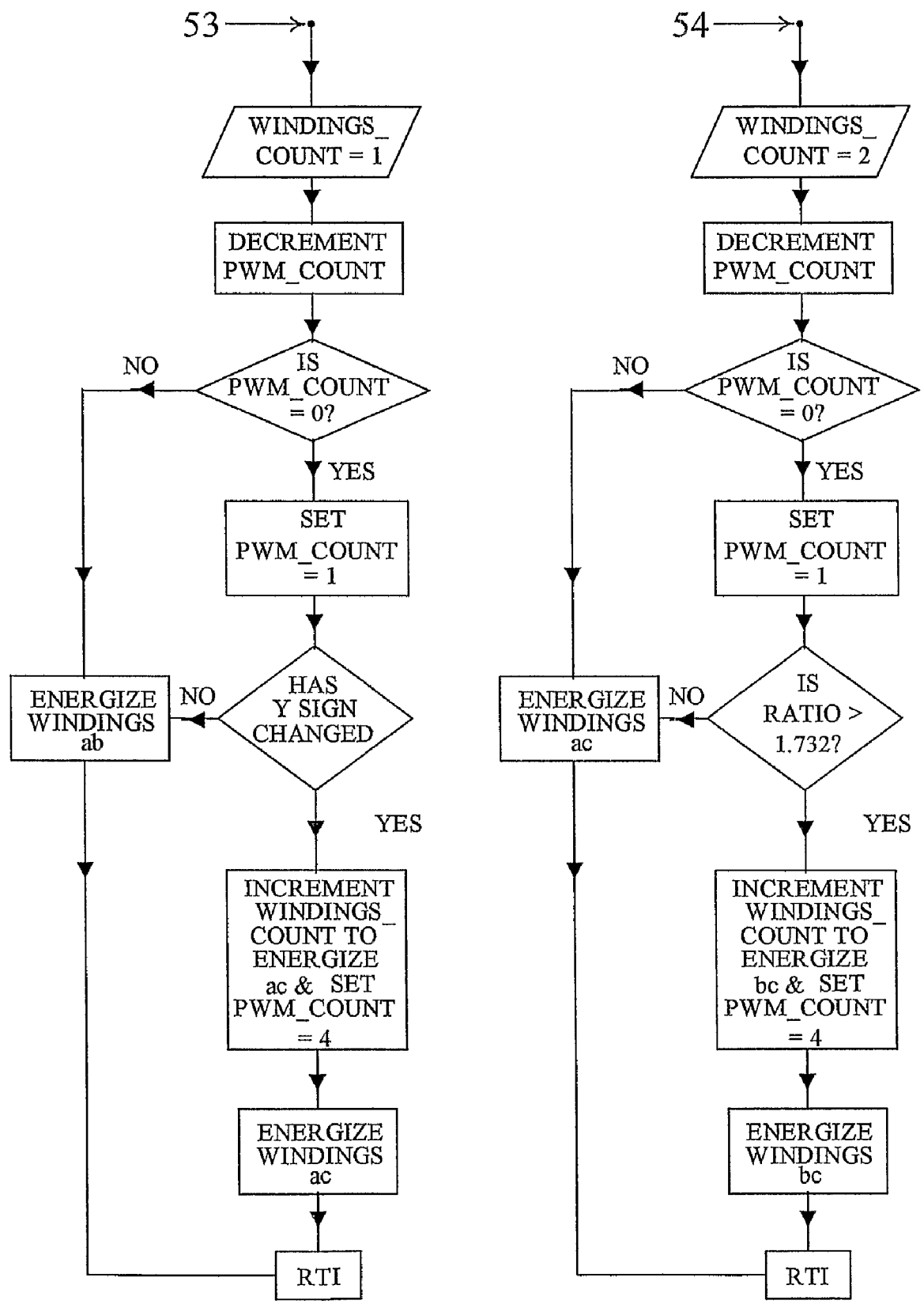
FIG. 18c shows Running routines for Windings_Count 1 and 2, for the present invention.

Since Windings_Count was set to 2 in the Parking routine, then the program jumps to execute Windings_Count 2 Running routine via (54) in FIG. 18c. This running winding energization routine begins by decrementing PWM_Count whose initial value is 4. The program then checks the PWM_Count value to determine if it is zero. Since this is the first decrement of PWM_Count, its value would be 3, causing the first pair of windings to be energized in the Running routine to be ac.

The energization of windings ac produces stationary flux vector $\vec{\phi_{ac}}$, which interacts with rotor flux vector $\vec{\phi_m}$ to develop electromagnetic torque in the motor, thus causing the motor to start rotating in the anti-clockwise direction. After the energization of windings ac, the program returns to Main in FIG. 18a and awaits a PWM interrupt. On the occurrence of a PWM interrupt, since the Parking Flag is set, the program executes the BEMF Space Vector Calculation routine in FIG. 18b to determine the real and imaginary parts of the BEMF Space Vector produced. Rotation of the rotor on starting induces a BEMF in the unenergized winding aa', thus allowing the BEMF Space Vector to contain rotor position information. The program then checks the Windings_Count value which is set to 2, performs Ratio calculation of $$\left|\frac{Y}{X}\right|,$$

then jumps to the Windings_Count 2 Running routine via (54) in FIG. 18c It proceeds to energize windings ac for four PWM interrupts and avoids checking the value of Ratio during this time, since PWM_Count is not yet equal to zero.

The inclusion of: setting PWM_Count to 4, decrementing PWM_Count, and checking PWM_Count for zero, serves to inhibit Ratio checking for 4 PWM cycles at the beginning of the starting process and during commutation of a winding. The purpose of these program blocks during starting would be discussed here, and their function when the motor is running and winding commutation is taking place will be discussed later. When the motor is parked, no BEMF is generated in the windings and a BEMF Space Vector does not exist, but a resultant stationary voltage vector is produced. It must be noted, that this resultant stationary voltage vector does not contain rotor position information. On entering the Windings_Count 2 Running routine in FIG. 18c for the first time, the angle information $$\left|\frac{Y}{X}\right|.$$

due to this resultant stationary voltage vector is prevented from being detected for up to four PWM cycles, until such time that the rotor begins moving and a BEMF Space Vector is produced. When four PWM interrupts have taken place, PWM_Count is set to zero and the program proceeds to set PWM_Count to 1 and checks Ratio to determine if it exceeds 1.732. When Ratio exceeds 1.732, the angle made by the BEMF Space Vector and the real axis is greater than 60°, which implies that winding aa' must be commutated and windings be must be placed across the dc supply.

If however Ratio is less than 1.732 in this Windings_Count 2 Running routine, then the BEMF Space Vector has not reached the angle of 60° with the real axis and windings ac must remain energized until such time that this happens. Since only four PWM interrupts have occurred, the rotor would not have moved through 60° and the response to the Ratio block would be No, causing windings ac to remain energized. The program then returns to Main in FIG. 18a and continues through the path of Yes for Parking Flag, 2 for Windings_Count in the Calculation routine of FIG. 18b and then to the Windings_Count 2 Running routine of FIG. 18c. When it reaches the Decrement PWM_Count block, since PWM_Count was set to 1, it would be decremented to zero. Hence, program progression is via the Yes path of the "Is PWM_Count=0?"

If Ratio is greater than 1.732, then the BEMF Space Vector makes an angle greater than 60° with the real axis, indicating that winding aa' must be commutated and windings bc must be connected to the dc supply. Hence, program progression moves along the Yes path of "Is Ratio >1.732?" block and Windings_Count is incremented to the value of 3 to shift operation from Windings_Count 2 Running routine to Windings_Count 3 Running routine in FIG. 18d. PWM_Count is set to 4 and then windings bc are energized. The program then returns to Main in FIG. 18a to await a PWM interrupt.

When the PWM interrupt occurs, program progression is via Yes of the "Check If Parking Flag Is Set" block to the Calculation routine in FIG. 18b and along the path "If 3 or 6" of the "Check Windings_Count" block, since Windings_Count is now set to 3. Ratio of real/imaginary values are now calculated instead of imaginary/real. The reason for this is as follows: As the BEMF Space Vector rotates in an anti-clockwise direction, for angles greater than 60° with the real axis, the ratio of imaginary to real becomes very large. This is because the real value approaches zero as the BEMF Space Vector approaches the positive and negative imaginary axes.

For values of the numerator much greater than that of the denominator in the division process, the DSP utilises a large number of clock cycles to compute the division. Hence the 50 µs duration between PWM interrupts does not provide sufficient time for divisions producing large results and performing all other tasks. The division routine time is significantly reduced when the BEMF Space Vector exceeds 60° with the real axis by computing real/imaginary when Windings_Count is 3 and 6. Having executed the real/imaginary division to computer Ratio, the program checks Windings_Count again and jumps to the Windings_Count 3 Running routine via (55) in FIG. 18d.

Figure 18D:
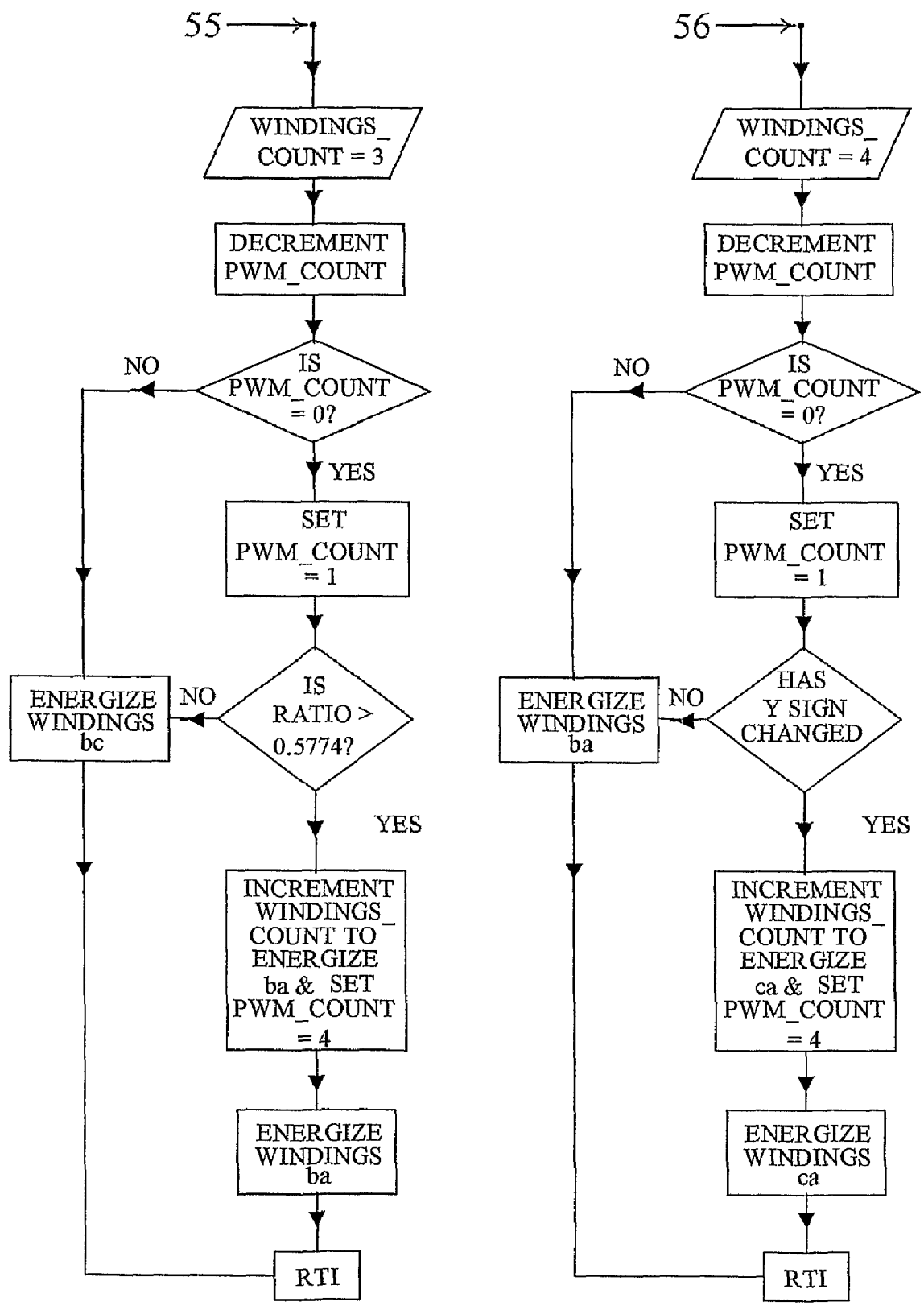
FIG. 18d shows Running routines for Windings_Count 3 and 4 for the present invention and FIG. 18e shows Running routines for Windings_Count 5 and 6 for the present invention.

If the motor is operating under load, then although windings bc are energized in the Windings_Count 2 Running routine of FIG. 18c, winding aa' would not have commutated its current, and would still be connected to the dc supply via anti-parallel diode $D_4$ as shown in FIG. 12. Under these conditions a resultant voltage vector shown in FIG. 14 is produced. This resultant voltage vector does not possess rotor position information and moves through 60° in an anti-clockwise direction at the beginning of the commutation interval, then rotates backwards in a clockwise direction for less than 60°, depending on the current in the commutating winding aa' before commutation began. Hence, the "Decrement PWM_Count" and "Is PWM_Count=0?" blocks in the Running routines ensure that program progression is via the No path of the "Is PWM_Count=0?" block, thus preventing Ratio checks to be performed for four PWM cycles. This serves enough time for winding aa' to commutate its largest current which occur under full load conditions. Therefore the new windings bc are energized for four PWM cycles in FIG. 18d before the ratio of real/imaginary is checked. After the four PWM cycles have elapsed, PWM_Count would be zero, allowing program progression along the Yes path of the "Is PWM_Count=0?" block, thus allowing Ratio to be checked to introduce the new winding pair when Ratio is greater than 0.5774. Otherwise, windings bc would be kept energized. When Ratio becomes greater than 0.5774, Windings_Count is incremented to 4 and PWM_Count is set to 4. The new pair of windings ba is energized and the program returns to Main in FIG. 18a where it loops and awaits a PWM interrupt. When a PWM interrupt occurs, program progression is through the Calculation routine in FIG. 18b and via "If 1, 2, 4 or 5" path for ratio calculation of $$\left|\frac{Y}{X}\right|$$

before jumping to the Windings_Count 4 Running routine via (56) of FIG. 18d. This said Running routine differs from the others in that the check block for energization of the new windings in this routine does not look for a ratio, but checks for a sign change between new and previous values of Y. This check is performed in this routine because when the BEMF Space Vector crosses the real axis, the new windings ca must be connected to the dc supply and the current in winding bb' must be commutated.

Figure 18E:
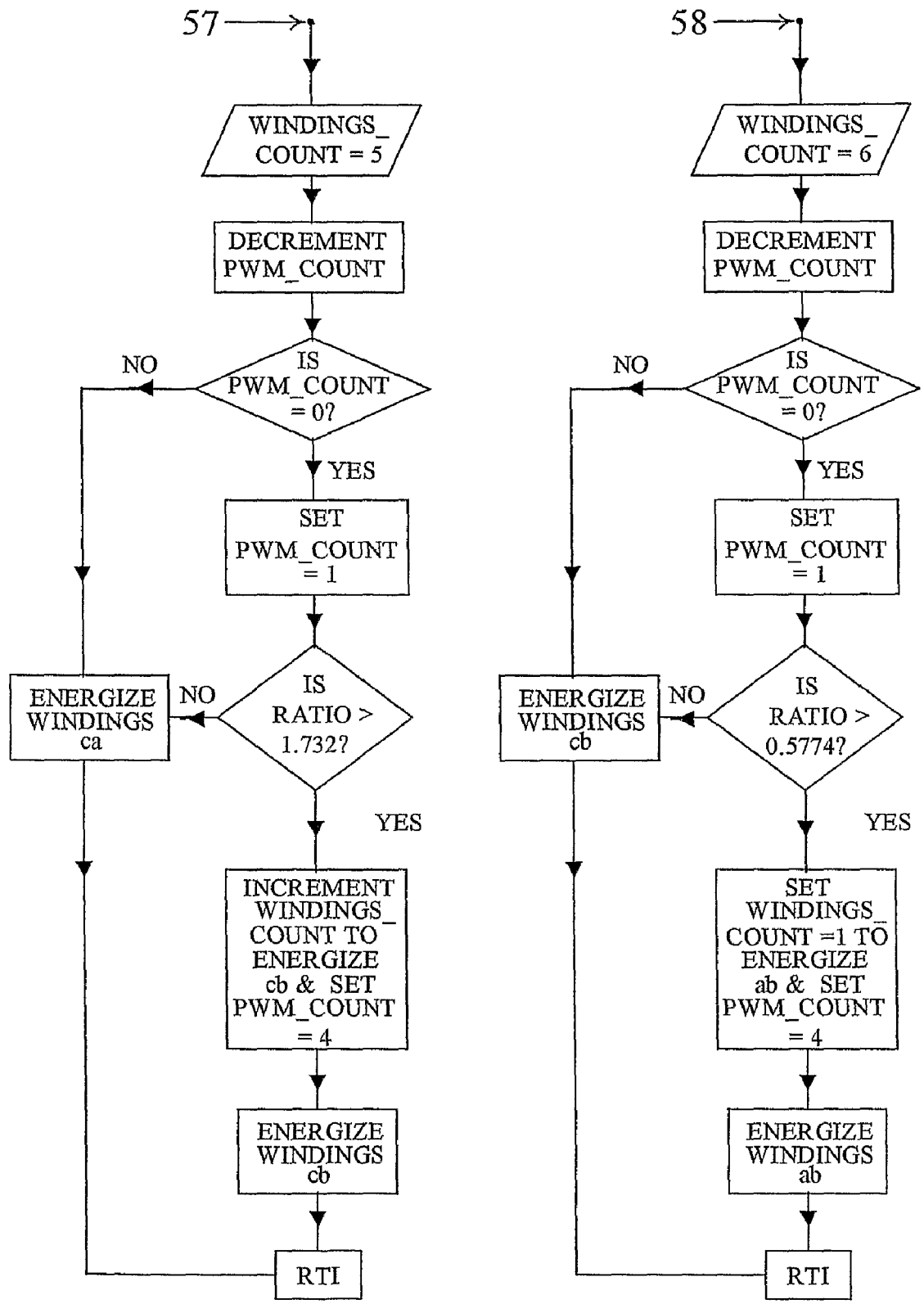

The program continues executing Windings_Count 5 via (57) and Windings_Count 6 via (58) Running routines in FIG. 18e for the energization of windings ca and cb respectively. When Ratio is greater than 0.5774 in the Windings_Count 6 Running routine, Windings_Count is not incremented as was previously done in all other Running routines, but it is set to 1, thereby directing the program to the Windings_Count 1 Running routine via (53) of FIG. 18c to begin a new cycle of Running routines.

The flow chart structure shown in FIGS. 18a-18e ensures that all the features (a) through (f) listed at the beginning of this section are taken into consideration for efficient starting and running of the Brushless DC motor under all load conditions.

Table 5 summarizes the activities occurring when the BEMF Space Vector reaches an angle for the introduction of a new winding pair to the dc supply. The state of the DSP output lines and the transistors to be turned on in the Inverter Circuit are also given.

TABLE 5

| BEMF Space Vector Angle α | Winding Count Value | Ratio Chosen | Value of Ratio EX. For New Windings Energization | DSP Output Lines High | Inverter Transistors Turned On | New Windings Energized |
|---|---|---|---|---|---|---|
| α > 0° | 2 | $\frac{Y}{X}$ | >1.732 | $a^+ c^-$ | Q1 & Q2 | ac |
| α > 60° | 3 | $\frac{X}{Y}$ | >0.5774 | $b^+ c^-$ | Q3 & Q2 | bc |
| α > 120° | 4 | None | Sign Change In Y | $b^+ a^-$ | Q3 & Q4 | ba |
| α > 180° | 5 | $\frac{Y}{X}$ | >1.732 | $c^+ a^-$ | Q5 & Q4 | ca |

TABLE 5-continued

| BEMF Space Vector Angle α | Winding Count Value | Ratio Chosen | Value of Ratio EX. For New Windings Energization | DSP Output Lines High | Inverter Transistors Turned On | New Windings Energized |
|---|---|---|---|---|---|---|
| α > 240° | 6 | $\frac{X}{Y}$ | >0.5774 | $c^+ b^-$ | Q5 & Q6 | cb |
| α > 300° | 1 | None | Sign Change In Y | $a^+ b^-$ | Q1 & Q6 | ab |
| α > 360° | 2 | $\frac{Y}{X}$ | >1.732 | $a^+ c^-$ | Q1 & Q2 | ac |

Figure 20A:
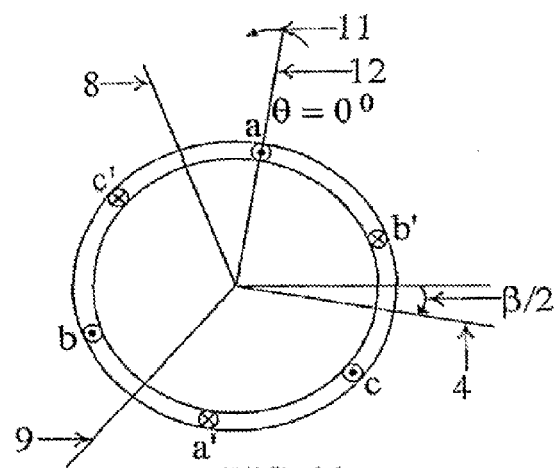
Figure 20B:
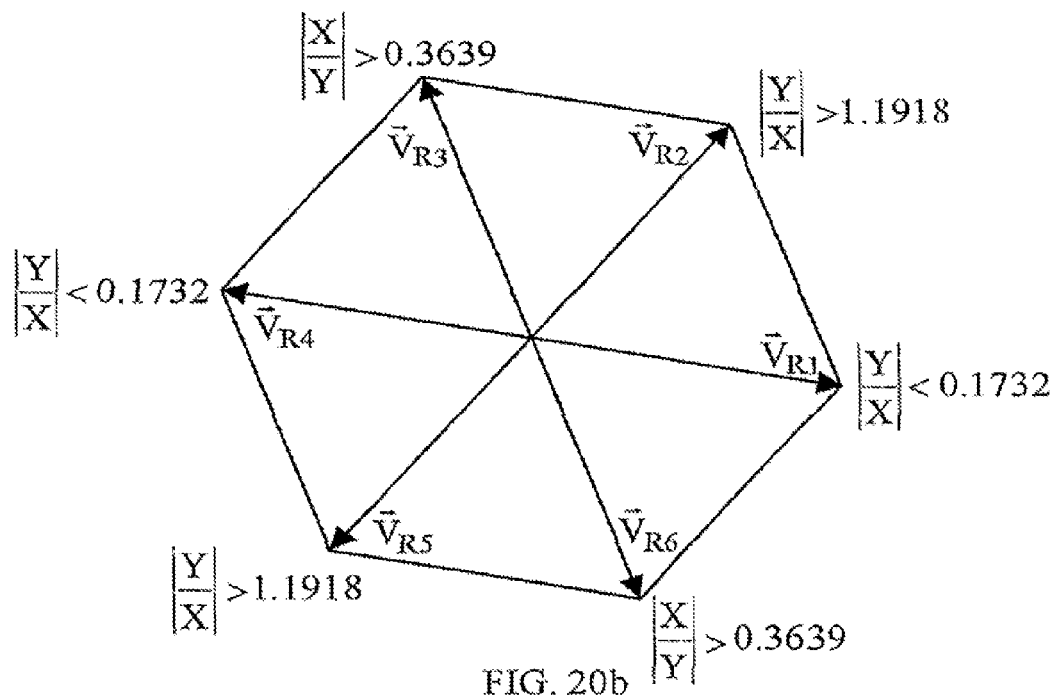
FIG. 20b depicts the BEMF Space Vectors for winding commutation and the values of Ratio at the angles for winding commutation of a skewed rotor for the present invention.

It was observed earlier that for the skewed rotor to produce BEMFs in phase with that of the unskewed rotor, the stator windings must be rotated by half the skew angle, thereby rotating the magnetic axes of the windings by the same amount and in the same direction. The rotation of the magnetic axes as a result of a rotor magnet skew of β=20° is shown in FIG. 20a. Since the phase voltages and BEMFs all lie along the magnetic axes of the phase windings, then the BEMF Space Vectors responsible for commutation of phase windings lie alone the lines from the center of the hexagon to the vertices and are depicted in the 10° clockwise skewed hexagon of FIG. 20b. FIG. 20b also shows the ratios of $$\left|\frac{Y}{X}\right|$$

and $$\left|\frac{X}{Y}\right|$$

examined for commutation of phase windings.

The flow charts used for implementation of the present invention for a β=20° skewed rotor are presented in FIGS. 21a-21e.

Figure 21A:
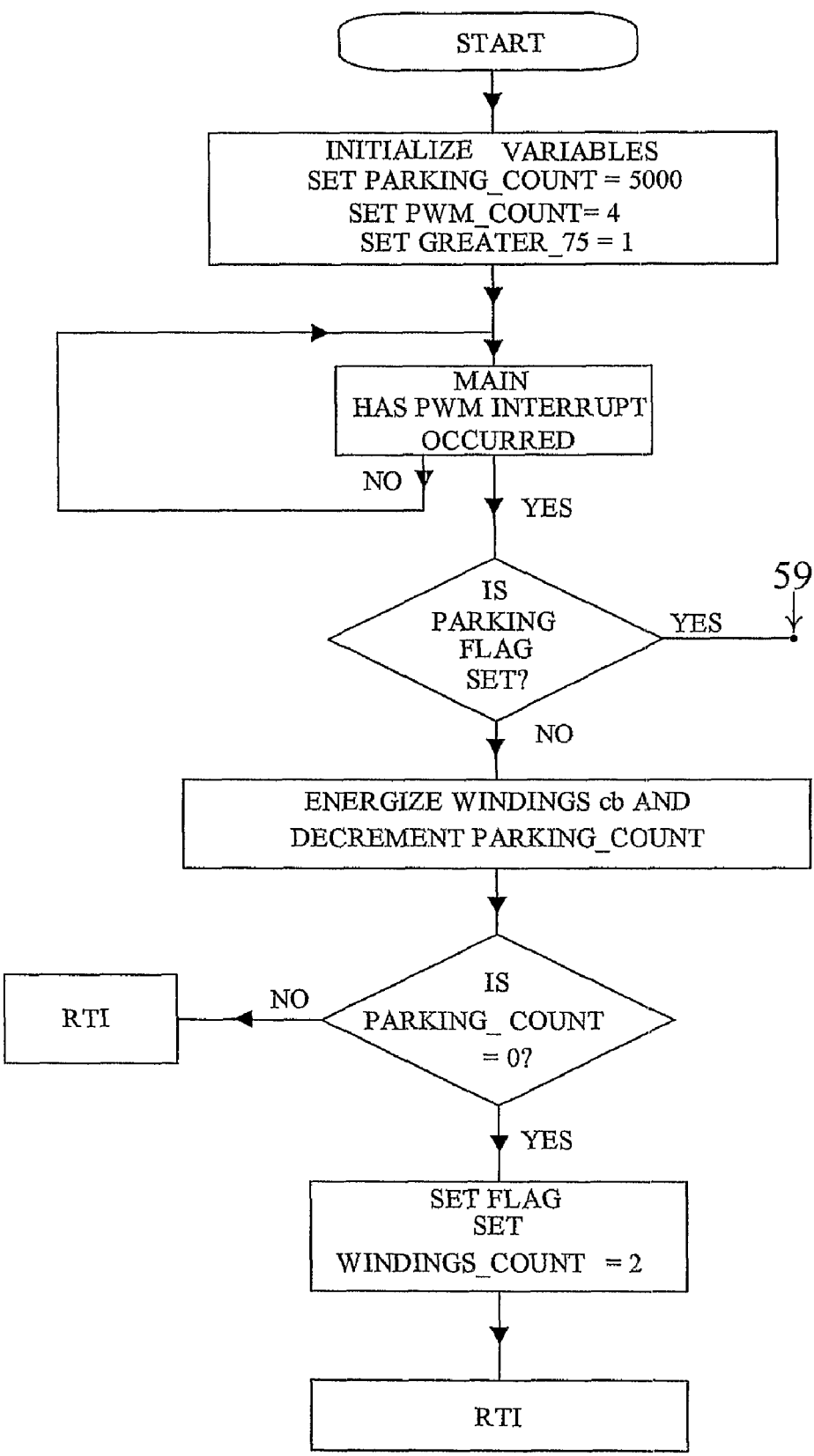
FIG. 21a shows the Parking routine for the present invention.

The Parking routine for the unskewed and skewed rotors differ by the initialisation of one additional variable "Set Greater_75=1" in the skewed Parking routine of FIG. 21a. Hence the operation of the Parking routine given earlier for the unskewed rotor applies for the skewed rotor.

Figure 21B:
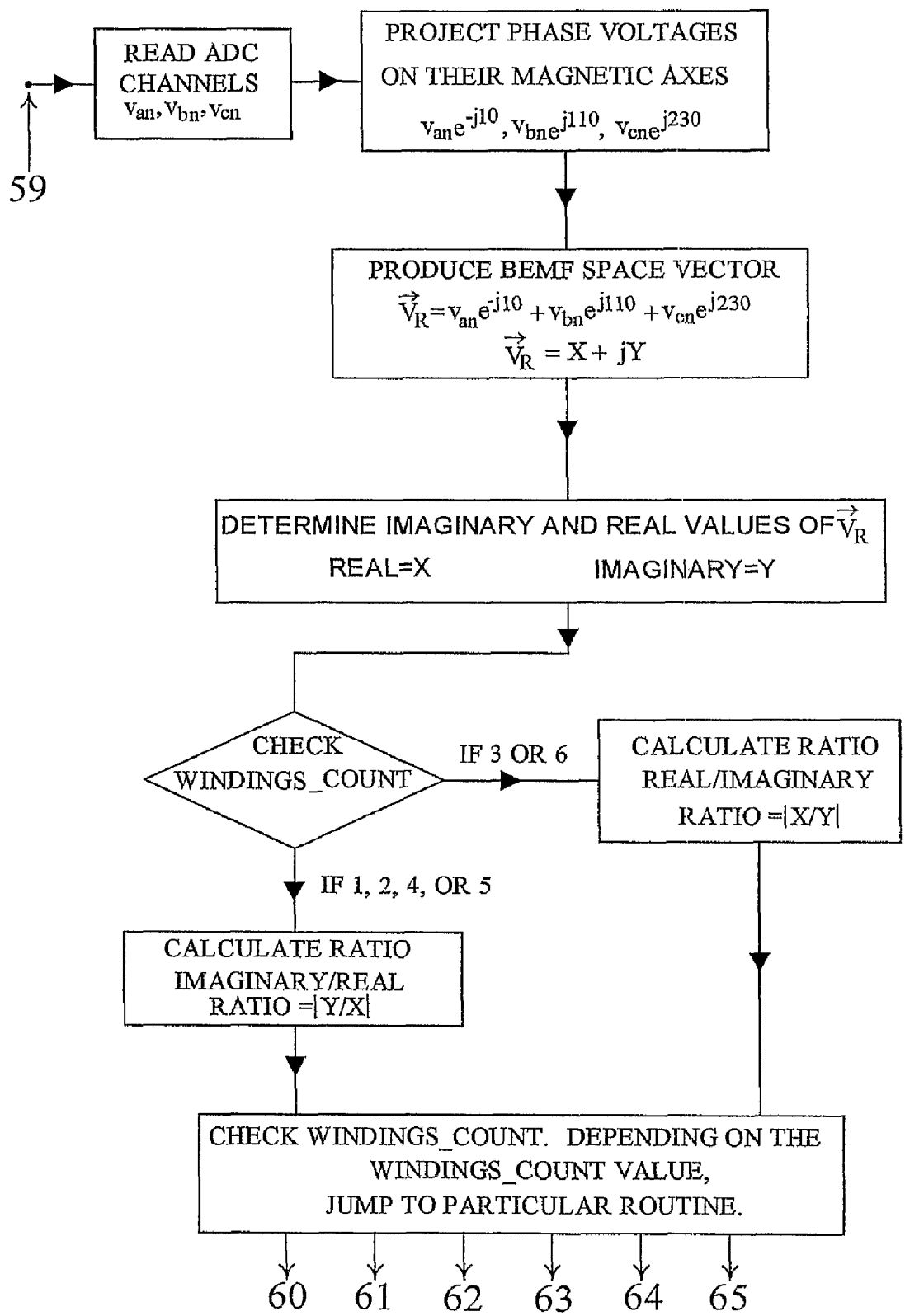
FIG. 21b shows the calculation routine for the present invention.
Figure 21C:
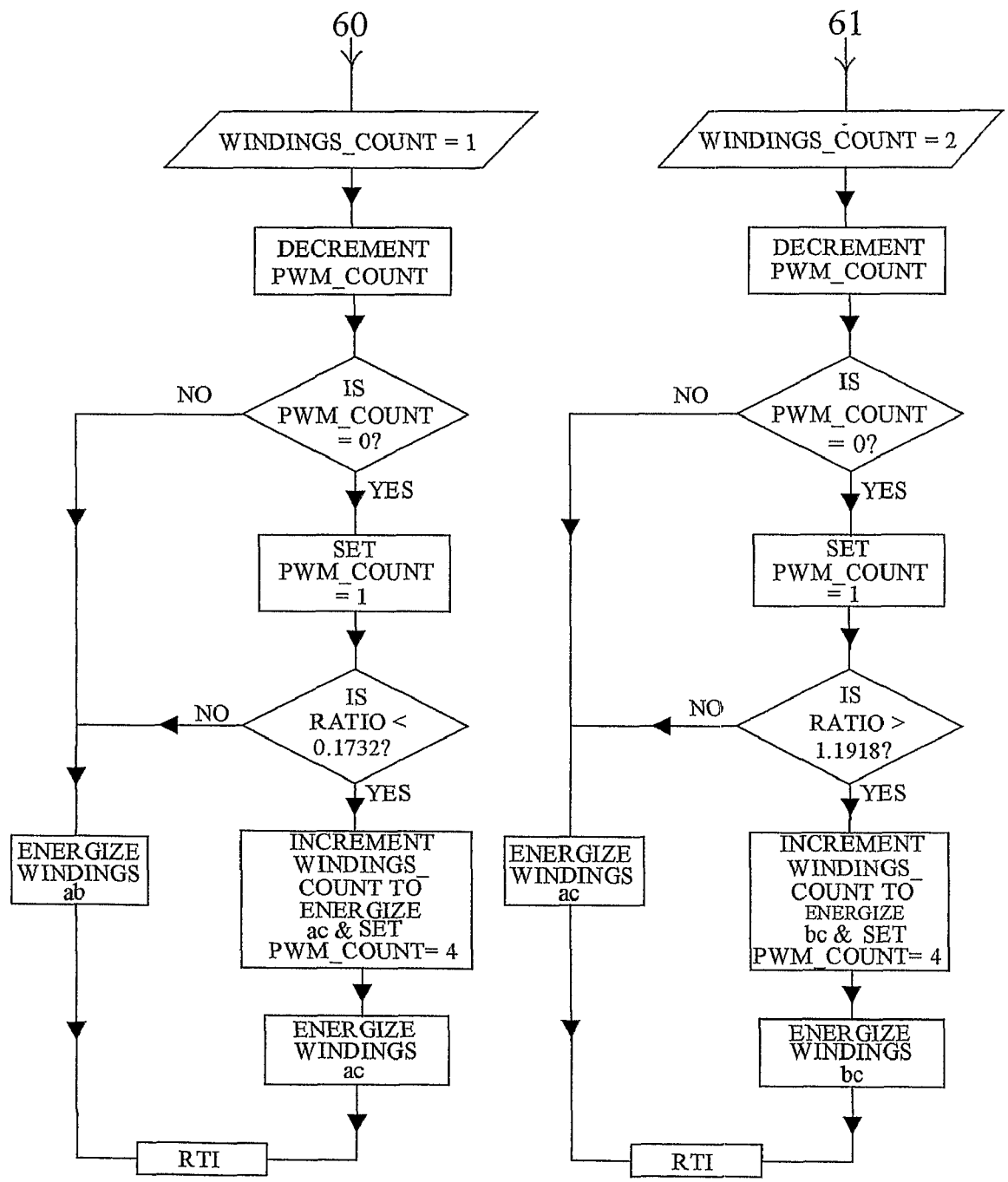
FIG. 21c shows Running routines for Windings_Count 1 and 2 for the present invention.

The Calculation routine for the unskewed rotor differs from that of the skewed rotor in FIG. 21b in the position of the positive magnetic axes produced. Since the positive magnetic axes of windings aa', bb' and cc' take up positions of $e^{-j10°}$, $e^{j110°}$ and $e^{j230°}$ respectively, then the BEMF Space Vector produced with the skewed rotor must reflect these positions in the Calculation routine. Other than this difference, the two Calculation routines are identical and the explanation given for the operation of the unskewed Calculation routine applies to that for the skewed rotor Calculation routine. Flow from the Parking routine to the Calculation routine is via (59) in FIG. 20a.

Figure 21D:
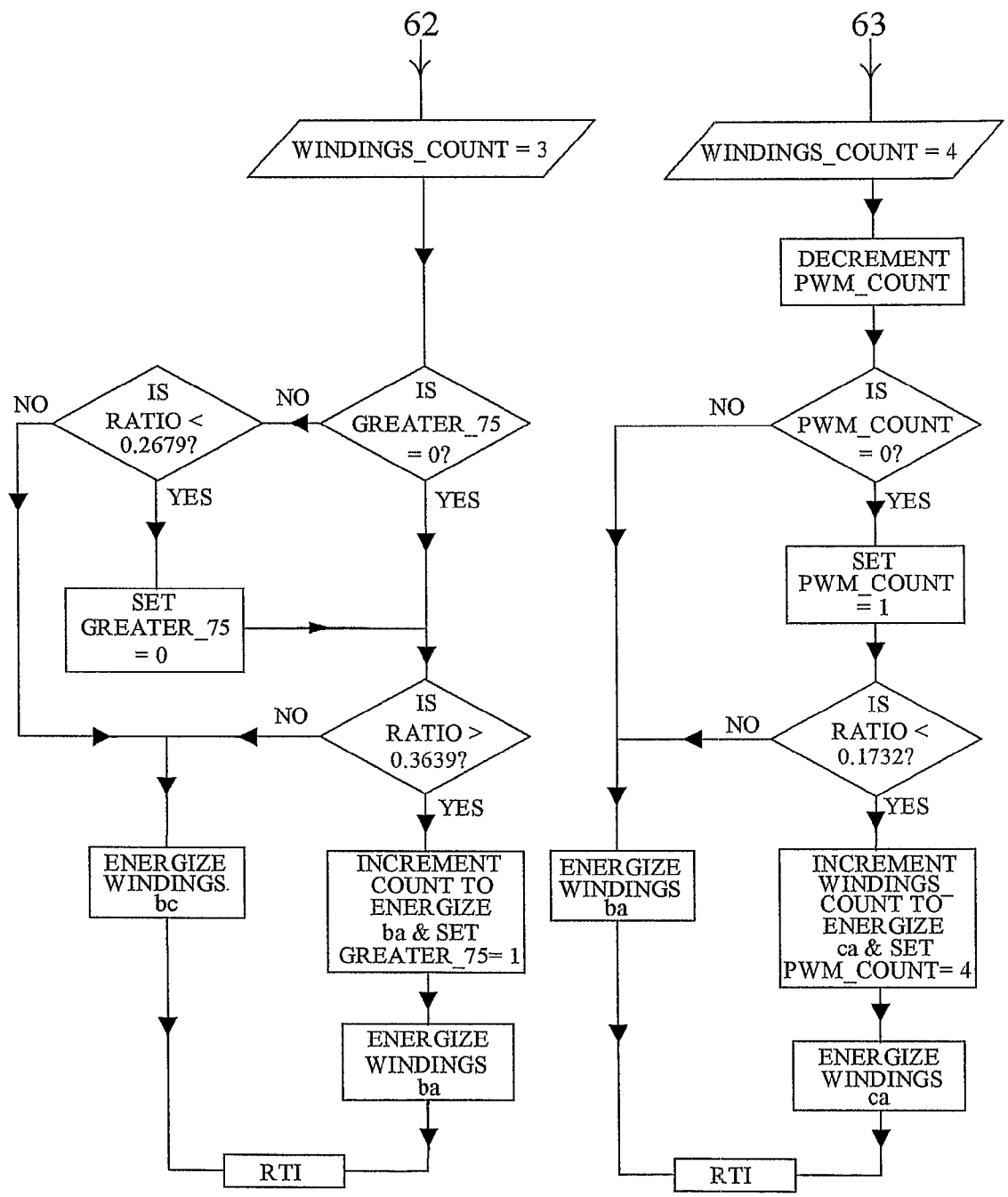
FIG. 21d shows Running routines for Windings_Count 3 and 4 for the present invention.
Figure 21E:
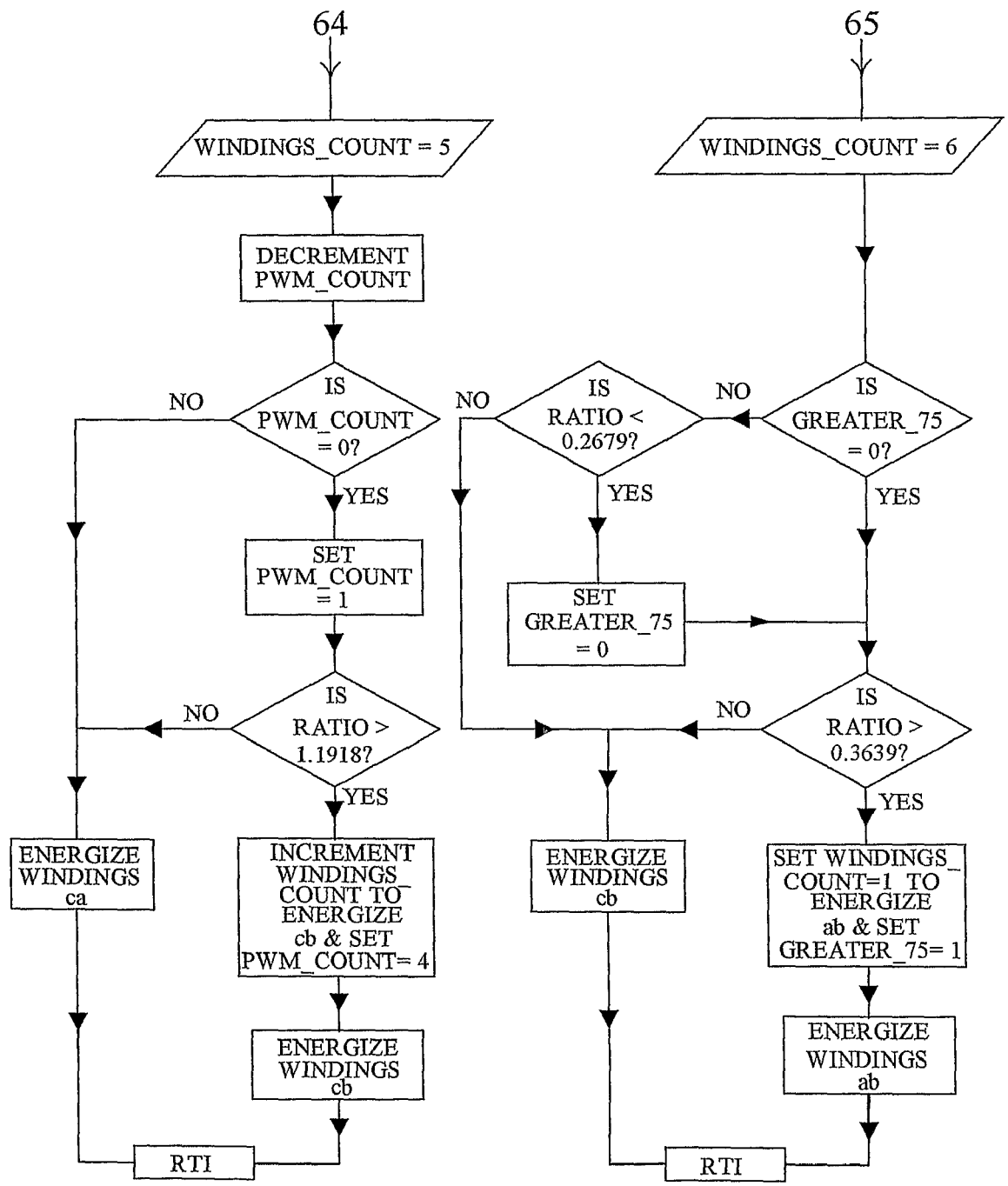
FIG. 21e shows Running routines for Windings_Count 5 and 6 for the present invention.

The Running routines of the unskewed rotor are similar to those of the skewed rotor except for the different values of Ratio examined in each Running routine due to the skewing of the rotor and the two new Running routines for Windings_Count 3 and 6 of FIG. 21d and FIG. 21e respectively. The operation of Running routines for Windings_Count 1, 2, 4 and 5 for the skewed rotor in FIGS. 21a-21e only differ from those of the unskewed rotor of FIGS. 18a-18e by the values of Ratio examined, and Ratio is checked in Running routines for Windings_Count 1 and 4 for the skewed Running routine of FIGS. 21a-21e instead of the sign change in Y for the unskewed Running routines of FIGS. 18a-18e. Hence, the operation of the unskewed Running routines for Windings_Count 1, 2, 4 and 5 of FIGS. 18a-18e applies for those of the skewed Running routines of FIGS. 21a-21e. Progression from Calculation routine to Running routines is via (60) for Windings_Count 1 Running routine, via (61) for Windings_Count 2 Running routine, via (62) for Windings_Count 3 Running routine, via (63) for Windings_Count 4 Running routine, via (64) for Windings_Count 5 Running routine and via (65) for Windings_Count 6 Running routine.

However, Running routines for Windings_Count 3 and 6 in FIGS. 21a-21e are entirely different from those of the unskewed rotor in FIGS. 18a-18e, and the explanation of their operation is now presented. When Windings_Count is incremented to 3 in the Windings_Count 2 Running routine of FIG. 21c, the program flows to the Windings_Count 3 Running routine of FIG. 21d via the Calculation routine of FIG. 21b on the occurrence of a the next PWM interrupt. It must be noted that on entering the Windings_Count 3 Running routine of FIG. 21d, the BEMF Space Vector $\vec{V_{R2}}$ is produced, at position 1 (68) in FIG. 22, which makes an angle of 50° with the real positive axis (66) and is rotating in an anti-clockwise direction. Since Windings_Count is 3

$$\left|\frac{X}{Y}\right|$$

is computed for the Ratio value in this Windings_Count 3 Running routine of FIG. 21d.

Figure 22:
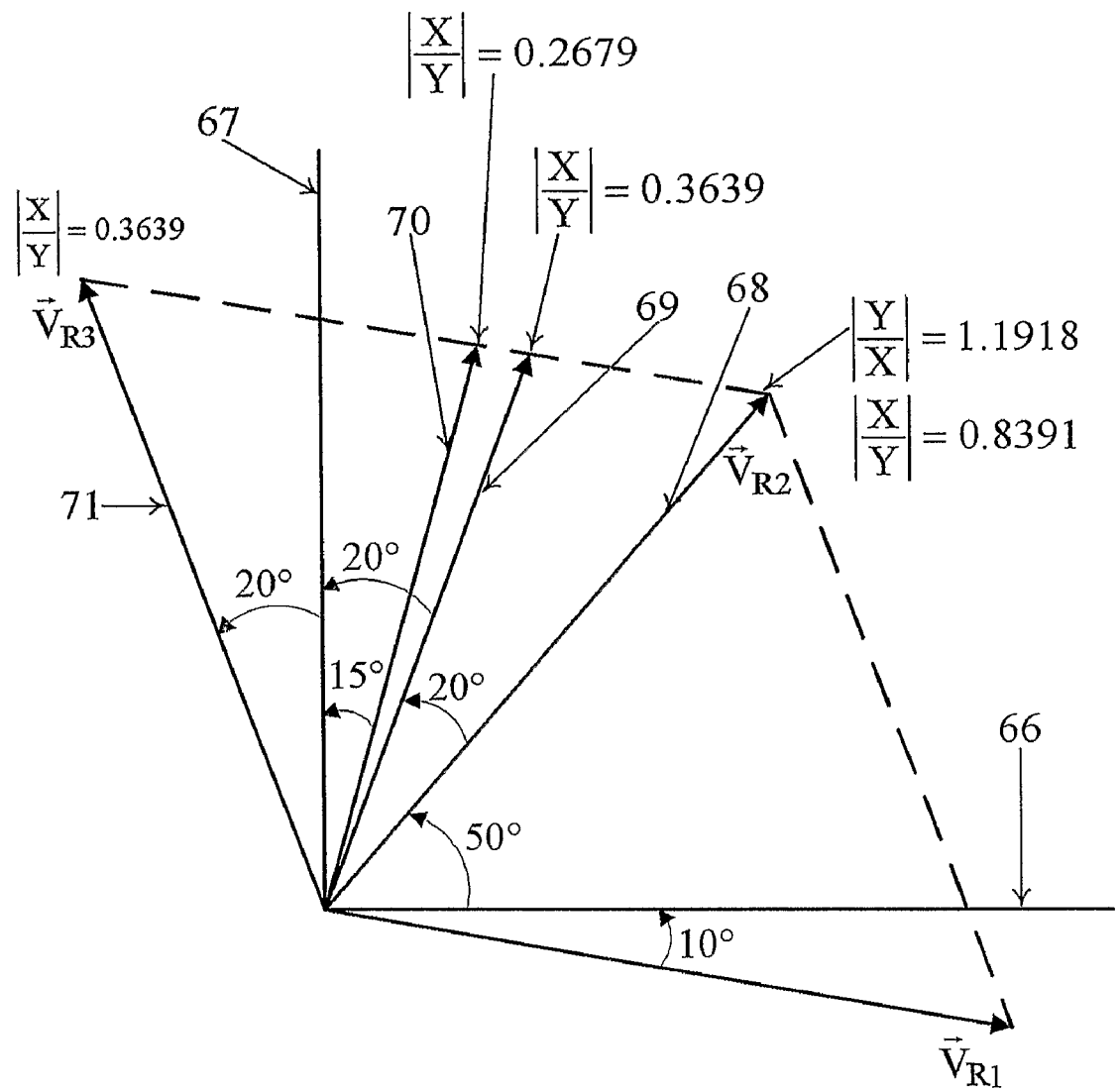
FIG. 22 illustrates the techniques used in Running routines for Windings_Count 3 and 6, of FIG. 21 to ensure that commutation of phase windings occur at the correct rotor position for the present invention.

The next commutation takes place when the BEMF Space Vector $\vec{V_{R3}}$ is produced, at position 4 (71) in FIG. 22, which makes an angle of 70° with the real negative axis or 20° with the imaginary positive axis (67). The $$\left|\frac{X}{Y}\right|$$

ratios at positions 1 and 4 are 0.8391 and 0.3639 respectively. As the BEMF Space Vector moves from positions 1 to 4 traversing 60°, the ratio of 0.3639 is reached at position 2 (69), at which point it makes an angle of 20° to the right of the imaginary positive axis (67). Since positions 2 and 4 of the BEMF Space Vector have the same Ratio value, with position 4 being the correct commutation point, Ratio checking must be inhibited up to the point when the BEMF Space Vector is at position 3 (70), where it makes an angle of 15° on the right of the imaginary positive axis (67).

These issues are included in Running routines for Windings_Count 3 and 6 shown in FIGS. 21a-21e. On entering the Windings_Count 3 Running routine of FIG. 21d, PWM_Count is not decremented and checked for zero as was done in the four Running routines for Windings_Count 1, 2, 4 and 5 for the unskewed rotor in FIGS. 18a-18e. This process caused inhibiting of Ratio checking when the resultant voltage vector, which does not possess rotor position information is produced during commutation of winding aa' is taking place at the beginning of this Running routine. However, this function produced by the "Decrement PWM_Count" and "Is PWM_Count=0?" blocks in the Running routines for the unskewed rotor of FIGS. 18a-18e are produced by the blocks that follow in the Windings_Count 3 Running routine of the skewed rotor of FIG. 21d. On entering the Windings_Count 3 Running routine of FIG. 21d, Greater_75 which was set to 1 in the initialisation stage of the Parking routine of FIG. 21a is checked for zero. Since no change has occurred to Greater_75, the program flows to check if Ratio is less than 0.2679.

This Ratio check of 0.2679, which represents a BEMF Space Vector location at position 3 (70) of FIG. 22, ensures that Ratio is only checked after the BEMF Space Vector has passed position 2 (69) in FIG. 22. This Ratio check of 0.2679 serves two purposes. It ensures that winding cc' is not commutated at the incorrect point when the rotor has only moved through 20° after the last commutation and it also ensures that Ratio is not checked when the resultant voltage vector is produced during commutation of winding aa'. If ratio is not less than 0.2679, then the Ratio value of 0.3639 is not checked and the program proceeds to continue energization of windings bc, execute a RTI command and return to the Windings_Count 3 Running routine on the occurrence of another PWM interrupt.

Since Greater_75 is not zero, the program checks if Ratio is less than 0.2679 and if it is, said program sets Greater_75 to zero and checks if Ratio is greater than 0.3639. If Ratio is not greater than 0.3639, said program proceeds to energize windings bc, executes the RTI command and return to the Windings_Count 3 Running routine on the occurrence of a PWM interrupt. Since Greater_75 is now zero, said program checks if Ratio is greater than 0.3639. If it is, said program increments Windings_Count, energizes the new pair of windings ba, sets Greater_75 to 1 and executes the RTI command.

On the next PWM interrupt, said program is directed to the Windings_Count 4 Running routine of FIG. 21d.

Windings_Count 6 Running routine in FIG. 21e is similar to that of Windings_Count 3 Running routine of FIG. 21d, except that "Increment Windings_Count To Energize ab" is replaced with "Set Windings_Count=1 To Energize ab". This replacement is due to the fact that the Windings_Count 6 Running routine is the last in the set of Running routines and said program must be directed to the Windings_Count 1 Running routine of FIG. 21c to begin a new Running routine cycle.

Table 6 summarises the activities occurring when the BEMF Space Vector reaches an angle for the commutation of a winding and the introduction of a new winding pair to the dc supply. The state of the DSP output lines and the transistors to be turned on in the Inverter Circuit are also given.

TABLE 6

| BEMF Space Vector Angle α | Winding Count Value | Ratio Chosen | Value of Ratio EX. For New Windings Energization | DSP Output Lines High | Inverter Transistors Turned On | New Windings Energized |
|---|---|---|---|---|---|---|
| α > −10° | 2 | $\frac{Y}{X}$ | >1.1918 | $a^+ c^-$ | Q1 & Q2 | ac |
| α > 50° | 3 | $\frac{X}{Y}$ | >0.3639 | $b^+ c^-$ | Q3 & Q2 | bc |
| α > 110° | 4 | $\frac{Y}{X}$ | <0.1732 | $b^+ a^-$ | Q3 & Q4 | ba |
| α > 170° | 5 | $\frac{Y}{X}$ | >1.1918 | $c^+ a^-$ | Q5 & Q4 | ca |
| α > 230° | 6 | $\frac{X}{Y}$ | >0.3639 | $c^+ b^-$ | Q5 & Q6 | cb |
| α > 290° | 1 | $\frac{Y}{X}$ | <0.1732 | $a^+ b^-$ | Q1 & Q6 | ab |

What I claim is:

1. A method of operating an electric motor, comprising:
   summing phase winding voltage vectors of energized windings with the EMF vector of an unenergized winding to determine a BEMF Space Vector;
   determining an angle that the BEMF Space Vector makes with the real axis; and
   energizing and deenergizing phase windings based on the position of the BEMF Space Vector.

2. The method of claim 1 wherein voltage vectors are determined by projection of detected phase winding voltages along the phase winding's magnetic axis.

3. The method of claim 1 further comprising the step of parking a rotor in a predetermined position by energizing a predetermined pair of phase windings.

4. The method of claim 1 wherein the angle that the BEMF Space Vector makes with the real axis is determined using the ratio of the real value of the BEMF Space Vector to the imaginary value of the BEMF Space Vector or the inverse ratio thereof.

5. The method of claim 1 wherein angle determination is disabled during a commutation interval in which a resultant voltage vector is produced that does not possess rotor position information.

6. The method of claim 1 wherein a predetermined sequence of energization and deenergization of phase windings results in rotor rotation in a predetermined direction.

7. The method of claim 1 wherein the motor is a DC motor that includes a plurality of phases and a plurality of poles.

8. The method of claim 1 further comprising parking a rotor at a predetermined position.

9. The method of claim 1 further comprising determining a rotor position.

10. The method of claim 1 wherein the phase winding voltage vectors are produced by the referral of the scalar phase voltages in electric circuits to magnetic axes in the corresponding magnetic circuits that are a result of the equality of scalar electric and vector magnetic current magnitudes.

11. The method of claim 1 wherein the BEMF Space Vector rotates at the same speed as that of a rotor and provides rotor position information determined using the angle that the BEMF Space Vector makes with the real positive axis.

12. The method of claim 11 wherein the rotor position information is used to commutate phase windings.

13. The method of claim 12 wherein rotor position information is provided in the absence of position sensors.

14. A computer usable medium having computer readable instructions stored thereon for execution by a processor to perform a method comprising:
    determining phase winding voltage vectors of at least one energized winding of an electric motor;
    determining the BEMF vector of an unenergized winding of the motor;
    determining a BEMF Space Vector for the motor; and
    sequentially energizing the phase windings based on the position of the BEMF Space Vector.

15. The computer usable medium of claim 14 wherein the instructions further comprise determining an angle that the BEMF Space Vector makes with the real axis.

16. The computer usable medium of claim 14 wherein the instructions further comprise parking a motor rotor in a predetermined position.

17. The computer usable medium of claim 14 comprising instructions for determining the angle that the BEMF Space Vector makes with the real axis by determining the ratio of the real value of the BEMF Space Vector to the imaginary value of the BEMF Space Vector or the inverse ratio thereof.

18. The computer usable medium of claim 14 wherein the phase winding voltage vectors are produced by detecting phase winding voltages and projecting the phase winding voltages along the phase winding's magnetic axis.

* * * * *